US008994978B2

(12) United States Patent
Tsuzuki et al.

(10) Patent No.: US 8,994,978 B2
(45) Date of Patent: Mar. 31, 2015

(54) IMAGE PROCESSING APPARATUS THAT FACILITATES PRINTING OF PASSWORD-PROTECTED DOCUMENTS, AND CORRESPONDING METHOD FOR FORMING IMAGES

(75) Inventors: Hiroyuki Tsuzuki, Tokyo (JP); Kimitoshi Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 536 days.

(21) Appl. No.: 13/282,544

(22) Filed: Oct. 27, 2011

(65) Prior Publication Data
US 2012/0105900 A1 May 3, 2012

(30) Foreign Application Priority Data

Oct. 29, 2010 (JP) ................................. 2010-244495
Nov. 8, 2010 (JP) ................................. 2010-249721

(51) Int. Cl.
*G06K 15/00* (2006.01)
*G06F 21/60* (2013.01)

(52) U.S. Cl.
CPC .......... *G06K 15/4095* (2013.01); *G06F 21/608* (2013.01)
USPC ....... 358/1.14; 358/1.13; 358/1.15; 358/1.16; 358/501; 726/4; 726/5; 726/6; 726/17; 726/27; 726/28; 726/30; 713/161; 713/165; 713/168

(58) Field of Classification Search
None
See application file for complete search history.

(56) References Cited

U.S. PATENT DOCUMENTS

| 2003/0164988 | A1* | 9/2003 | Enomoto et al. | 358/400 |
| 2007/0050398 | A1* | 3/2007 | Mochizuki | 707/102 |
| 2007/0233687 | A1* | 10/2007 | Iwase | 707/9 |
| 2007/0253018 | A1* | 11/2007 | Doui | 358/1.15 |
| 2009/0174900 | A1* | 7/2009 | Shigehisa et al. | 358/1.15 |

FOREIGN PATENT DOCUMENTS

| JP | 63-205256 A | 8/1988 |
| JP | 2002123133 A | 4/2002 |
| JP | 2006-043962 A | 2/2006 |
| JP | 2007-268930 A | 10/2007 |
| JP | 2008-201001 A | 9/2008 |
| JP | 2008-201044 A | 9/2008 |
| JP | 2009232316 A | 10/2009 |
| JP | 2009-267675 A | 11/2009 |
| JP | 2009269292 A | 11/2009 |
| JP | 2010157027 A | 7/2010 |

* cited by examiner

*Primary Examiner* — Miya J Cato
(74) *Attorney, Agent, or Firm* — Rabin & Berdo, P.C.

(57) ABSTRACT

An image forming apparatus performs a direct printing function. A selecting section selects at least two files from a plurality of files stored in at least one of an internal storage medium and an external storage medium. A human interface receives passwords form a user. A password determining section determines whether the selected files are protected by passwords. A file extracting section extracts the selected files from an internal storage medium or external storage medium. A password verifying section determines whether passwords contained in the selected files and the passwords inputted through the human interface coincide. A printer prints the selected files. A printing controller controls the printer, causing the printer to print at least one of selected files if the password verifying section has determined that the password contained in the at least one selected file and the password inputted by the user coincide.

23 Claims, 43 Drawing Sheets

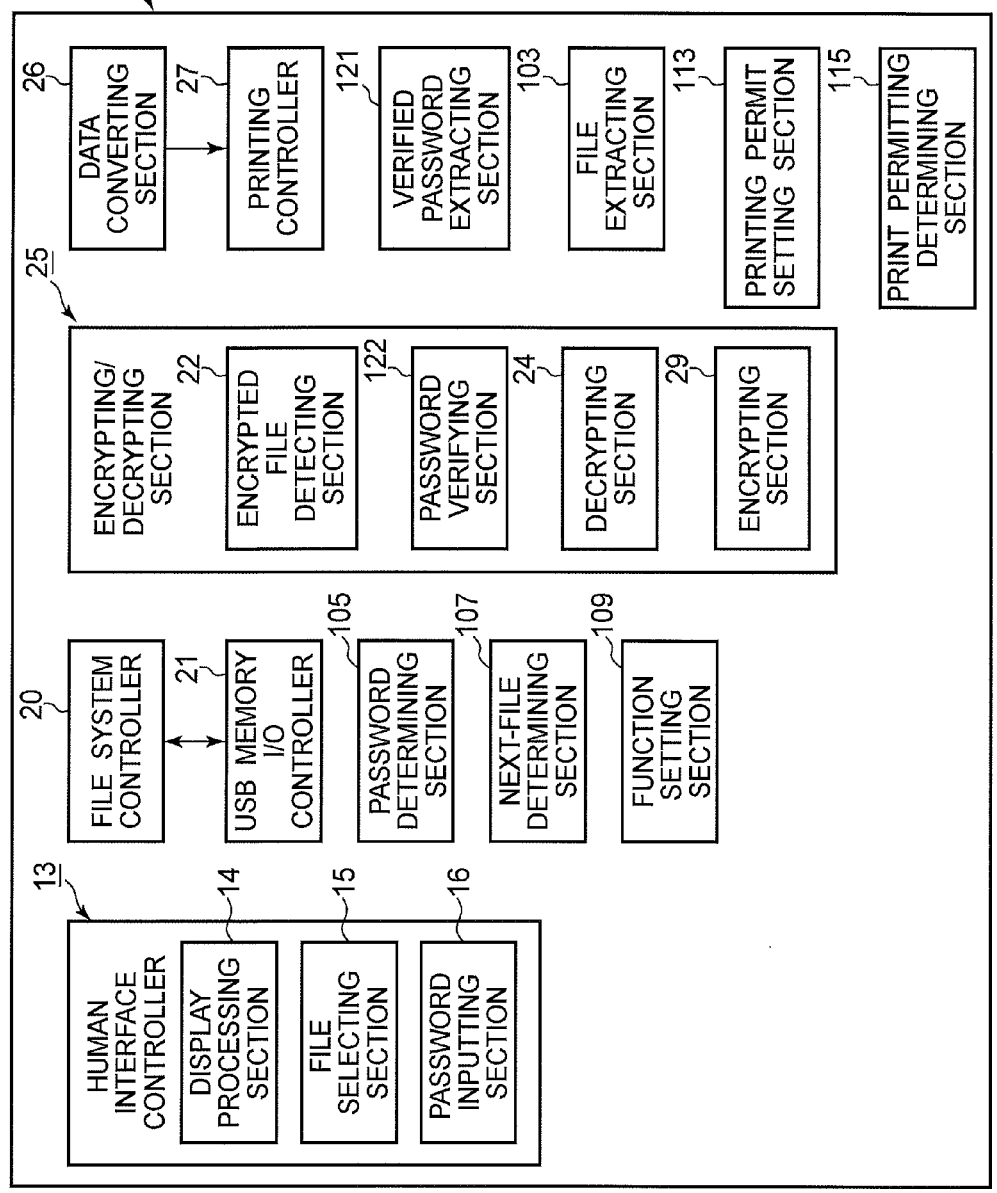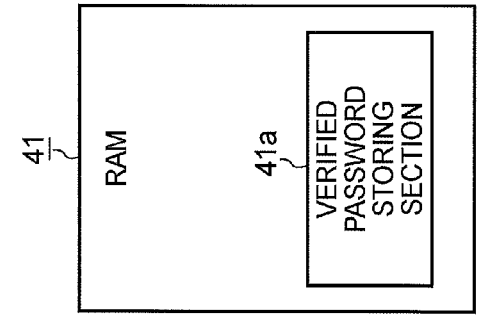

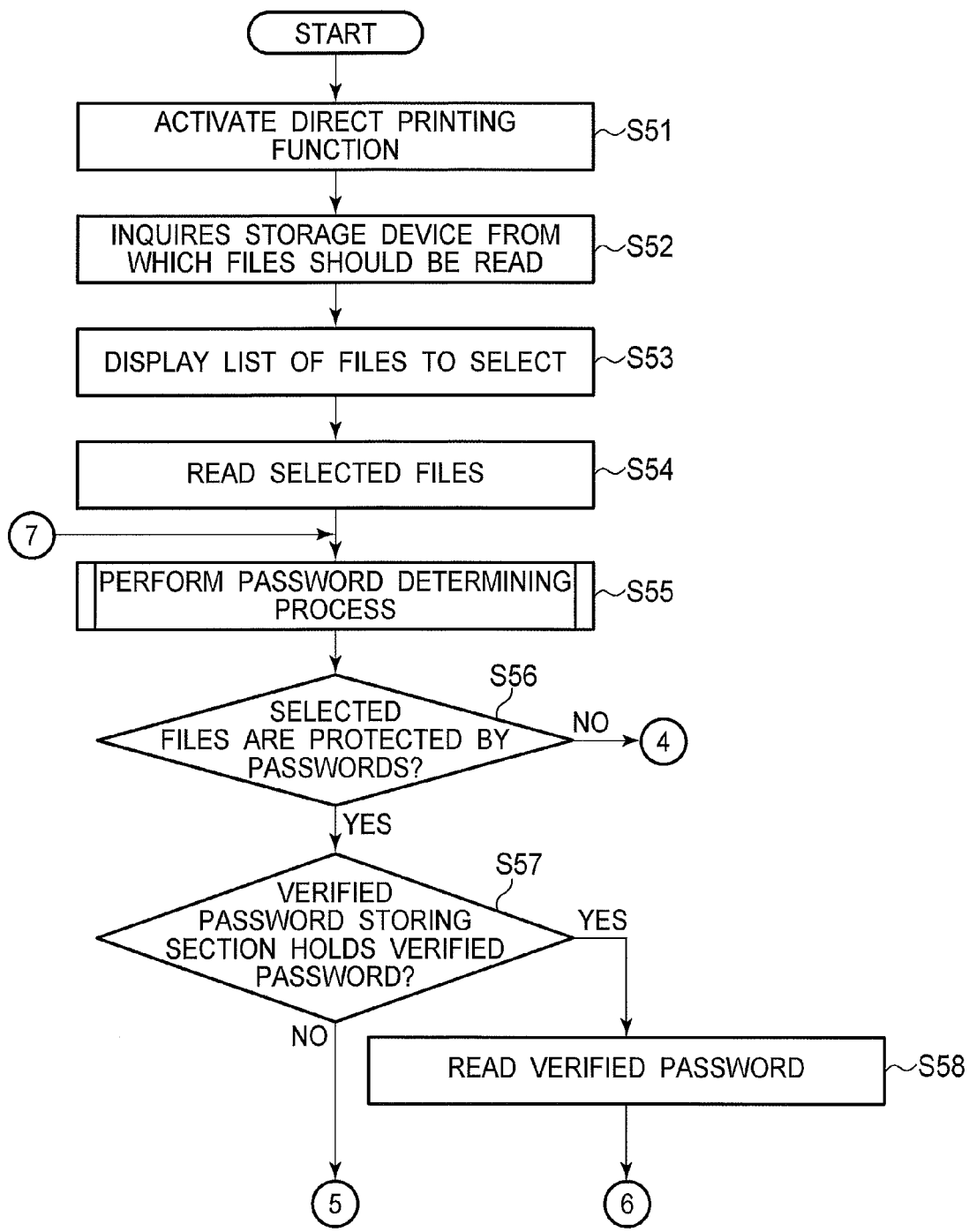

FIG.51

| FILE | PRINTING | PAGES |
|---|---|---|
| docu001.pdf | MONOCHROME | 6 |
| docu003.pdf | MONOCHROME | 1 |
| docu005.pdf | COLOR | 8 |
| docu007.pdf | COLOR | 5 |

FIG.52

| PRIORITY | FILE | PRINTING | PAGES |
|---|---|---|---|
| 1 | docu003.pdf | MONOCHROME | 1 |
| 2 | docu001.pdf | MONOCHROME | 6 |
| 3 | docu007.pdf | COLOR | 5 |
| 4 | docu005.pdf | COLOR | 8 |

FIG.53

| PRIORITY | FILE | PRINTING | PAGES |
|---|---|---|---|
| 1 | docu007.pdf | COLOR | 5 |
| 2 | docu005.pdf | COLOR | 8 |
| 3 | docu003.pdf | MONOCHROME | 1 |
| 4 | docu001.pdf | MONOCHROME | 6 |

FIG.54

| PRIORITY | FILE | PRINTING | PAGES |
|---|---|---|---|
| 1 | docu003.pdf | MONOCHROME | 1 |
| 2 | docu007.pdf | MONOCHROME | 5 |
| 3 | docu001.pdf | MONOCHROME | 6 |
| 4 | docu005.pdf | MONOCHROME | 8 |

IMAGE PROCESSING APPARATUS THAT FACILITATES PRINTING OF PASSWORD-PROTECTED DOCUMENTS, AND CORRESPONDING METHOD FOR FORMING IMAGES

BACKGROUND OF THE INVENTION

1. Field of the Invention

The present invention relates to an image forming apparatus and a method of forming images.

2. Description of the Related Art

Existing image forming apparatus include printers, copying machines, facsimile machines, and multi function peripherals. Some multi function printers are configured to perform a direct printing function in which a data file is directly read from, for example, a memory without using a host computer and printing is carried out. Such a printer selectively reads document files and image files from the memory. Japanese Patent Application Publication No. 2008-201044 discloses one such image forming apparatus.

If a password-protected file is to be printed, the operator first inputs his password. Printing is then allowed if the input password is the same as a registered password.

The aforementioned prior art multi function printer performs printing as follows: When a plurality of files are to be printed at a time, the operator selects a first file and inputs a password before printing the first file. Upon completion of printing of the first file, the operator selects a second file and then inputs his password before printing the second file. This is cumbersome.

SUMMARY OF THE INVENTION

An object of the present invention is to solve problems of the aforementioned existing multi function printer, thereby providing an image forming apparatus and a method of forming images that simplify the printing of a plurality of files at a time.

An image forming apparatus is capable of performing a direct printing function.

A selecting section is configured to select at least two files from a plurality of files stored in a storage medium. A human interface receives passwords from a user. A password determining section is configured to determine whether the selected files are protected by passwords. A file extracting section is configured to extract the selected files. A password verifying section is configured to determine whether passwords contained in the selected file and the passwords inputted through the human interface coincide. A printer prints the selected files. A printing controller configured to control the printer, the printing controller causing the printer to print at least one of selected files if the password verifying section has determined that the password contained in the at least one selected file and the password inputted by the user coincide.

An image forming apparatus is capable of performing a direct printing function.

A selecting section is configured to select at least two files from a plurality of files stored in at least one of an internal storage medium and an external storage medium. A human interface receives passwords for the at least two files from the user. A password determining section is configured to determine whether the selected files are protected by passwords. A file extracting section is configured to extract the selected file from the at least one of an internal storage medium and an external storage medium. A password verifying section is configured to determine whether passwords contained in the selected files and the passwords inputted through the human interface coincide. A printer prints the selected files. A timer is employed to time an elapsed time. The printing controller causes the printer to initiate printing of the selected files if the password verifying section determines, within a period of time timed by the timer, that the passwords in the selected files and the passwords inputted by the user coincide.

A method is used for forming an image. The method includes the following steps.

(1) extracting a set of selected files from a plurality of files stored in a storage medium;

(2) determining whether the set of selected files is protected by passwords;

(3) determining whether passwords contained in the set of files and passwords inputted from outside coincide; and (4) initiating printing of the set of files after it is determined that the passwords in the set of files and the passwords inputted from outside coincide.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 39A is a functional block diagram of the multi function peripheral according to the fifth embodiment;

FIG. 39B illustrates a RAM according to the fifth embodiment;

FIG. 40 is a first portion of a flowchart illustrating a first operation of the multi function peripheral;

FIG. 51 illustrates the attributes of respective files;

FIG. 52 illustrates a first exemplary order in which the files should be printed;

FIG. 53 illustrates a second exemplary order in which the files should be printed;

FIG. 54 illustrates a third exemplary order in which the respective files are printed;

DETAILED DESCRIPTION OF THE INVENTION

Embodiments of the invention will be described in detail with reference to the accompanying drawings. The invention will be described in terms of a multi function peripheral with a direct printing function in which a data file is directly read from an internal storage device and an external storage device without using, for example, a computer and is then printed.

First Embodiment

Figure 1:
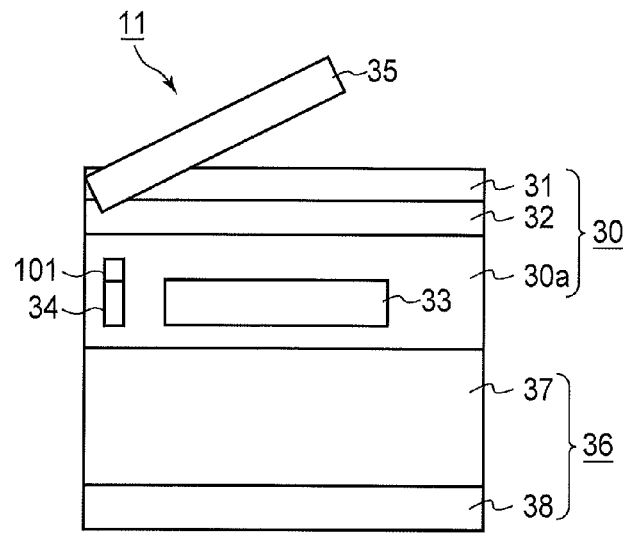
FIG. 1 illustrates the general concept of a multi function peripheral according to a first embodiment.

FIG. 1 illustrates the general concept of a multi function peripheral 11 according to a first embodiment.

The multi function peripheral 11 includes a scanner 30, a human interface 33, a USB interface 34, an automatic document feeder (AFD) 35, and a printer 36. The AFD 35 supports a plurality of pages of an original document and feeds them on a page-by-page basis to the scanner 30. The printer 36 includes a print engine 37 of a variety of types, e.g., wire dot, ink-jet, or electrophotographic, a paper cassette 38 that holds a stack of print media (e.g., paper) and feeds the print medium to the print engine 37.

If the printer 36 takes the form of an electrophotographic printer, the print engine 37 includes image forming units that form black image, yellow image, magenta image, and cyan image, respectively, using corresponding colored toners. Each image forming unit includes an LED head (print head) that faces a photoconductive drum and illuminates the charged surface of the photoconductive drum to form an electrostatic latent image, and a transfer roller that parallels the photoconductive drum and transfers a toner image from the photoconductive drum onto the print medium.

In the first embodiment, the ADF 35 supports an original document of a variety of sizes (e.g., A3) and the paper cassette 38 holds stacks of paper of corresponding sizes.

The scanner 30 includes a scanning section 30a that reads the image of the original document, a flat bed 32 that is formed of a transparent material, for example, glass or plastic, supports the original document thereon and is disposed above the scanning section 30a, and a scanner cover 31 that covers the flat bed 32 so that light illuminating the original document will not leak outside during the scanning operation.

The USB interface 34 is an interface to which a USB memory 101 is detachably attached. The USB memory 101 holds a plurality of files to be printed using a direct printing function: document files that contain document data and image files that contain image data. The formats of files that can be printed using a direct printing function include PDF and XPS for document files, and JPEG, PNG, and TIFF for image files. The USB memory 101 is configured to hold image files read by means of a function of Scan-to-USB Memory of the multi function peripheral 11.

Figure 2:
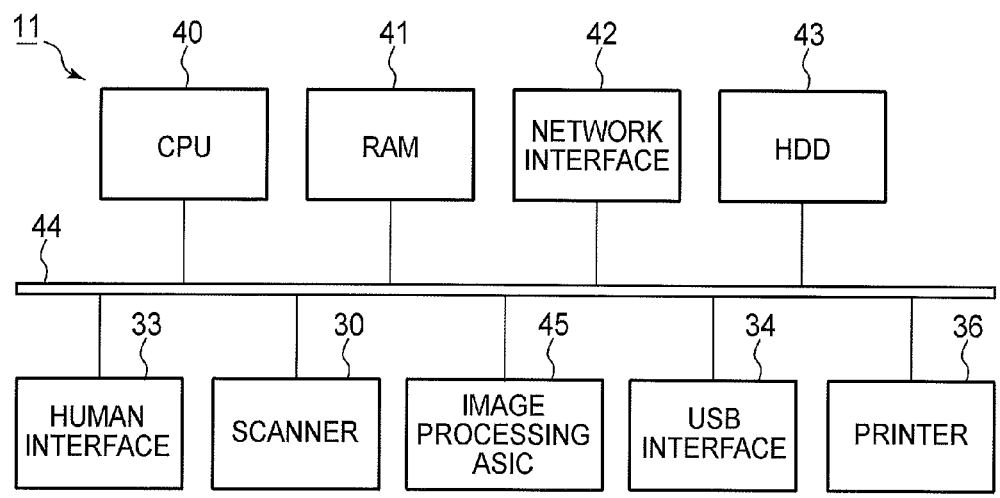
FIG. 2 is a control block diagram of the multi function peripheral.

FIG. 2 is a control block diagram of the multi function peripheral 11. A control unit board in the multi function peripheral 11 supports a scanner 30, human interface 33, USB interface 34, printer 36, CPU 40, RAM 41, image processing ASIC 45, network interface 42, and hard disk drive (HDD) 43. These sections communicate with one another via a bus 44. The CPU performs the overall control of the multi function peripheral 11. The RAM 41 serves as a first memory. The image processing ASIC 45 processes images. The network interface 42 connects between the multi function peripheral 11 and an external computer, so that the multi function peripheral 11 communicates with the external computer over a LAN implemented by ETHERNET. The HDD 43 serves as a second memory. The image processing ASIC 45 performs high speed image processing on images obtained by scanning an original document, and images contained in the files that are to be printed by direct printing. The bus 44 includes a plurality of signal lines used for transmitting and receiving a variety of signals and data, and for controlling synchronization of, for example, transmission of signals and data and the timings at which images are formed.

The human interface 33 will be described.

Figure 3:
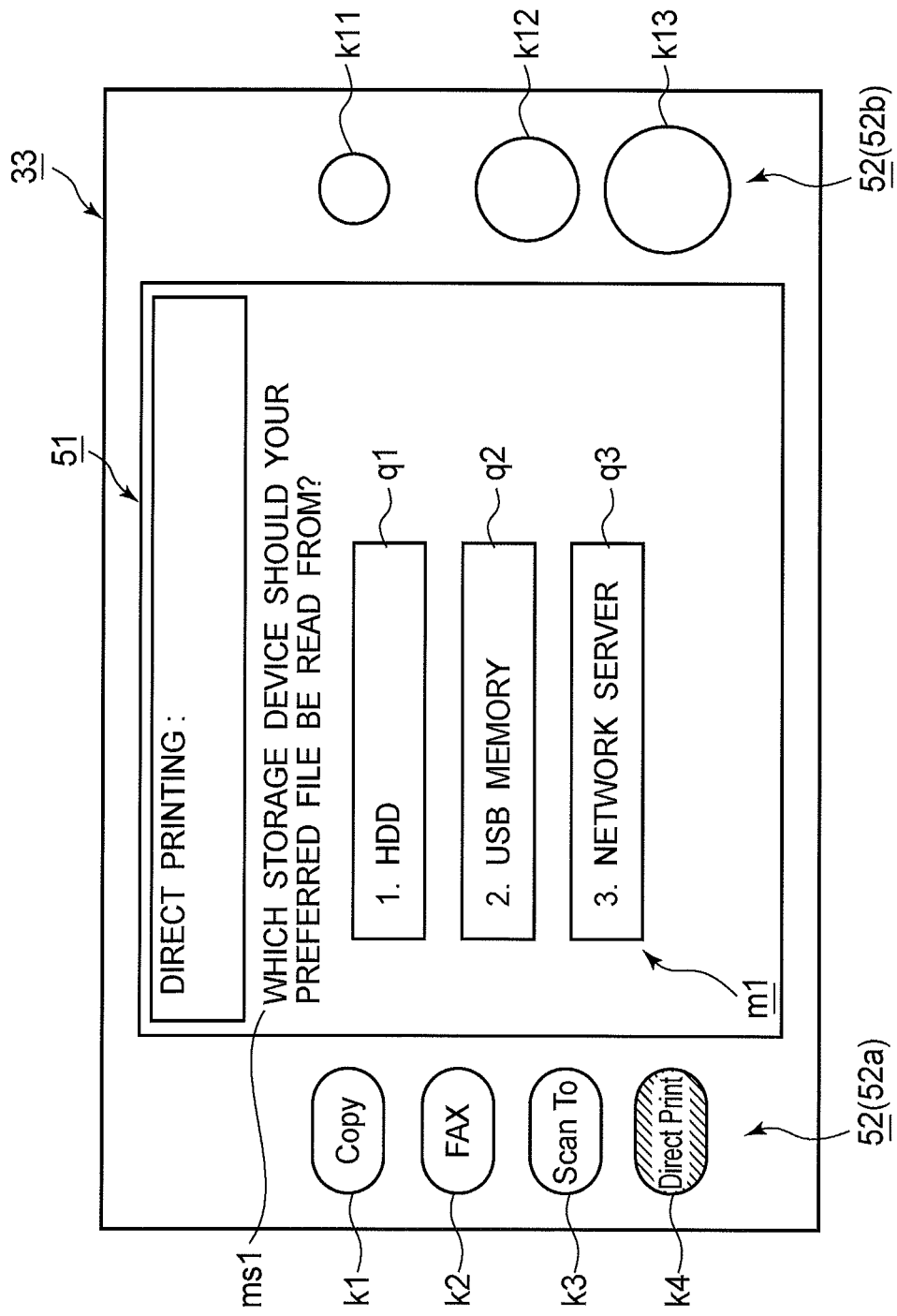
FIG. 3 illustrates a human interface according to the first embodiment.

FIG. 3 illustrates the human interface 33 according to the first embodiment.

A liquid crystal display (LCD) 51 is disposed in the middle of the human interface 33 and displays a variety of screens. Controls 52 are disposed around the LCD 51 and include buttons k1 to k4 and k11 to k13. The LD 51 takes the form of a touch screen, and serves a part of the human interface 33.

The user can select a desired function from among COPY, FAX, SCANTO, and DIRECT PRINTING by depressing a corresponding one of the buttons k1 to k4. Also, the user can initiate color printing or color scanning by depressing the button k13, and monochrome printing or monochrome scanning by depressing the button k12. The user can terminate these functions by depressing the button k11.

If the user depresses a desired button (e.g., button k4), an initial screen for direct printing appears on the LCD 51, which in turn displays an initial screen for the direct printing. The screen includes a menu m1 having a plurality of keys q(i) (i=1, 2, . . .). The user then touches one of the keys q(i) to select his desired item. The LCD 51 may display additional messages ms1 and instructions to the user.

The CPU 40 will be described.

Figure 4:
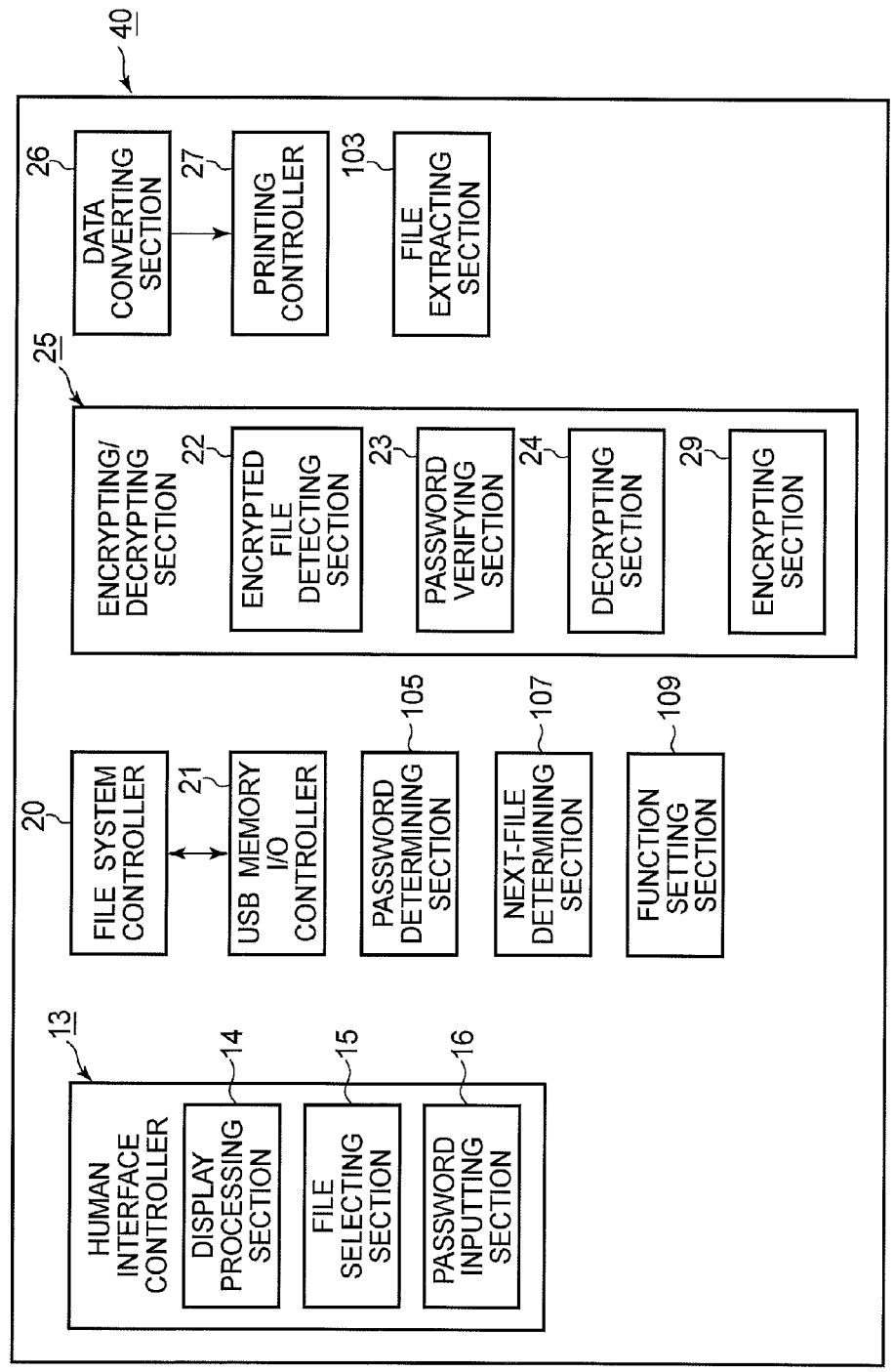
FIG. 4 is a functional block diagram of the multi function peripheral of the first embodiment.

FIG. 4 is a functional block diagram of the multi function peripheral 11 of the first embodiment.

The CPU 40 includes the following sections. A human interface controller 13 controls the human interface. A file system controller 20 controls a file system. A USB memory I/O controller 21 controls a USB memory I/O. An encrypting section encrypting/decrypting section 25 encrypts data or decrypts encrypted data. A data converting section 26 performs data conversion. A printing controller 27 controls printing of the data in the file. A file extracting section 103 extracts files. A password determining section 105 determines whether a file is protected by a password. A next-file determining section 107 performs a next file determining process to determine whether there is a selected file (e.g., f(3) in this embodiment) that has not been subjected to the decryption process and printing controlling process yet (S13, FIG. 6), and to determine whether there is a selected file (e.g., f(3) in this embodiment) that has not been subjected to the password determining process and the password verifying process yet (S10, FIG. 5). A function setting section 109 sets functions including COPY, FAX, SCANTO, and DIRECT PRINTING.

The human interface controller 13 includes a display processing section 14, a file selecting section 15 as a file extracting means, and a password inputting section 16 as a password inputting means. The encrypting/decrypting section 25 includes an encrypted file detecting section 22, a password verifying section 23, and a decrypting section 24. The file extracting section 103 extracts a file from the USB memory 101 in accordance with the selection made by the file selecting section 15.

The CPU 40 performs the overall control of the multi function peripheral 11 by sending appropriate commands to the human interface controller 13, file system controller 20, USB memory I/O controller 21, encrypting/decrypting section 25, data converting section 26, and printing controller 27.

The human interface controller 13 causes the LCD 51 to display messages and commands; obtains signals from the buttons k1 to 44, k11 to k14, and keys q(i) when the user depresses the buttons k1 to 44, k11 to k14, and touches keys q(i); manages the settings for a variety of functions; and sends commands for the respective sections to initiate their processing.

The file system controller 20 performs a file system control process in order to access a variety of file systems: the file system of the HDD 43, the file system of the USB memory 101 that can be accessed via the USB interface 34, and the file system on a network server that can be accessed via a network interface 42. The file system controller 20 stores files into and obtains files from the HDD 43, USB memory 101, and RAM and ROM as storage devices on a network server.

The USB memory I/O controller 21 is a device driver that activates the USB interface 34, and obtains a file from the USB memory 101 attached by the user into the USB interface 34 of the multi function peripheral 11, and then sends the file to the file system controller 20.

Using a string of characters of a fixed length (e.g., 32 bytes) as a key, the encrypting/decrypting section 25 encrypts data of an arbitrary size that should be encrypted. Likewise, using a string of characters of a fixed length, the decrypting section 24 decrypts encrypted data. The string of characters as a key is produced through a predetermined data conversion based on a password set by the user and information associated with the file to be encrypted or decrypted.

In the first embodiment, a plurality of files stored in the USB memory 101 can be printed using the direct printing function. It would be very inconvenient, if the user has to input a password for a corresponding pass-word-protected file to be printed after completion of printing of a preceding pass-word-protected file and immediately before printing of each file is started.

The first embodiment solves this inconvenience. That is, in the first embodiment, the printing operation of a file may be stared as soon as it is determined that the file can be printed in the direct printing function. Therefore, if a plurality of files are to be printed, the user is allowed to input the passwords for all password-protected files in succession before any one of the plurality of file can be printed. Each of the password-protected files has a corresponding password and more than one file may have an identical password.

A description will be given of the operation of the multi-function peripheral 11 when the multi function peripheral 11 prints a plurality of files.

Figure 5:
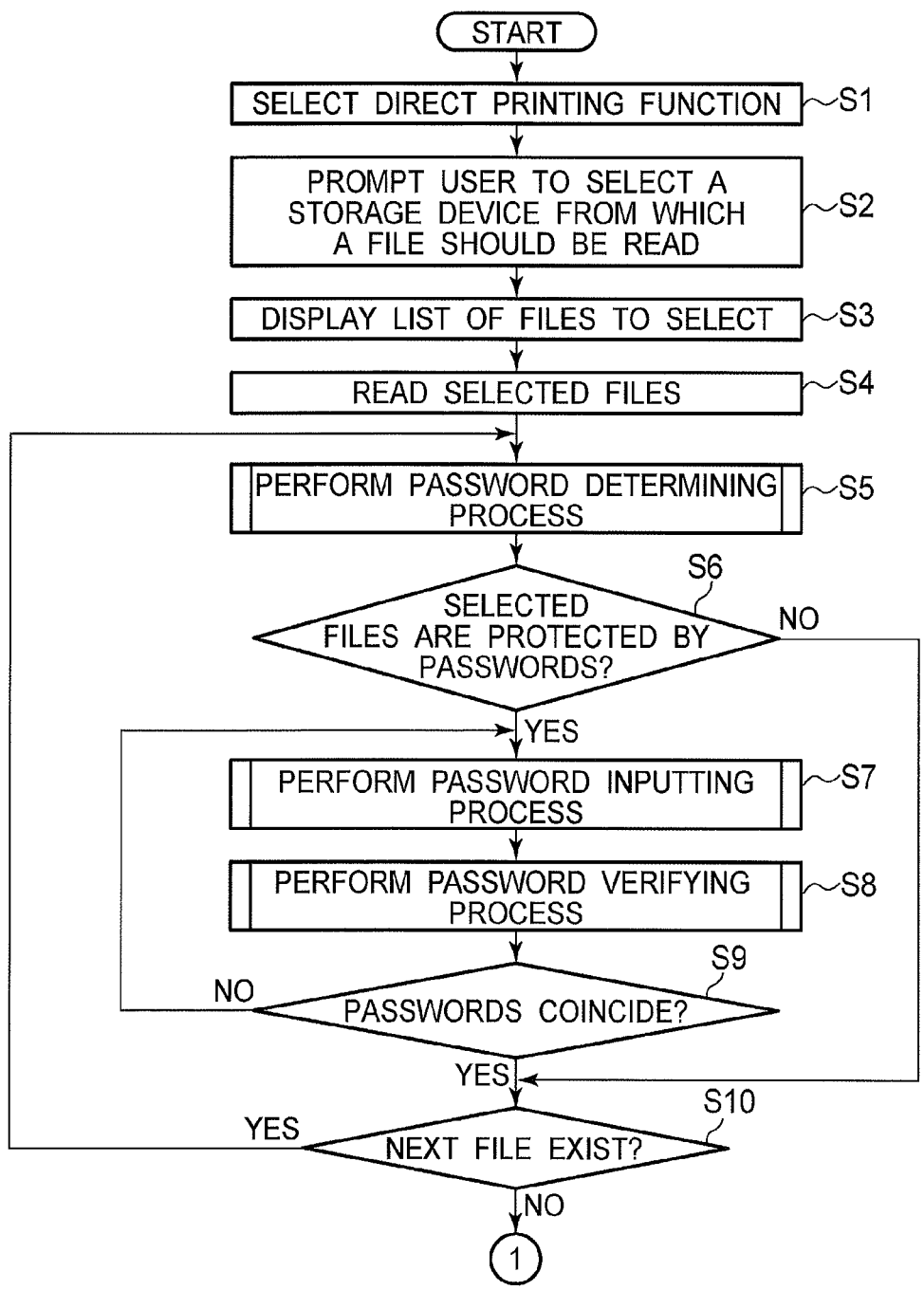
FIG. 5 is a first portion of a flowchart illustrating the operation of a liquid crystal display (LCD)

FIG. 5 is a first portion of a flowchart illustrating the operation of the LCD 51.

Figure 6:
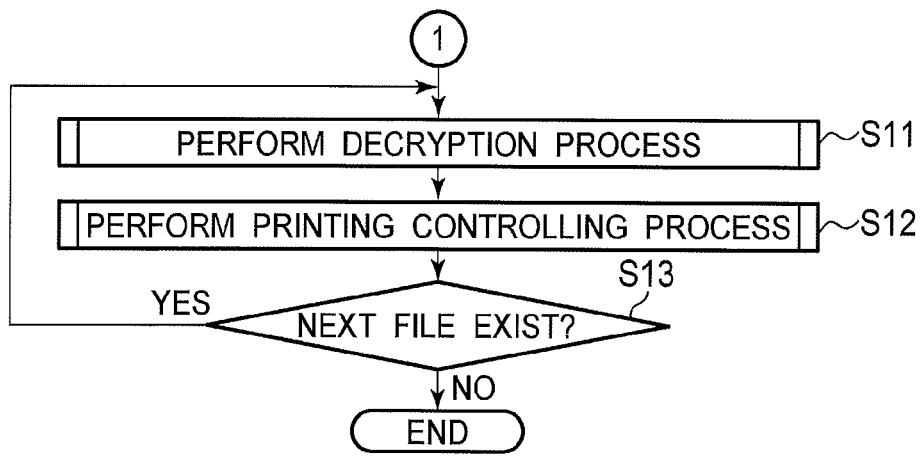
FIG. 6 is a second portion of a flowchart illustrating the operation of the LCD.

FIG. 6 is a second portion of the flowchart illustrating the operation of the LCD 51.

Figure 10:
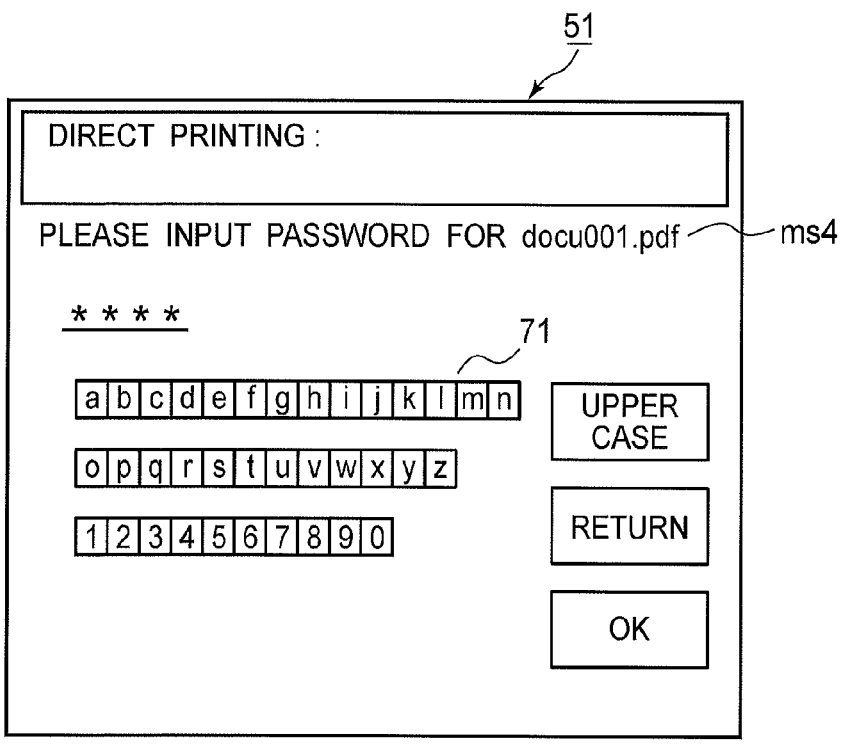
FIG. 10 illustrates a third exemplary display of the LCD.

FIG. 10 illustrates a third exemplary display of the LCD 51.

Figure 11:
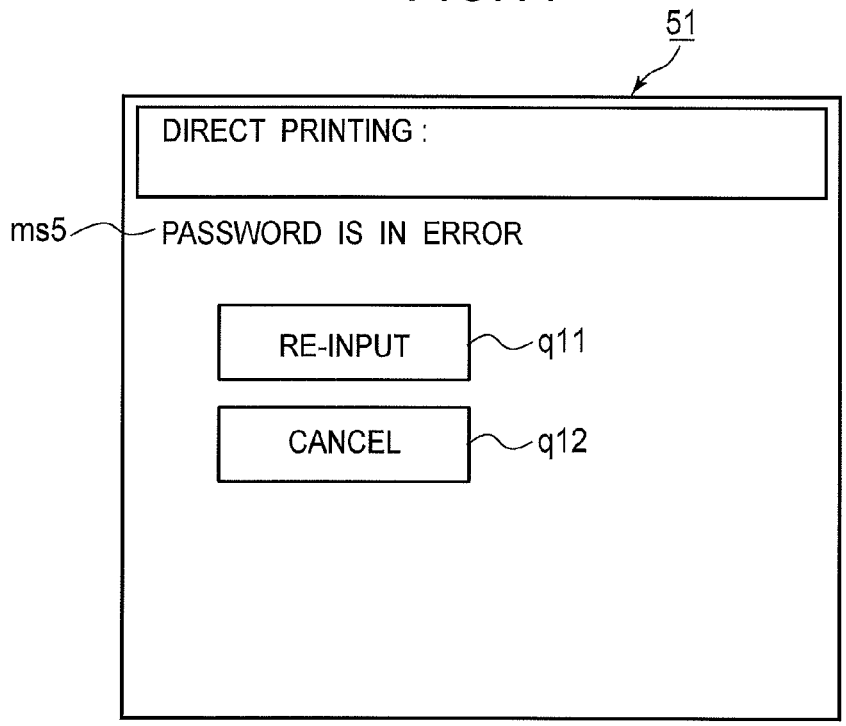
FIG. 11 illustrates a fourth exemplary display of the LCD.

FIG. 11 illustrates a fourth exemplary display of the LCD 51.

Figure 12:
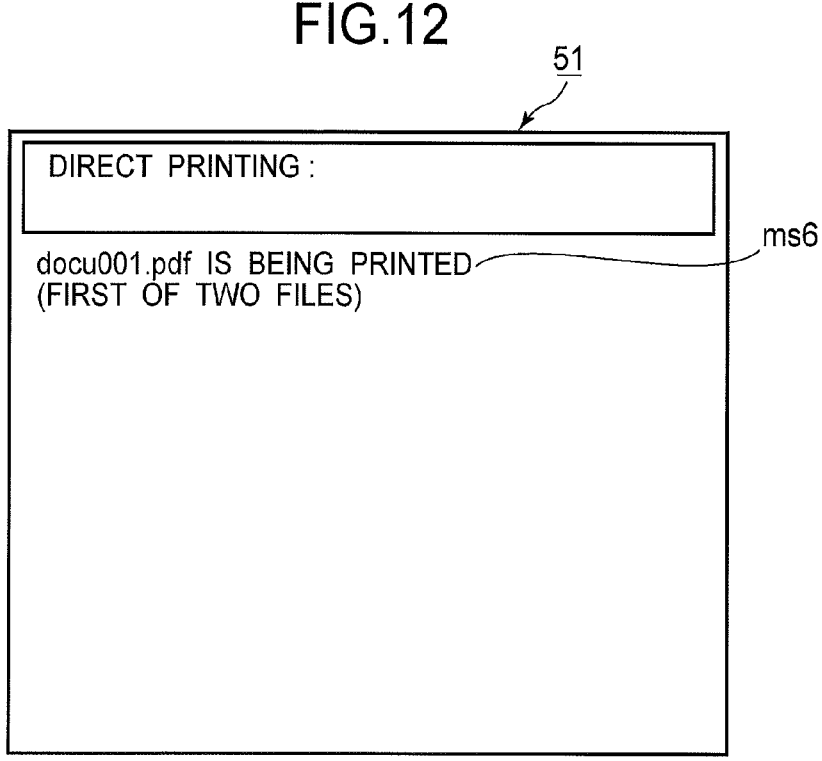
FIG. 12 illustrates a fifth exemplary display of the LCD.

FIG. 12 illustrates a fifth exemplary display of the LCD 51.

Figure 13:
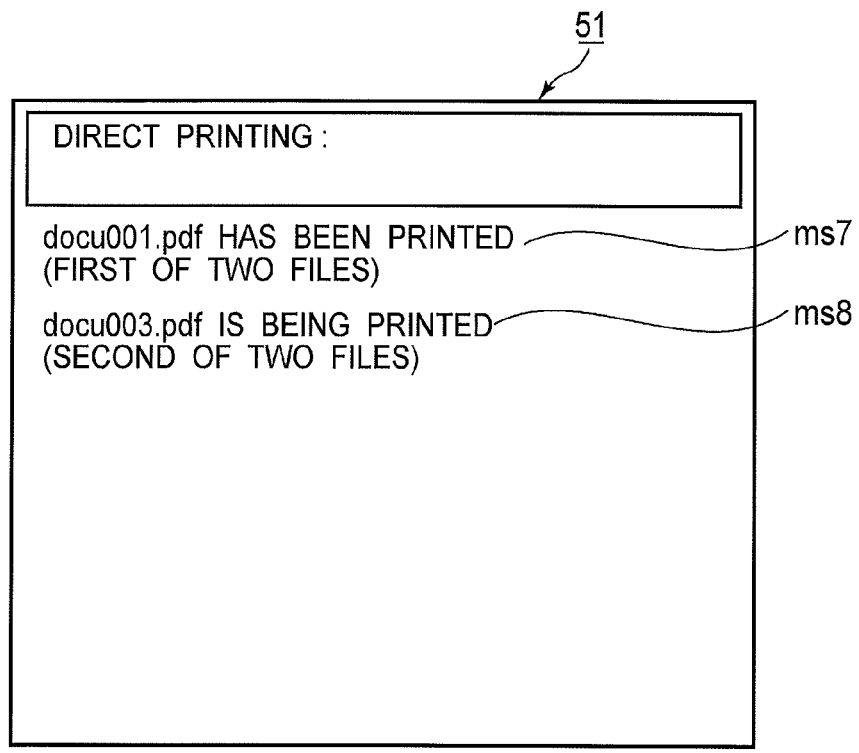
FIG. 13 illustrates a sixth exemplary display of the LCD.

FIG. 13 illustrates a sixth exemplary display of the LCD 51.

Referring to FIG. 5, the user depresses the button k4 (FIG. 3) to select the direct printing function (S1). Then, the display processing section 14 causes the LCD 51 to display an initial screen as shown in FIG. 3, which in turn displays a message ms1. The menu m1 has keys q1 to q3 indicating the storage media that hold files: the HDD 43, the USB memory 101, and the memory on the network server. The message ms1 prompts the user to select a storage device from which a file should be read (S2).

Figure 7:
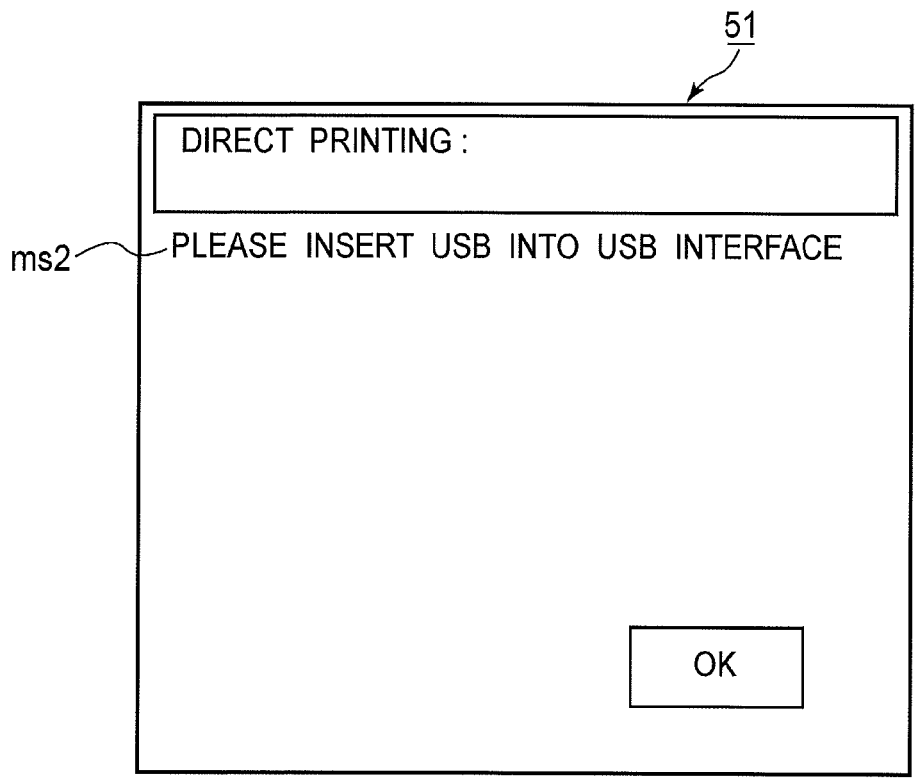
FIG. 7 illustrates a first exemplary display of the LCD.

FIG. 7 illustrates a first exemplary display of the LCD 51. The user touches, for example, the key q2 on the LCD 51 to select the USB memory 101, the display processing section 14 causes the LCD 51 to display a guide screen shown in FIG. 7. The guide screen shows a message ms2, which prompts the user to insert the USB memory 101 into the USB interface 34.

Figure 8:
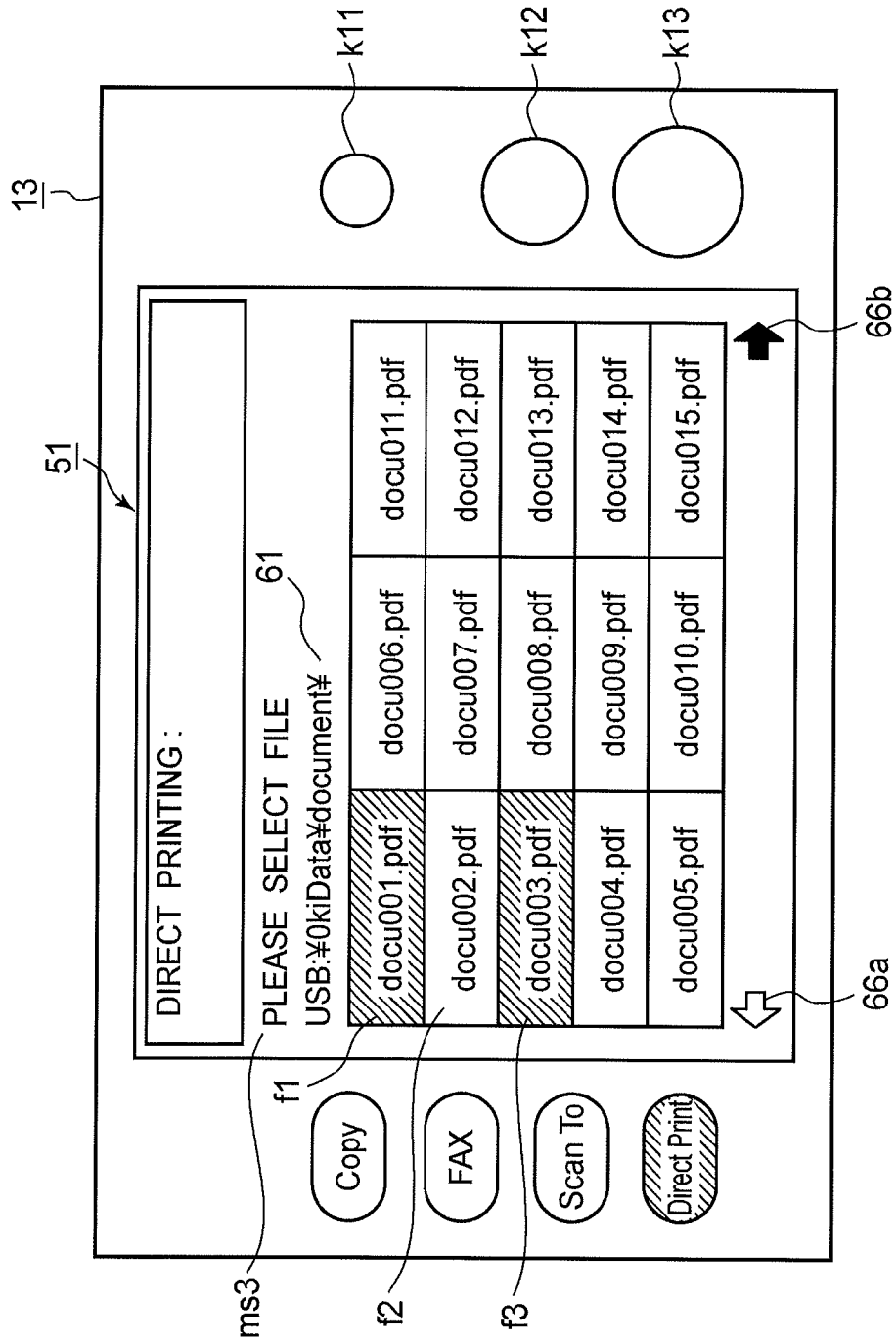
FIG. 8 illustrates a second exemplary display of the LCD.

FIG. 8 illustrates a second exemplary display of the LCD 51.

Once the user has inserted the USB memory 101 into the USB interface 34, the USB memory I/O controller 21 detects that the USB memory 101 has been inserted into the USB interface 34. The display processing section 14 causes the LCD 51 to display a file selection screen shown in FIG. 8. The file selection screen displays a message m3 and a list of files f(i) (i=1, 2, . . . , n) stored in the USB memory 101, thereby prompting the user to select a file(s) to be printed (S3). The file selection screen is also configured to display a list of files stored in the internal storage device including HDD, so that the user is allowed to randomly select files from the external storage device and the internal storage device.

The LCD 51 displays the file selection screen and shift keys 66a and 66b. If the user wants to find other files, he operates the shift key 66a to scroll the screen leftward or the shift key 66b to scroll the screen rightward.

Subsequently, the user selects desired files, for example, f(1) and f(3) from the files displayed in the file selection screen, by touching the files f(1) and f(3). The display processing section 14 displays the characters and background of files f(1) and f(3) by reversing black and white. For simplicity, FIG. 8 illustrates the selected f(1) and f(3) by shading.

The file selecting section 15 then selects the files f(1) and f(3), and the file extracting section 103 reads the files f(1) and f(3) from the USB memory 101 (S4).

Next, once the user has depressed the button k12, monochrome printing is initiated using the direct printing function. If the user depresses the button k13, color printing is initiated using the direct printing function.

Subsequently, the password determining section 105 performs a password determining process to determine whether a first selected one of the files f(1) and f(3) is protected by a password.

The file selecting section 15 then notifies the encrypted file detecting section 22 of the name of the file f(1) and the storage device from which the file f(1) is read out. The encrypted file detecting section 22 then sends a request to read file data to the file system controller 20.

Figure 9:
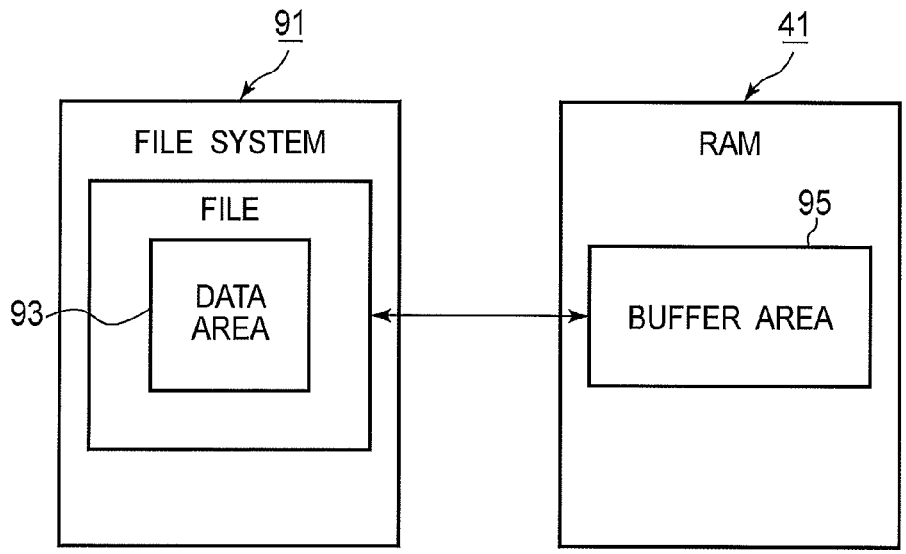
FIG. 9 illustrates the operation of a file system controller.

FIG. 9 illustrates the operation of the file system controller 20. Upon reception of the request to read file data, the file system controller 20 defines a buffer area 95 of a predetermined size in the RAM 41 as shown in FIG. 9. The file system controller 20 then accesses a file system 91 of the USB memory 101 to copy the file data, which describes the content of the file f(1), from the file system 91 into the buffer area 95. The password and other signals stored in a data area 93 of the file f(1) are also copied as a part of the file data, and are stored into the buffer area 95.

Therefore, the encrypted file detecting section 22 can refer to the file data of the file f(1) indirectly via the buffer area 95.

The encrypted file detecting section 22 then accesses the extension of the file f(1) and the information in the starting area of the file f(1) to determine the location of the data area 93 in the file f(1). The encrypted file detecting section 22 reads the data from the buffer 95, and sends the data to the password determining section 105. The password determining section 105 checks the data to determine whether the data contains a password, thereby determining whether the file f(1) is protected by a password (S5).

If the file f(1) is protected by a password (Y at S6), then the display processing section 14 generates a password inputting screen shown in FIG. 10, and causes the liquid crystal display (LCD) 51 to display the password inputting screen. The password inputting screen shows the name of the file f(1), the message ms4 prompting the user to input the password for the file f(1), and displays a list 71 of characters used in inputting the password. The user touches some of the characters to input a password, in response to which, the password inputting section 16 performs a password inputting process to read the password inputted by the user, and then notifies the password verifying section 23 of the information on the folder 61 that holds the file f(1). The information includes the password, the name of the file f(1), and the location of the folder 61 stored in the file f(1) (S7).

The password verifying section 23 performs a password verifying process to read the password from the buffer area 95 via the file system controller 20, and then executes an algorithm to determine whether the password inputted by the user and the password read from the buffer area 95 coincide, and then notifies the CPU 40 of the results (S8).

If it is determined that the file f(1) is not protected by a password (N at S6) or that the passwords coincide (Y at S9), the next-file determining section 107 of the CPU 40 determines whether determine whether there is a selected file (e.g., f(3) in this embodiment) that has not been subjected to the password determining process and the password verifying process yet (S10). If, for example, the file f(3) exists (Y at S10), the file f(3) is subjected to the password inputting process performed by the password inputting section 16, the password determining process performed by the password determining section 105, and the password verifying process performed by the password verifying section 23.

If the passwords do not coincide (N at S9), the display processing section 14 prompts the user to input a password again. That is, the display processing section 14 displays a message mss in the password re-inputting screen, informing the user that the passwords do not coincide. The display processing section 14 also displays a key q11 indicative of re-inputting of the password, and a key q12 indicative of cancelling of printing and the verification of password, thereby prompting the user to re-input the password or to cancel printing. If the user touches the key q11, the display processing section 14 again causes the LCD 51 to display the password inputting screen. If the user touches the key q12, the CPU 40 terminates the process shown in FIG. 5, and the display processing section 14 again causes the LCD 51 to display the initial screen as shown in FIG. 3. The passwords inputted by the user for the files f(1) and f(3) and the passwords read from the buffer area 95 during the password verifying process are stored as intermediate data into the RAM 41, so that these items of data may be used whenever they are necessary.

When the passwords do not coincide (N at S9), if the user touches the key q12 in the password re-inputting screen shown in FIG. 11, the CPU 40 terminates the process shown in FIG. 5. Alternatively, the selection of a file may be invalidated if the file is cancelled and the password verifying process may be performed on the other files selected by the user.

Once the password determining process, password inputting process, and password verifying process have been performed on all of f(1) and f(3) (N at S10), the encrypting/decrypting section 25 sends information, which includes the name of the files f(1) and f(3) and the location of the folder 61 that holds the files f(1) and f(3), to the data converting section 26.

The data converting section 26 performs a data converting process. The data converting section 26 receives the information including the names of the files f(1) and f(3) and the location of the folder 61 holding the files (1) and f(3), and then reads the file data of the files f(1) and f(3) from the buffer area 95 in sequence, and then sends the file data to the decrypting section 24.

The decrypting section 24 performs a decryption process. That is, the decrypting section 24 receives the file data of the files f(1) and f(3) from the data converting section 26, and detects a region of encrypted document data of the first selected file (i.e., f(1) in the first embodiment). The decrypting section 24 then reads the encrypted document data to produce a plain text (S11).

The decrypting section 24 decrypts the document data based on the intermediate data using a decryption algorithm. The decryption algorithm is selected in accordance with the file format and encryption algorithm.

The plain text is sent as a print data to the printing controller 27.

The printing controller 27 performs a printing controlling process in which the print engine 37 prints the image of the print data on print paper. The display processing section 14 causes the LCD 51 to display a printing progress status screen as shown in FIG. 12 on the LCD 51. The printing progress status screen displays a message ms 6 indicating that the file f(1) is being printed (S12).

The next-file determining section 107 performs the next file determining process to determine whether there is a selected file (e.g., f(3) in this embodiment) that has not been subjected to the decryption process and printing controlling process yet (Y at S13), then the decryption process and printing controlling process are performed on the file f(3). In this case, the display processing section 14 causes the LCD 51 to display the printing progress status screen as shown in FIG. 13. The printing progress status screen displays a messages ms7 indicating that printing of the file f(1) has completed and a messages ms 8 indicating that the file f(3) is being printed (S12).

In this manner, once the decryption process, printing controlling process, and other processes have been completed, the CPU 40 completes the direct printing (N at S13).

The first embodiment has been described with respect to a case in which the files f(1) and f(3) are selected via the file selection screen shown in FIG. 8. If the files f(1), f(2), and f(3) are selected and are protected by passwords, the print engine 37 prints the files f(1), (2), and (3) after the password verifying process has been successfully completed.

In the first embodiment, the password determining process, password inputting process, and password verifying process are performed on the files f(i) selected by the user and obtained from the USB memory 101. The following files are then printed in sequence: files that are not protected by passwords, files that are protected by passwords, and password-verified files in sequence. This minimizes user's intervention in printing operations.

A built-in memory or a storage terminal external to the multi function peripheral 11 (e.g., server) may be used in place of the USB memory 101.

The flowchart shown in FIGS. 5 and 6 will be described.

S1: The user depresses the button k4 to select the direct printing function.

S2: The message ms1 prompts the user to select a storage device from which a file should be extracted.

S3: The file selection screen displays a message m3 and a list of files f (i) (i=1, 2, ..., n) stored in the USB memory 101.

S4: The file extracting section 103 reads the selected files f (i) (i=1, 2, 3, ...).

S5: The password determining section 105 performs the password determining process.

S6: The password determining section 105 makes a decision to determine whether the selected files are protected by passwords. If protected, the program proceeds to S7. If not protected, the program proceeds to S10.

S7: The password inputting section 16 performs the password inputting process to read the password.

S8: The password verifying section 23 performs the password verifying process.

S9: The password verifying section 23 makes a decision to determine whether the passwords coincide. If the passwords coincide, the program proceeds to S10. If the passwords do not coincide, the program jumps back to S7.

S10: The next-file determining section 107 of the CPU 40 determines determine whether there is a selected file (e.g., f(3) in this embodiment) that has not been subjected to the password determining process and the password verifying process yet. If a file exists, the program jumps back to S5. If a file does not exist, the program proceeds to S11.

S11: The decrypting section 24 performs the decryption process.

S12: The printing controller 27 performs the printing controlling process.

S13: The next-file determining section 107 performs the next file determining process to determine whether there is a selected file (e.g., f(3) in this embodiment) that has not been subjected to the decryption process and printing controlling process yet. If a file to be subjected to the decryption process exists, then the program proceeds to S11. If a file to be subjected to the decryption process does not exist, then the program ends.

Second Embodiment

In the first embodiment, the printing controlling process is initiated only after the password verifying process has been performed on all of the selected files. Therefore, printing controlling process cannot be performed until the password determining process and password verifying process have been completed. The first embodiment alleviates cumbersome intervention of the user between consecutive print jobs but has an obstacle to the overall printing efficiency of the image forming apparatus.

A second embodiment permits simultaneous performing of the printing controlling process, the password determining process, and password verifying process. In other words, the user is allowed to input passwords for a plurality of files in succession while printing of a file is being carried out. Elements similar to those of the first embodiment have been given the same reference numerals and their description is omitted. The effects obtained from the first embodiment can also be obtained from the second embodiment having the same configuration as the first embodiment.

Figure 14:
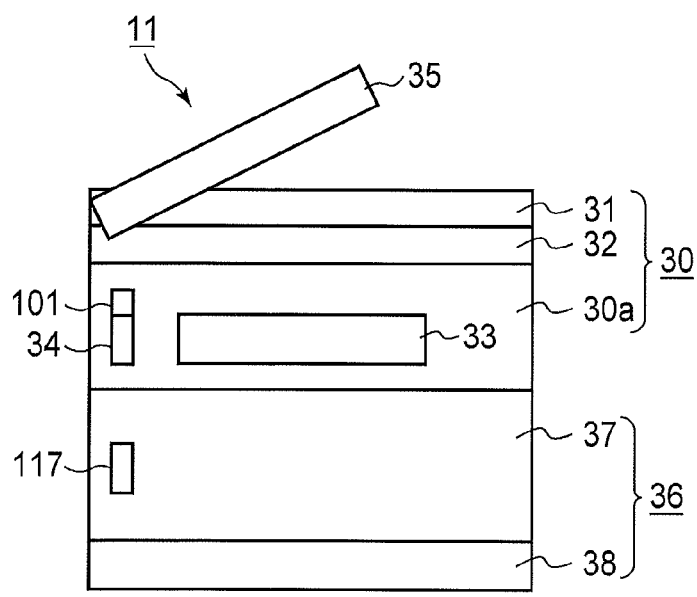
FIG. 14 illustrates the outline of a multi function peripheral according to a second embodiment.
Figure 15:
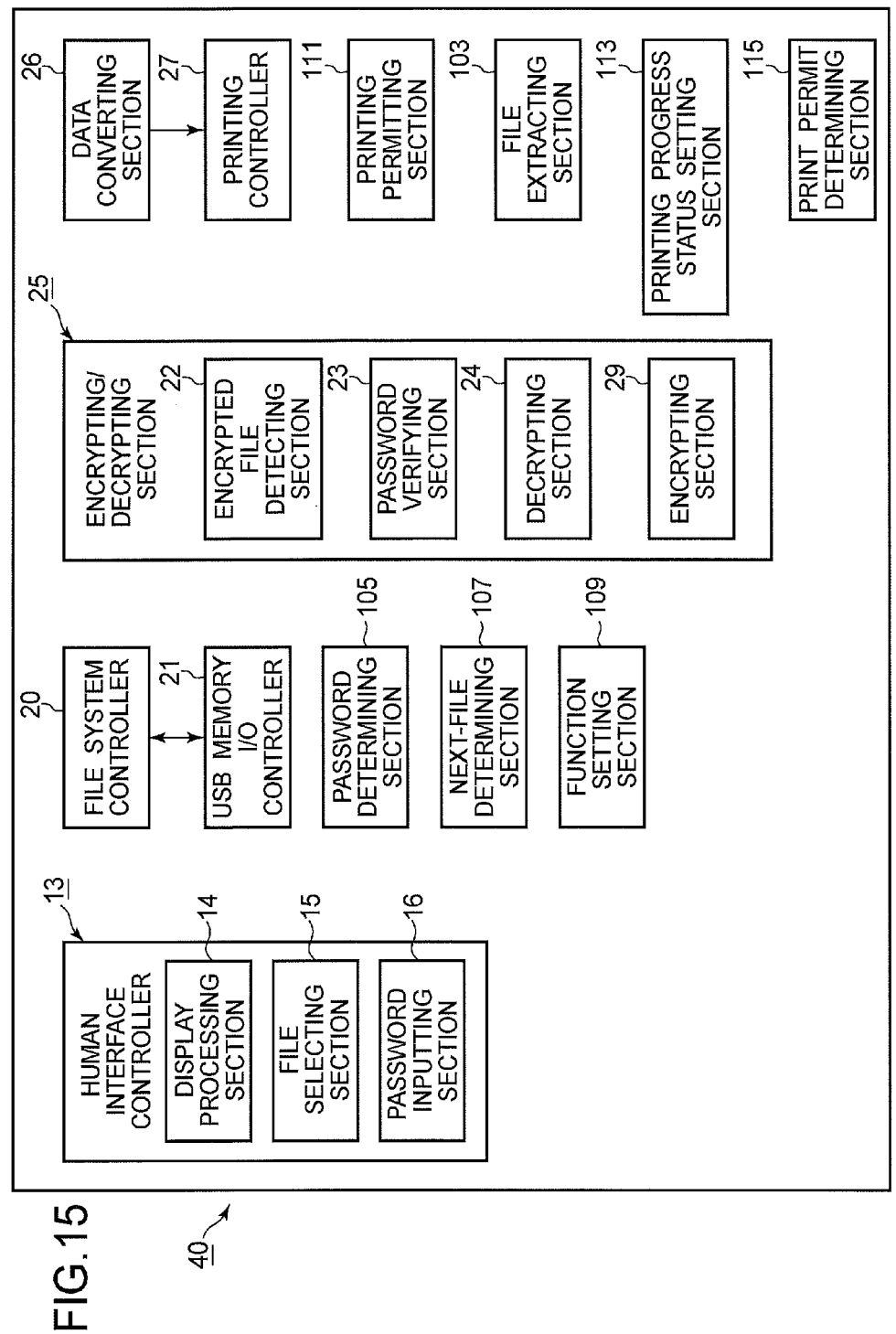
FIG. 15 is a functional block diagram illustrating the multi function peripheral according to the second embodiment.

FIG. 14 illustrates the outline of a multi function peripheral 11 according to the second embodiment. FIG. 15 is a functional block diagram illustrating the multi function peripheral 11.

The first operation of the multi function peripheral 11 as an image forming apparatus will be described with reference to FIG. 16.

Figure 16:
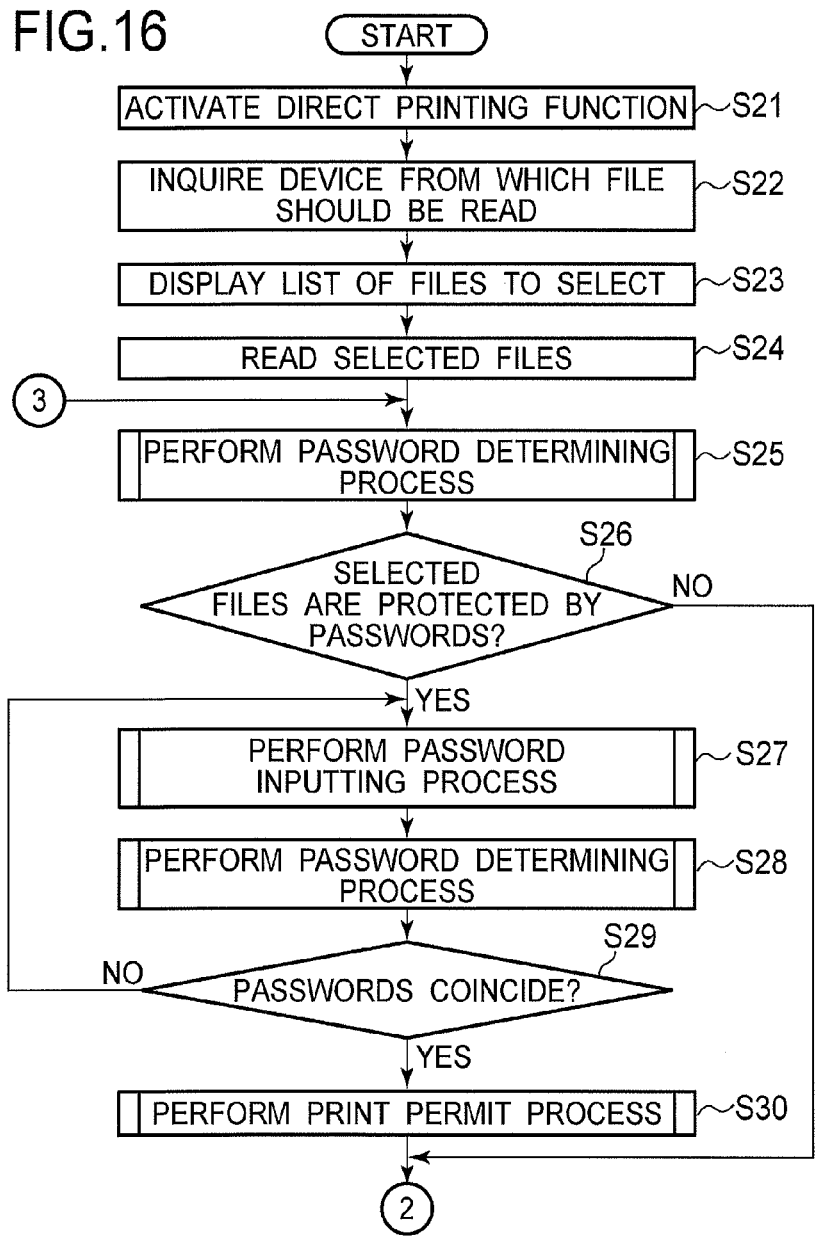
FIG. 16 is a first portion of a flowchart illustrating a first operation of the multi function peripheral.

FIG. 16 is a first portion of a flowchart illustrating a first operation of the multi function peripheral 11. The user selects a direct printing function through a human interface 33 (FIG. 3). A function setting section 109 sets the multi function peripheral 11 to the direct printing function (S21). The display processing section 14 generates an initial screen (FIG. 3), which then appears on an LCD 51. The initial screen shows a message msl that prompts the user to select a storage device from which a file is to be read (S22).

The user touches, for example, a key q2 in the initial screen to select the USB memory 101. The display processing section 14 then causes the LCD 51 to display a guide screen shown in FIG. 7. The guide screen shows a message ms2, which prompts the user to insert the USB memory 101 into the USB interface 34.

Once the user has inserted the USB memory 101 into the USB interface 34, the USB memory I/O controller 21 detects that the USB memory 101 has been inserted into the USB interface 34. The display processing section 14 generates a file selection screen shown in FIG. 8, thereby displaying a message ms3 and files f (i) (i=1, 2, . . . , n) stored in the USB memory 101. The message ms3 prompts the user to select a file(s) to be printed (S23).

Subsequently, the user selects his desired files, for example, f(1) and f(3) from the files displayed in the file selection screen, by touching the files f(1) and f(3). The display processing section 14 displays the characters and background of files f(1) and f(3) by reversing black and white. The file selecting section 15 selects the files f(1) and f(3), and the file extracting section 103 reads the files f(1) and f(3) from the USB memory 101 (S24).

Next, if the user depresses the button k12, monochrome printing is initiated using the direct printing function. If the user depresses the button k13, color printing is initiated using the direct printing function.

Subsequently, the password determining section 105 performs a password determining process to determine whether a first selected one of the files f(1) and f(3) is protected by a password (S25).

If the file f(1) is protected by a password (Y at S26), then the display processing section 14 generates a password inputting screen shown in FIG. 10, and causes the LCD 51 to display the password inputting screen. The password inputting screen shows the name of the file f(1) and the message ms4 that prompts the user to input the password for the file f(1). Once the user has inputted a password, the password inputting section 16 reads the password inputted by the user, and then notifies the password verifying section 23 of information including the password, the name of the file f(1), and the location of a folder 61 that holds in the file f(1) (S27).

The password verifying section 23 makes a decision to determine whether the password inputted by the user and the password read from a buffer area 95 coincide (S28). If the passwords coincide (Y at S29), a printing permitting section 111 of a CPU 40 performs a printing permitting process, thereby permitting printing of the file f(1) (S30).

Figure 17:
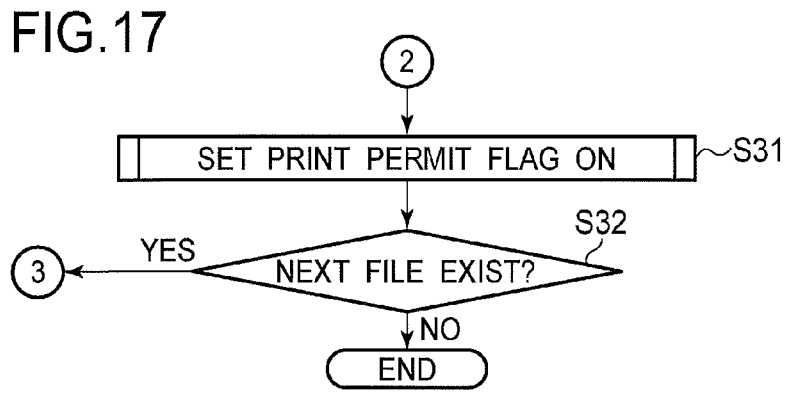
FIG. 17 is a second portion of the flowchart illustrating a second operation of the multi function peripheral.

FIG. 17 is a second portion of the flowchart illustrating a second operation of the multi function peripheral 11. If the password determining section 105 determines that the file f(1) is not protected by a password (N at S26), or after the printing permitting section 111 permits printing of the file f(1), a printing permit setting section 113 performs a print permit setting process, thereby setting a print permit flag to ON indicating that printing of the file f(1) has been permitted (S31).

If the passwords do not coincide (N at S29), the display processing section 14 prompts the user to input a password again. That is, the display processing section 14 displays a message mss in the password re-inputting screen to inform the user that the passwords do not coincide, and to prompt the user to input the correct password.

The next-file determining section 107 makes a decision to determine whether there is a selected file (e.g., f(3) in this embodiment) that has not been subjected to the password determining process, the password verifying process, and the printing permitting process yet (S32). If the next file remains unprocessed (Y at S32), necessary processes including the password determining process, password inputting process, password verifying process, and printing permitting process are performed. If there is not a selected file (e.g., f(3) in this embodiment) that has not been subjected to the decryption process and printing controlling process yet (N at S32), the CPU 40 terminates the direct printing function.

The CPU 40 also performs the printing controlling process while the password determining process and password verifying process are being performed simultaneously.

Figure 18:
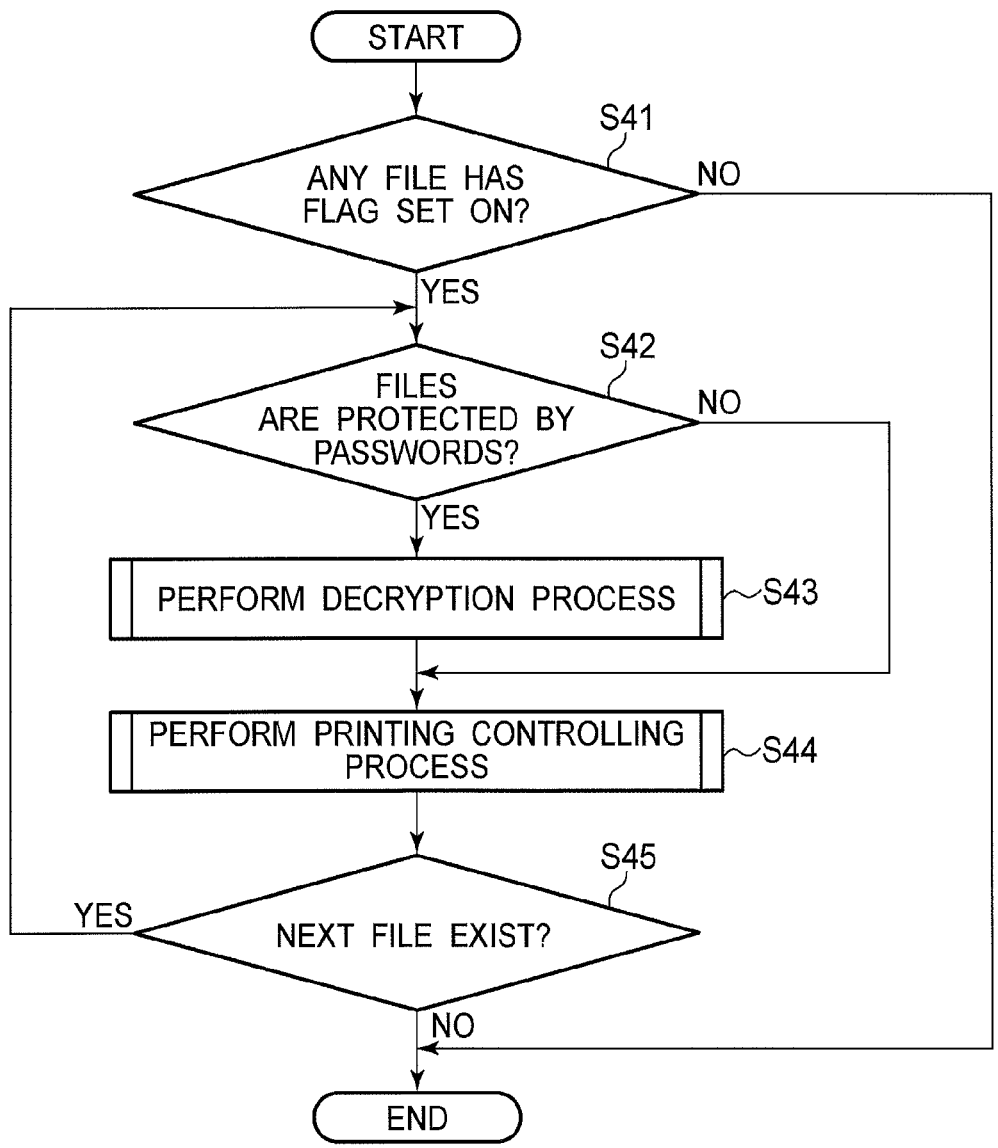
FIG. 18 is a second flowchart illustrating the operation performed at the same time that the first operation.

FIG. 18 is a second flowchart illustrating the operation performed at the same time that the first operation.

A description will be given of the second operation of the multi function peripheral 11 in which the printing controlling process is performed. In this case, a timer 117 (FIG. 14) is employed so that the second operation is performed every time a predetermined time elapses.

A print permit determining section 115 of the CPU 40 performs a print permit determining process in which a decision is made to determine whether a print permit flag is set ON for selected files, for example, f(1) and f(3). If the files f(1) and f(3) have the print permit flag set to ON (Y at S41), the password determining section 105 selects the files f(1) and f(3) in sequence, and performs a password determining process to determine whether a first selected one of the files f(1) and f(3) is protected by a password. If no file has its print permit flag set to ON (N at S41), the timer 117 is reset and the program ends.

If the file f(1) is protected by a password (Y at S42), an encrypting/decrypting section 25 sends the name of the file f(1), location of the folder 61 that holds the file f(1), and other information to a data converting section 26.

The data converting section 26 reads the file data of the file f(1) from the buffer area 95, and sends the file data to a decrypting section 24. Upon reception of the file data, the decrypting section 24 detects the region of encrypted document data, and then reads the encrypted document data. The decrypting section 24 decrypts the encrypted document data into a plain text (S43).

If the file f(1) is not protected by a password (N at S42), the file f(1) need not be decrypted and therefore the printing controller 27 performs the printing controlling process without performing the decryption process (S44).

The document data that has been decrypted into the plain text is then sent as print data to the printing controller 27. The printing controlling section 27 causes a print engine 37 of a variety of types (e.g., wire dot, ink-jet, or electrophotographic) to print the print data on the print paper (S44). The display processing section 14 generates a printing progress status screen as shown in FIG. 12 and causes the LCD 51 to display the printing progress status screen, the printing progress status screen displays a message ms6 indicating that the file f(1) is being printed.

The next-file determining section 107 makes a decision to determine whether there is a file (e.g., f(3)) that has not been subjected to the decryption process and printing controlling process yet (S45). If there is a file that has not been subjected to decryption process and printing controlling process (Y at S45), necessary processes including the decryption process and printing controlling process are performed, in which case, the file selecting section 15 causes the LCD 51 to display messages ms7 and ms8 in the printing progress status screen as shown in FIG. 13. The messages ms7 indicates that the printing of the file f(1) has been completed and the message ms8 indicates that the file f(3) is being printed. After the decryption process, printing controlling process, and other processes have been completed for all of the files f(i) (i=1, 2, 3, . . . ), the CPU 40 terminates the direct printing function (N at S45).

The second embodiment has been described with respect to a case in which the files f(1) and f(3) are selected via a file selection screen shown in FIG. 8. If the files f(1), f(2), and f(3) are selected and are protected by passwords, the print engine 37 begins to print the files f(1), f(2), and f(3) upon completion of the password verifying process of f(1) and f(2) while the password verifying process is still being performed on the file f(3).

As described above, in the second embodiment, the printing controlling process is performed while the password verifying process and the password determining process are being performed so that files not protected by passwords and files that have passed the password verifying process can be printed in sequence. This improves the overall efficiency of the image forming apparatus.

The flowchart shown in FIGS. 16 and 17 will be described briefly.

S21: The function setting section 109 sets the multi function peripheral 11 to the direct printing function.

S22: The menu m1 inquires a storage device from which a file should be read.

S23: The liquid crystal display (LCD) 51 displays a list of files to select.

S24: The file extracting section 103 reads selected f(i) (i=1, 2, 3, . . .).

S25: The password determining section 105 performs the password determining process.

S26: The password determining section 105 makes a decision to determine whether the selected files f(i) are protected by passwords. If protected, the program proceeds to S27. If not protected, the program proceeds to S31.

S27: The user inputs a password.

S28: The password verifying section 23 performs a password verifying process.

S29: The password verifying section 23 makes a decision to determine whether the passwords coincide. If the passwords coincide, the program proceeds to S30. If the passwords do not coincide, the program jumps back to S27.

S30: The printing permitting section 111 performs a printing permitting process.

S31: The printing permit setting section 113 performs a print permit setting process.

S32: The next-file determining section 107 makes a decision to determine whether there is a file (e.g., f(3) in the second embodiment) has not been subjected to the password determining process, password verifying process, and printing permitting process yet. If a file to be subjected to the decryption process exists, then the program proceeds to S25. If a file to be subjected to the decryption process does not exist, then the program ends.

The flowchart shown in FIG. 18 will be briefly described.

S41: A decision is made to determine whether a file has the printing permit flag set to ON. If a file has the print permit flag set to ON, the program proceeds to S42. If no file has the print permit flag set to ON, the program ends.

S42: A decision is made to determine whether selected files f(i) (i=1, 2, 3, . . .) that have their print permit flags set to ON are protected by passwords. If the files are protected by passwords, the program proceeds to S43. If the files are not protected by passwords, the program proceeds to S44.

S43: The decrypting section 24 performs the decryption process.

S44: The printing controller 27 performs the printing controlling process.

S45: A decision is made to determine a file to be checked whether the file is protected by a password. If any file to be checked exists, the program jumps back to S42. If no file to be checked exists, the program ends.

Third Embodiment

A third embodiment will be described in terms of a multi function peripheral 11.

Figure 19:
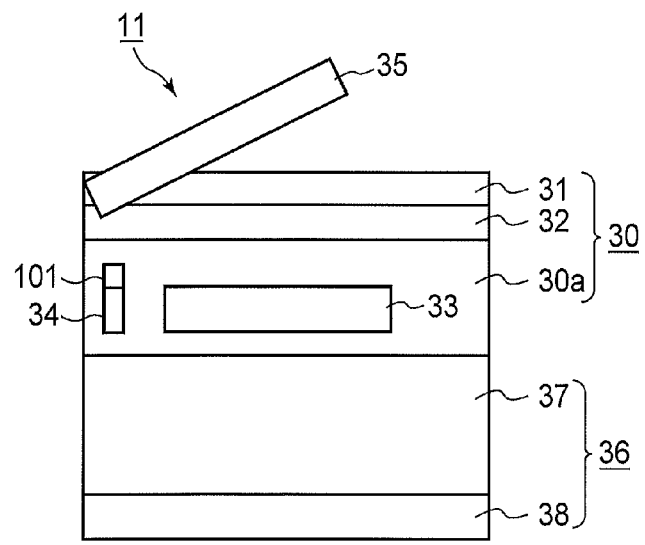
FIG. 19 illustrates the general concept of a multi function peripheral 11 according to a third embodiment.
Figure 20:
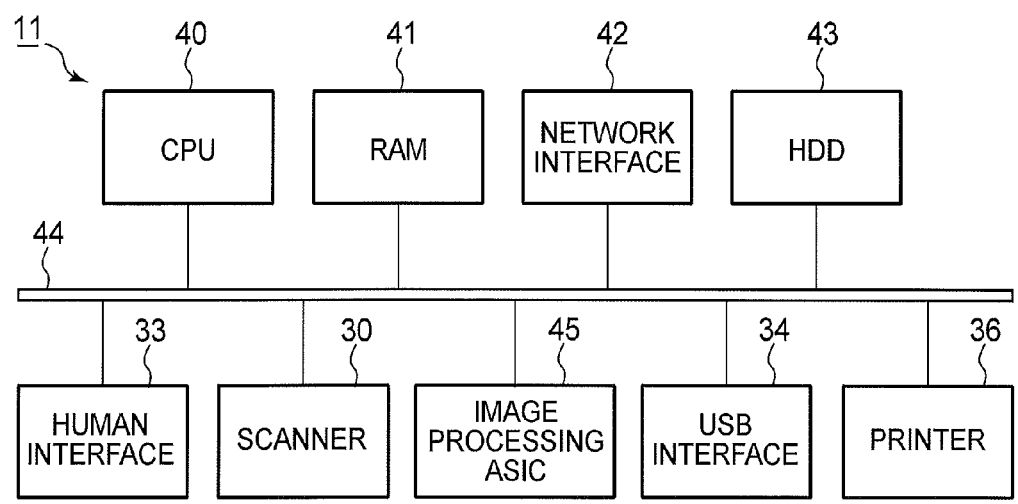
FIG. 20 is a control block diagram of the multi function peripheral.

FIG. 19 illustrates the general concept of the multi function peripheral 11 according to a third embodiment. FIG. 20 is a control block diagram of the multi function peripheral 11.

Referring to FIG. 19, the multi function peripheral 11 includes a scanner 30, a human interface 33, a USB interface 34, an automatic document feeder (AFD) 35, and a printer 36. The AFD 35 supports a plurality of pages of an original document and feeds them on a page-by-page basis to the scanner 30. The printer 36 includes a print engine 37 of a variety of types, e.g., wire dot, ink-jet, or electrophotographic, a paper cassette 38 that holds a stack of print media (e.g., paper) and feeds the print medium to the print engine 37.

The scanner 30 includes a scanning section 30*a* that reads the image of the original document, a flat bed 32 that is formed of a transparent material, for example, glass or plastic, supports the original document thereon, and is disposed above the scanning section 30*a*, and a scanner cover 31 that covers the flat bed 32 so that light illuminating the original document will not leak outside during the scanning operation.

The USB interface 34 is an interface to which a USB memory 101 is detachably attached. The USB memory 101 holds a plurality of files to be printed using a direct printing function: document files that contain document data and image files that contain image data. The formats of files that can be printed using a direct printing function include PDF and XPS for document files and JPEG, PNG, and TIFF for image files. The USB memory 101 is configured to hold image files read by means of a function of Scan-to-USB Memory of the multi function peripheral 11.

A control unit board of the multi function peripheral 11 supports a CPU 40, a RAM 41, an image processing ASIC 45, a network interface 42, and a hard disk drive (HDD) 43 thereon. The CPU 40 communicates with the scanner 30, the human interface 33, the USB interface 34, and the printer 36 via a bus 44, thereby performing the overall control of the multi function peripheral 11. The RAM 41 serves as a first memory. The image processing ASIC 45 processes images. The network interface 42 connects between the multi function peripheral 11 and an external computer, so that the multi function peripheral 11 communicates with the external computer over a LAN implemented by ETHERNET. The HDD 43 serves as a second memory, i.e., storage device. The image processing ASIC 45 performs high speed image processing on images obtained by scanning an original document and images contained in the files that are to be printed by direct printing. The bus 44 includes a plurality of signal lines used for transmitting and receiving a variety of signals and data and for controlling synchronization of signals and data.

The human interface 33 will be described.

Figure 21:
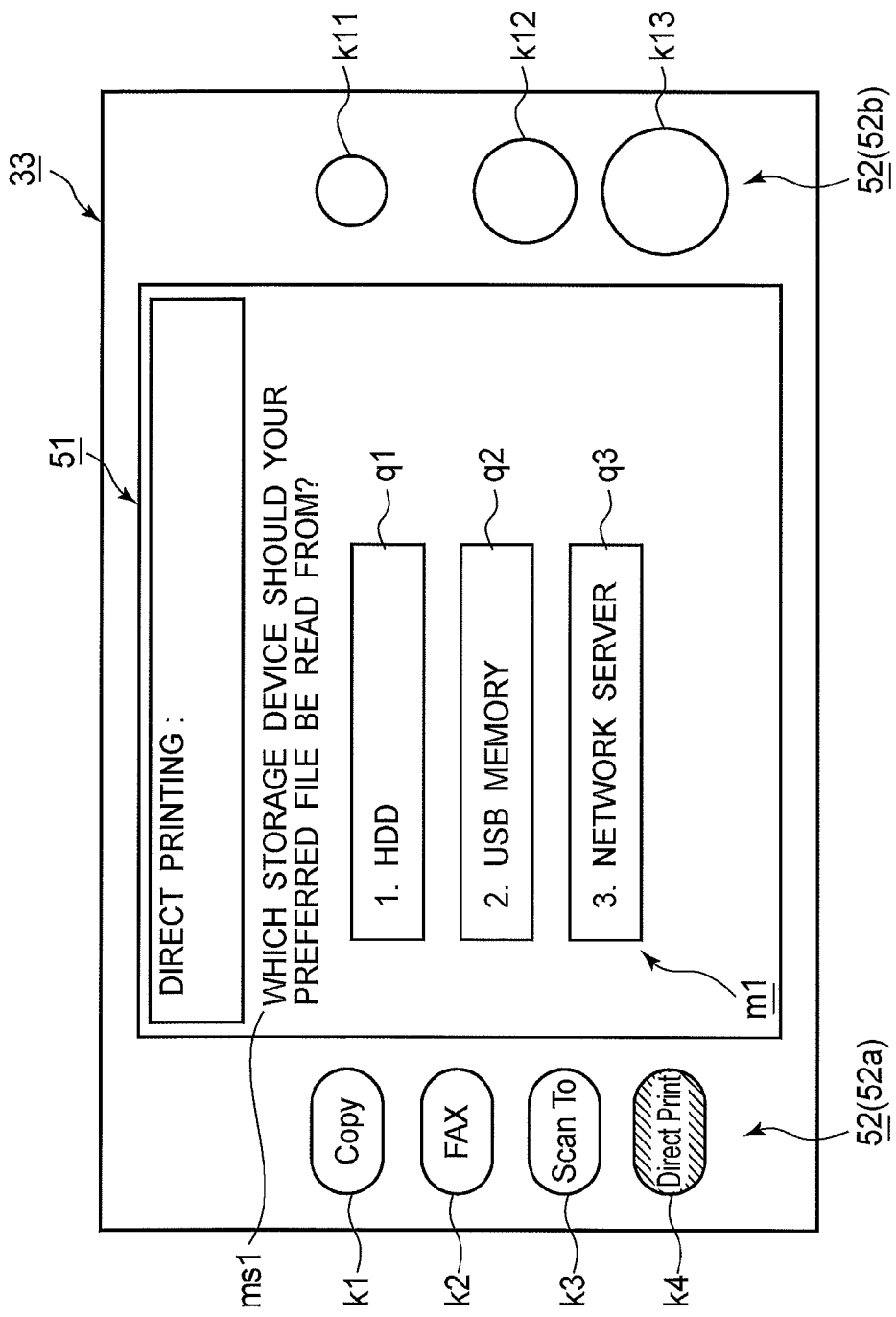
FIG. 21 illustrates a human interface according to the third embodiment.

FIG. 21 illustrates the human interface 33 according to the third embodiment.

A liquid crystal display (LCD) 51 is disposed in the middle of the human interface 33, and displays a variety of screens. Controls 52*a* and 52*b* are disposed around the LCD 51 and include buttons k1 to k4 and k11 to k13. The LCD 51 takes the form of a touch screen and serves as a part of the human interface 33.

The user can select a desired function from among COPY, FAX, SCANTO, and DIRECT PRINTING by depressing corresponding one of the buttons k1 to k4. Also, the user can initiate color printing or color scanning by depressing the button k13, and monochrome printing or monochrome scanning by depressing the button k12. The user can terminate these functions by depressing the button k11.

If the user depresses, for example, button k4, an initial screen for direct printing appears on the LCD 51. The initial screen includes a menu m1 having a plurality of keys q(i)

(i=1, 2, . . .). The user then touches one of the keys q(i) to select a desired item. The LCD 51 may display additional messages ms1 and instructions to the user.

The CPU 40 will be described.

Figure 22:
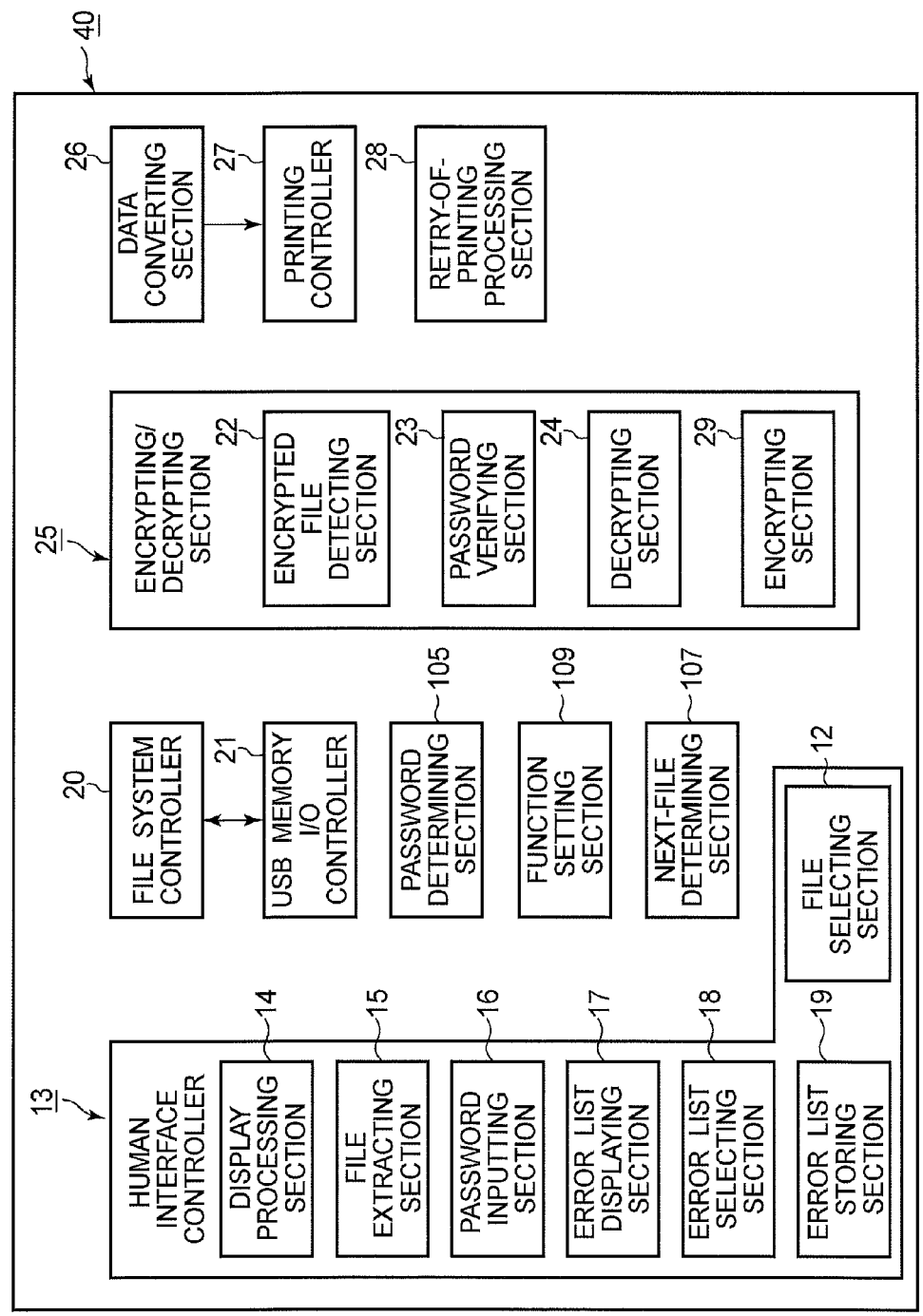
FIG. 22 is a functional block diagram of the multi function peripheral of the third embodiment.

FIG. 22 is a functional block diagram of the multi function peripheral of the third embodiment.

The CPU 40 includes the following sections. A human interface controller 13 controls the human interface 33. A file system controller 20 controls a file system. A USB memory I/O controller 21 controls a USB memory I/O. An encrypting/decrypting section 25 encrypts data and decrypts data. A data converting section 26 performs conversion of data. A printing controller 27 controls printing of data. The human interface controller 13 includes a file selecting section 12, a file extracting section 15, a password inputting section 16, an error list displaying section 17, an error list selecting section 18, and an error list storing section 19. The encrypting/decrypting section 25 includes an encrypted file detecting section 22, a password verifying section 23, and a decrypting section 24.

The CPU 40 performs the overall control of the multi function peripheral 11 by sending appropriate commands to the human interface controller 13, file system controller 20, USB memory I/O controller 21, encrypting/decrypting section 25, data converting section 26, and printing controller 27.

The human interface controller 13 causes the LCD 51 to display messages and commands; obtains signals from the buttons k1 to 44, k11 to k14 when the user depresses the buttons k1 to 44, k11 to k14, and touches keys q(i); manages the settings for a variety of functions; and sends commands for the respective sections to initiate their processing.

The file system controller 20 performs a file system control process in order to access a variety of file systems: the file system of the HDD 43, the file system of the USB memory 101 that can be accessed via the USB interface 34, and the file system on a network server that can be accessed via a network interface 42. The file system controller 20 stores files into and obtains files from the HDD 43, USB memory 101, and storage devices on a network server.

The USB memory I/O controller 21 is a device driver that activates the USB interface 34, obtains a file from the USB memory 101 attached by the user into the USB interface 34 of the multi function peripheral 11. The USB memory I/O controller 21 controls the encrypting/decrypting section 25 so that the encrypting/decrypting section 25 performs an encryption process and a decryption process. The USB memory I/O controller 21A controls the data converting section 26 so that the data converting section 26 performs conversion of data.

Using a string of characters having a fixed length (e.g., 32 bytes) as a key, an encrypting section 29 of the encrypting/decrypting section 25 encrypts data of an arbitrary size that should be encrypted. Likewise, using a string of characters having a fixed length, the decrypting section 24 performs the decryption process to decrypt encrypted data. The string of characters as a key is produced through data conversion based on a password set by the user and information associated with the file to be encrypted or decrypted.

In the third embodiment, a plurality of files stored in the USB memory 101 can be printed using the direct printing function. It would be very inconvenient, if the user has to input passwords immediately prior to the printing of each file protected by a password.

The third embodiment solves this inconvenience. In other words, the user inputs all the passwords for password-protected files before printing is initiated, and is informed of files that failed to be printed for some reasons.

A description will be given of the operation when the multi function peripheral 11 prints a plurality of files.

Figure 23:
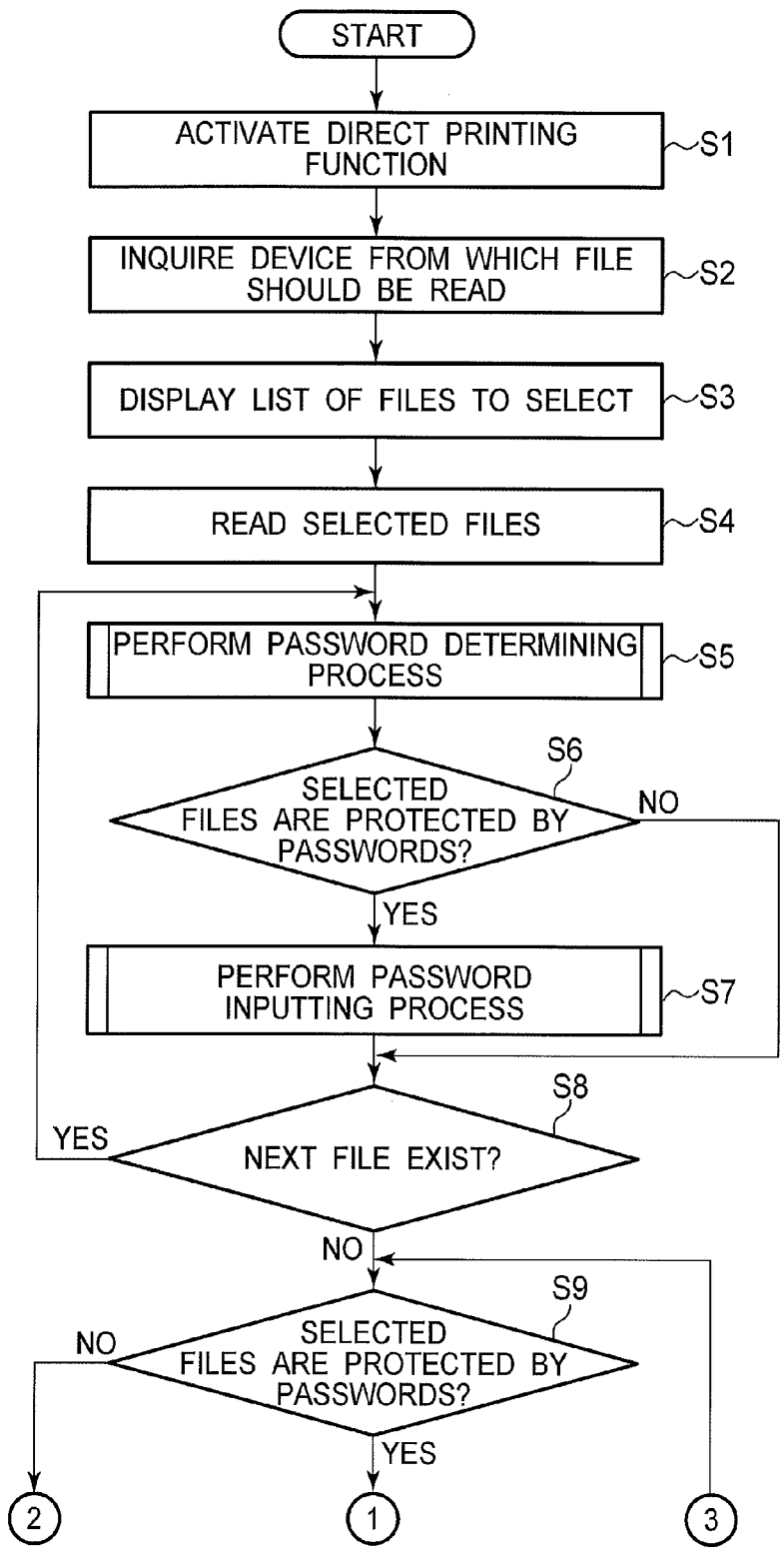
FIG. 23 is a first portion of a flowchart illustrating the operation of a liquid crystal display (LCD)

FIG. 23 is a first portion of a flowchart illustrating the operation of the LCD 51.

Figure 24:
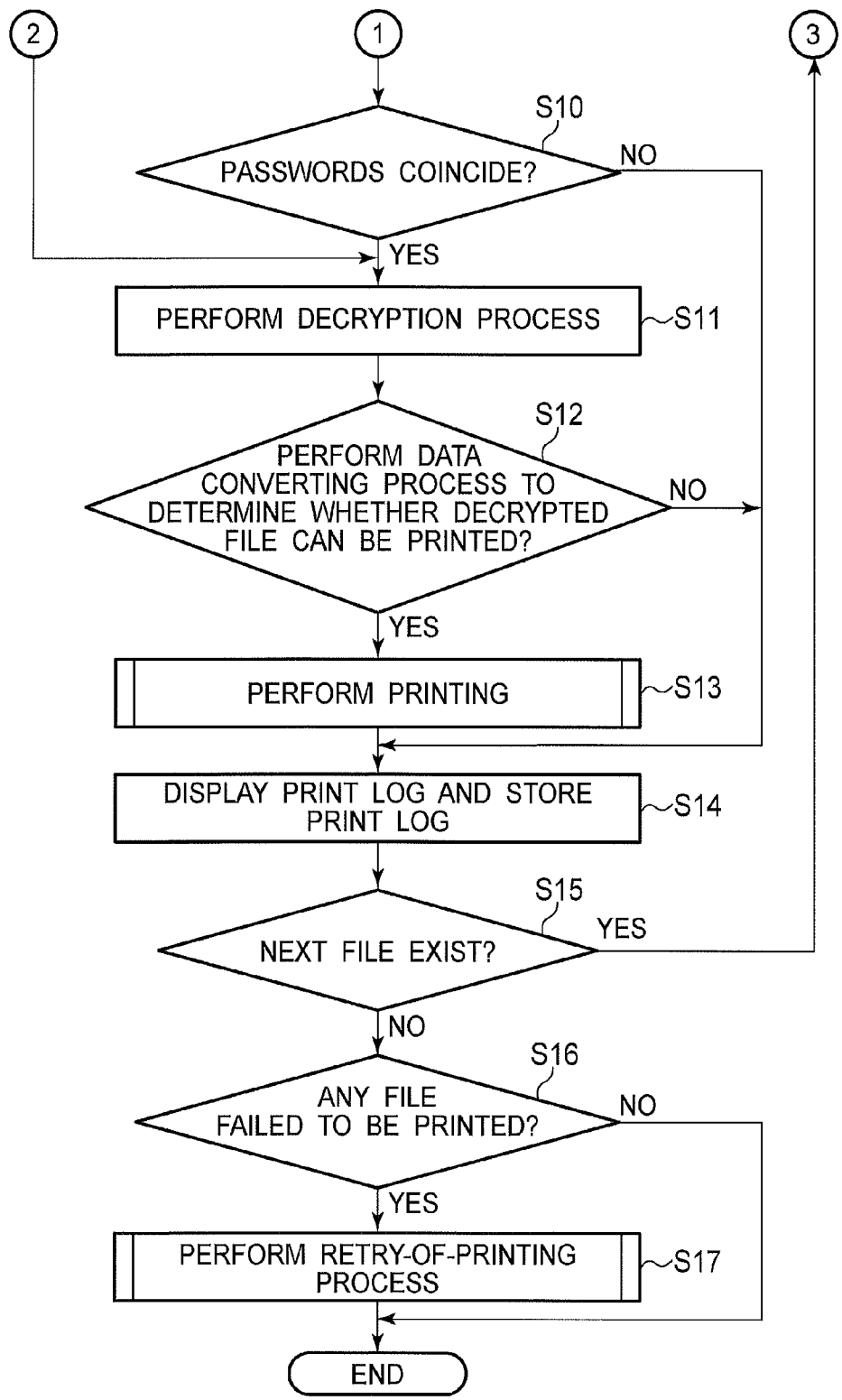
FIG. 24 is a second portion of a flowchart illustrating the operation of the LCD.

FIG. 24 is a second portion of the flowchart illustrating the operation of the LCD 51.

First, the user depresses the button k4 (FIG. 21) to select the direct printing function (S1). Then, a display processing section 14 causes the LCD 51 to display the initial screen as shown in FIG. 21, which in turn displays a message ms1. The menu m1 has keys q1 to q3 indicating the storage devices that hold the files: the HDD 43, the USB memory 101, and the memory on the network server. The message ms1 prompts the user to select a storage device from which a file should be extracted (S2).

Figure 25:
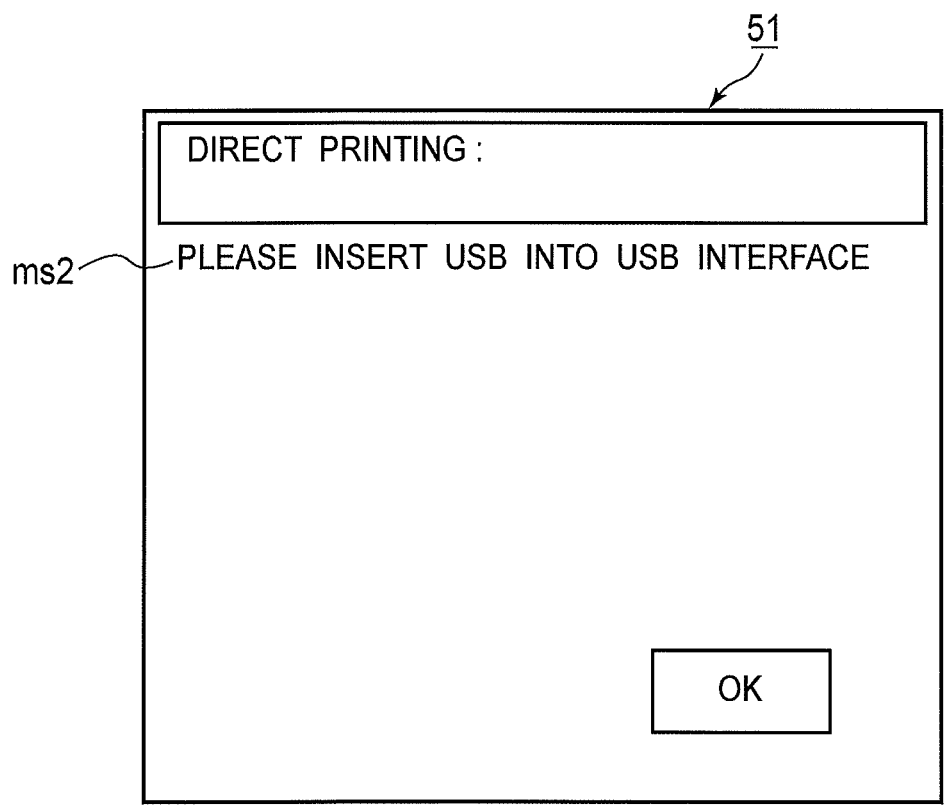
FIG. 25 illustrates a first exemplary display of the LCD.

FIG. 25 illustrates a first exemplary display of the LCD 51. The user touches, for example, the keys q2 on the LCD 51 to select the USB memory 101, the display processing section 14 causes the LCD 51 to display a guide screen shown in FIG. 25. The guide screen shows a message ms2, which prompts the user to insert the USB memory 101 into the USB interface 34.

Figure 26:
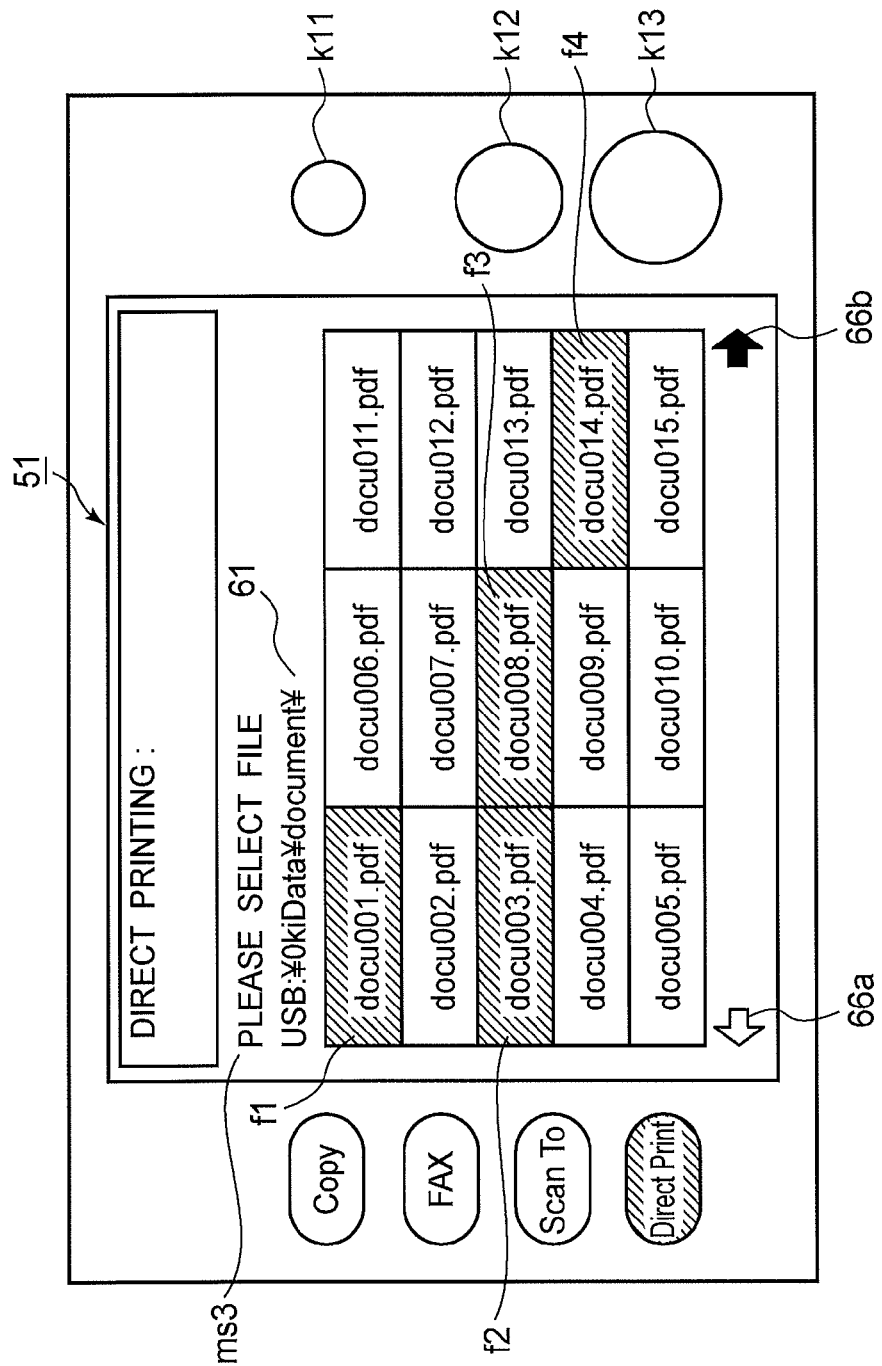
FIG. 26 illustrates a second exemplary display of the LCD.

FIG. 26 illustrates a second exemplary display of the LCD 51.

Once the user has inserted the USB memory 101 into the USB interface 34, the USB memory I/O controller 21 detects that the USB memory 101 has been inserted into the USB interface 34. The display processing section 14 causes the LCD 51 to display a file selection screen shown in FIG. 26 (S3). The file selection screen displays a message m3 and a list of files f(i) (i=1, 2, . . . , n) stored in the USB memory 101, thereby prompting the user to select a file(s) to be printed. The LCD 51 also displays file selection screen and shift keys 66a and 66b. If the user wants to find other files, he operates a shift key 66a to scroll the screen leftward or a shift key 66b to scroll the screen rightward.

Subsequently, the user selects his desired files, for example, f(1), f(2), f(3), and f(4) from the files displayed in the file selection screen, by touching the files f(1), f(2), f(3), and f(4) (S3). The display processing section 14 causes the LCD 51 to display the characters and background of the selected files f(1), f(2), f(3), and f(4) by reversing black and white (S4). For simplicity, FIG. 26 illustrates the selected files f(1), f(2), f(3), and f(4) by shading.

Next, once the user has depressed the button k12, monochrome printing is initiated using the direct printing function. If the user depresses the button k13, color printing is initiated using the direct printing function.

Subsequently, a password determining section 105 performs a password determining process to determine whether a first selected one (e.g., f(1)) of the files f(1), f(2), f(3), and f(4) is protected by a password (S5, S6).

The password determining section 105 then notifies the encrypted file detecting section 22 of the name of the file f(1) and the storage device from which the file f(1) is to be retrieved. The encrypted file detecting section 22 performs an encrypted file detecting process to read the content of the file f(1).

Figure 27:
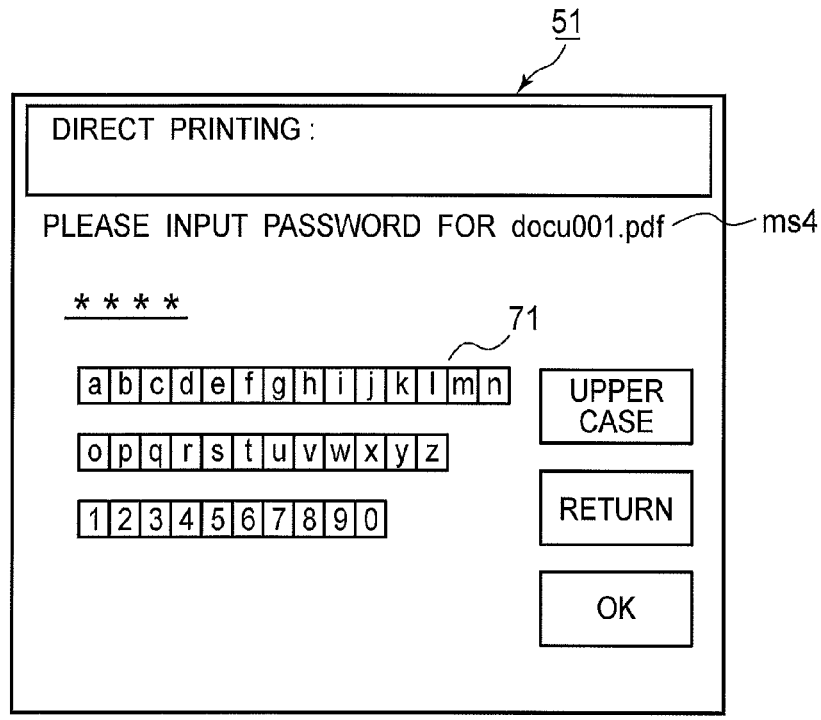
FIG. 27 illustrates a third exemplary display of the LCD.

FIG. 27 illustrates a third exemplary display of the LCD 51.

If the file is protected by a password, the display processing section 14 causes the LCD 51 to display a message ms4 and a list of characters 71 as shown in FIG. 27. The message ms4 prompts the user to input his password. The user inputs a password by touching some of the characters. A password inputting section 16 performs a password inputting process to read the inputted password (S7).

In this manner, the password determining section 105 checks all of the selected files f(1) to f(4) to determine whether the selected files f(1) to f(4) are protected by passwords. Once the user has inputted the passwords for the selected files f(1) to f(4) via the password inputting section 16, the password determining section 105 again checks all of the selected files f(1) to f(4) to determine whether the selected files f(1) to f(4) are protected by passwords. If the files are protected by passwords, then the password verifying section 23 performs a password verifying process on the files f(1) to f(4) in sequence to determine whether the passwords inputted by the user and the passwords of the files f(1) to f(4) coincide (S9-S10).

The decrypting section 24 performs the decryption process to decrypt the encrypted files whose passwords are the same as those inputted by the user and the encrypted files that are not protected by passwords, thereby decrypting the encrypted document data into a plain text.

The encrypted file detecting section 22 performs an encrypted file detecting process to determine whether a selected file has been encrypted. If the selected file has been encrypted, the decrypting section 24 performs the decryption process on the file to decrypt the file into a plain text (S14).

The data converting section 26 performs a data converting process to determine whether the decrypted file can be printed using the direct printing function (S12). If the decrypted file can be printed using the direct printing function (Y at S12), the data converting section 26 converts document data of the decrypted file into a ready-to-print format (PDL format). In other words, the document data is converted into image data which in turn is printed under the control of the printing controller 27 (S13).

The display processing section 14 causes the LCD 51 to display a print log LG1, which in turn indicates the printing progress status to the user if the password inputted by the user and the password in the selected file do not coincide or if printing of individual files has failed, completed or is being carried out. (S14, S15, S16).

Figure 28:
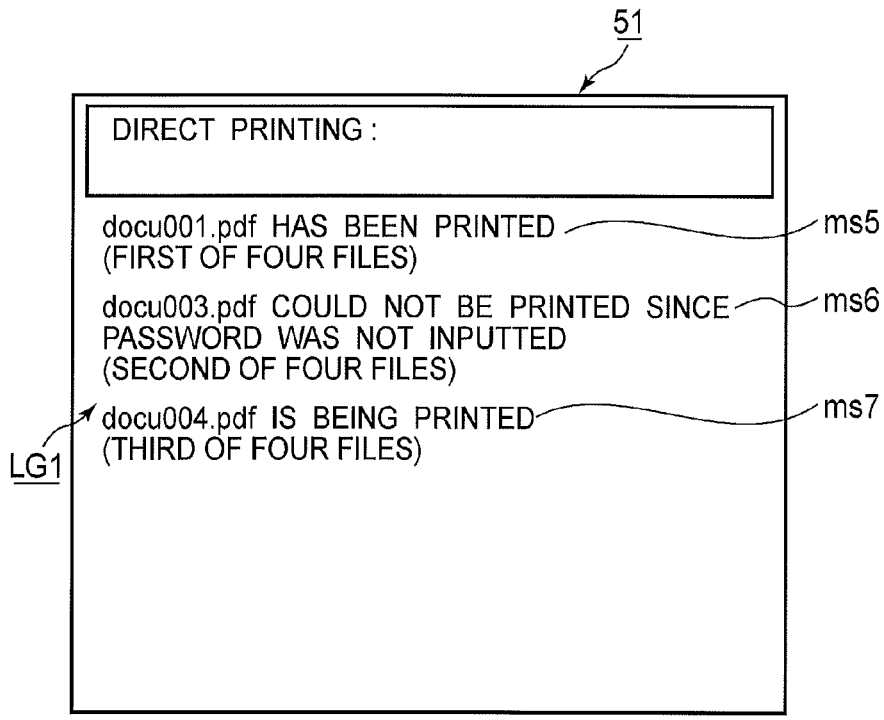
FIG. 28 illustrates a fourth exemplary display of the LCD.

FIG. 28 illustrates a fourth exemplary display of the LCD 51.

The print log LG1 includes (1) the name of a file and a message mss indicating that the file has been successfully printed, (2) the name of a file and a message ms6 indicating that the file could not printed since the password for the file was not inputted, and (3) the name of a file and a message ms7 indicating that the file is being printed. The CPU 40 stores the print log LG1 into the HDD 43.

After the password verifying process, decryption process (S11), data converting process, and printing (S13) have been performed on all of the selected files f(1) to f(4) that can be printed using the direct printing function, the CPU 40 makes a decision to determine whether there is a file failed to be printed (S16). If a file failed to be printed, a retry-of-printing processing section 28 performs a retry-of-printing process in response to the user's command, thereby also printing the file which failed to be printed (S17).

The flowchart shown in FIGS. 23 and 24 will be described briefly.

S1: A function setting section 109 sets the multi function peripheral 11 to the direct printing function.

S2: The menu m1 inquires the storage device from which a file is to be read.

S3: The LCD 51 displays a list of files for the user to select one or more files.

S4: The file extracting section 103 reads selected f(i) (i=1, 2, 3, . . .).

S5: The password determining section 105 performs the password determining process.

S6: The password determining section 105 makes a decision to determine whether the selected files f(i) are protected by passwords. If protected, the program proceeds to S7. If not protected, the program proceeds to S8.

S7: The user inputs a password.

S8: The next-file determining section 107 performs a next file determining process to determine whether there is a selected file that has not been subjected to the password determining n process yet. If YES, the program jumps back to S5. If NO, the program proceeds to S9.

S9: The password determining section 105 makes a decision to determine whether the selected files are protected by passwords.

S10: The password verifying section 23 makes a decision to determine whether the passwords coincide. If the passwords coincide, the program proceeds to S11. If the passwords do not coincide, the program jumps back to S14.

S11: The decrypting section 24 performs the decryption process to decrypt the files.

S12: The data converting section 26 performs a data converting process to determine whether the decrypted file can be printed using the direct printing function. If the decrypted file can be printed using the direct printing function (Y at S12), the program proceeds to S13. If the decrypted file cannot be printed using the direct printing function (N at S12), the program proceeds to S14.

S13: Printing is performed under the control of the printing controller 27.

S14: The display processing section 14 causes the LCD 51 to display the print log LG1 and the CPU 40 stores the print log LG1 into the HDD 43.

S15: The next-file determining section 107 performs a next file determining process to determine whether there is a selected file (e.g., f(3) in this embodiment) that has not been subjected to the decryption process and printing controlling process yet. If YES, the program jumps back to S9. If NO, the program proceeds to S16.

S16: The CPU 40 makes a decision to determine whether there is a file failed to be printed. If a file failed to be printed, the program proceeds to S17. If no file failed to be printed, the program ends.

S17: The CPU 40 performs the retry-of-printing process.

The retry-of-printing process performed at S17 will be described below.

Figure 29:
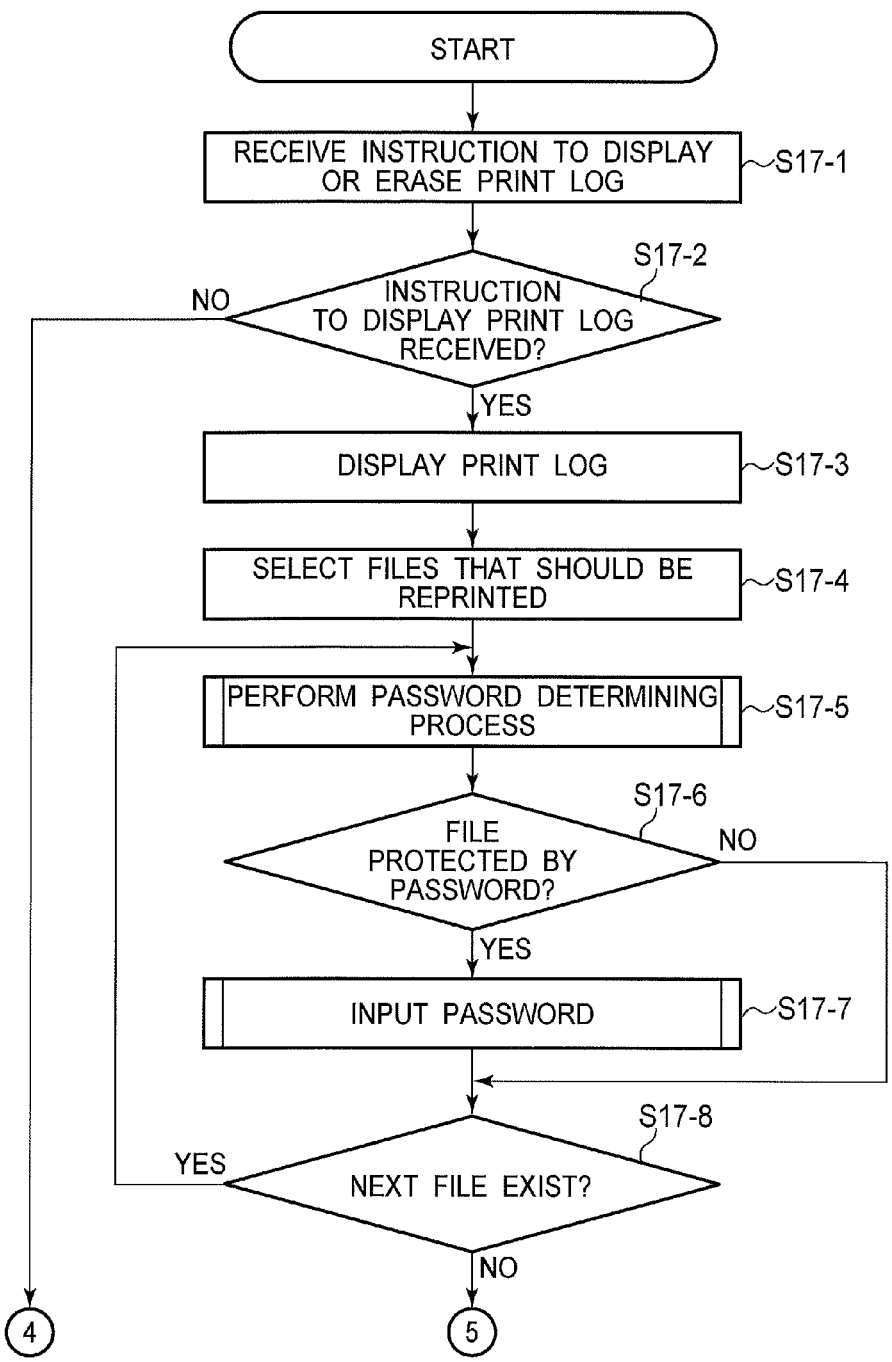
FIG. 29 is a first portion of a flowchart illustrating the subroutine for a retry-of-printing process.

FIG. 29 is a first portion of a flowchart illustrating a subroutine for the retry-of-printing process.

Figure 30:
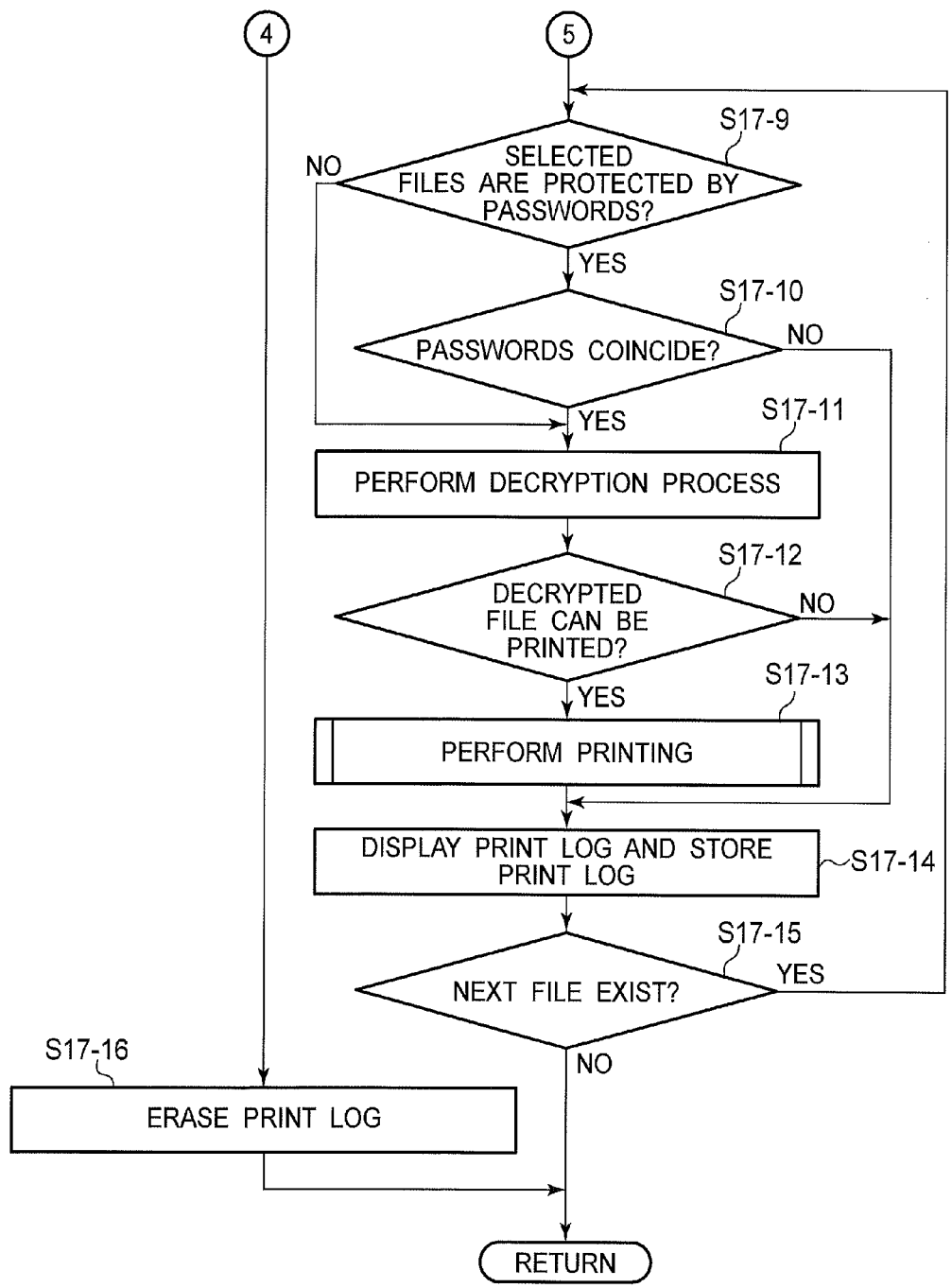
FIG. 30 is a second portion of the flowchart of FIG. 29.

FIG. 30 is a second portion of the flowchart of FIG. 29.

Figure 31:
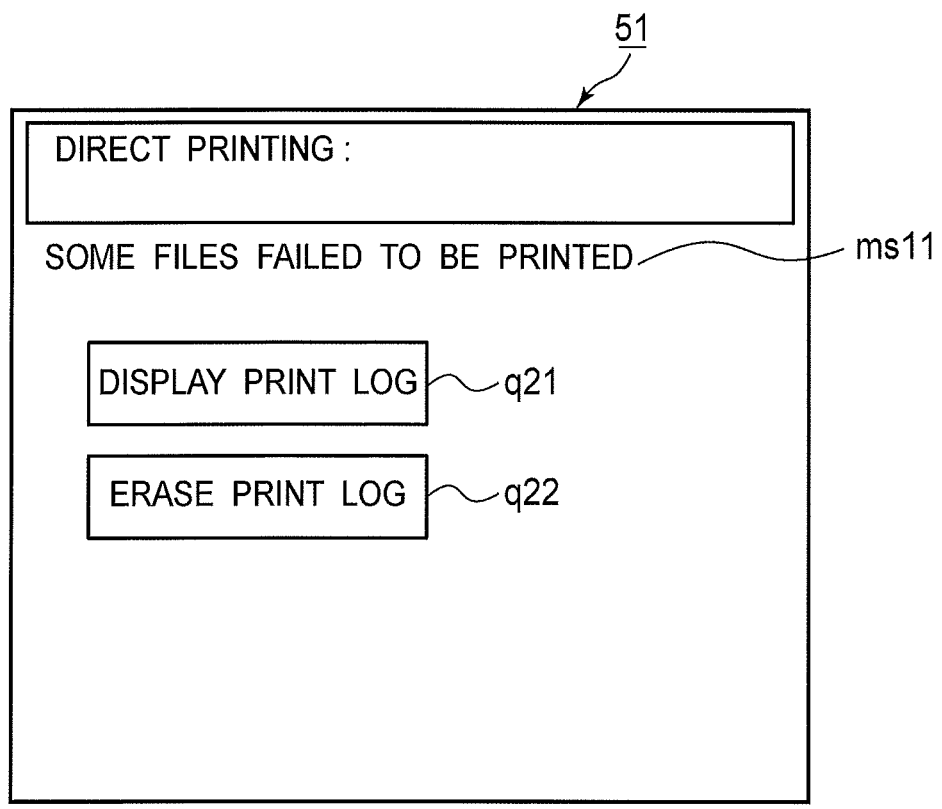
FIG. 31 is an exemplary display of the LCD indicating that a file failed to be printed.

FIG. 31 is an exemplary display of the LCD 51 indicating that a file failed to be printed.

Figure 32:
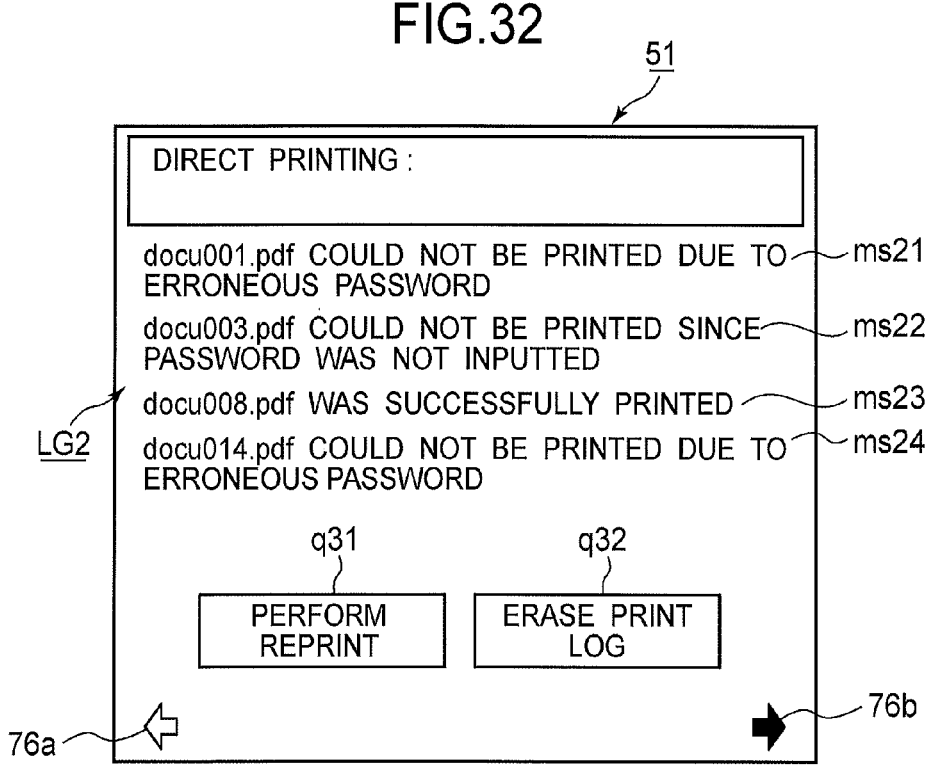
FIG. 32 is an exemplary print log displayed on the LCD.

FIG. 32 is an exemplary print log LG2 displayed on the LCD 51.

Figure 33:
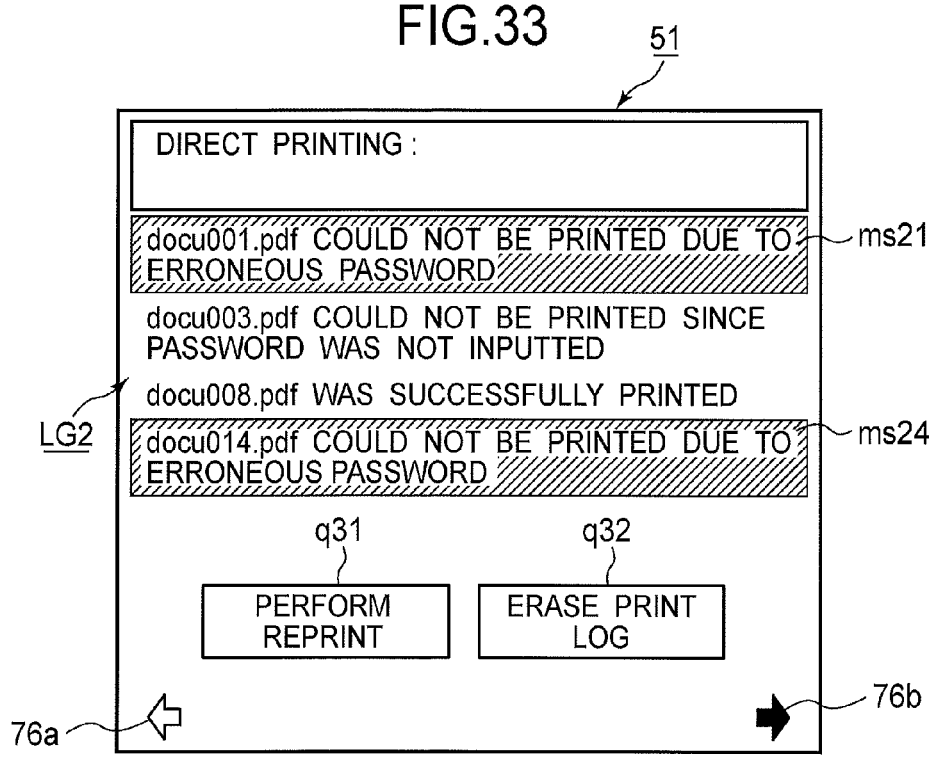
FIG. 33 is another exemplary print log displayed on the LCD.

FIG. 33 is another exemplary print log LG2 displayed on the LCD 51.

Referring to FIG. 29, the display processing section 14 causes the LCD 51 to display a message ms11 (FIG. 31) that indicates that a file(s) failed to be successfully printed (S17-1). The LCD 51 also displays a key q21 for displaying the print log and a key q22 for erasing the print log from the HDD 43 (S17-2).

If the user touches the key q21 (FIG. 31), the error list displaying section 17 causes the LCD 51 to display the print log LG2 indicative of the print progress status of the files f(1) to f(4) as shown in FIG. 32 (S17-3). The error list displaying section 17 also causes the LCD 51 to display a key q31 for commanding retry-of-printing and a key q32 for erasing the print log LG2 from the HDD 43. The LG2 includes the names of all of the files whose passwords are not the same as the passwords inputted by the user, and messages ms21 and ms24; the name of a file (s) that failed to be printed due to the fact that the passwords do not coincide and a message ms22; the name of a file(s) that were successfully printed and a message ms23. The LCD 51 also displays the file selection screen and shift keys 76a and 76b. If the user wants to find other files, he operates a shift key 76a to scroll the screen leftward or a shift key 76b to scroll the screen rightward, so that the user can view other messages than messages ms21 and ms24.

When the user touches the key q22 to command to erase the print log LG2, the CPU 40 erases the print log LG2.

The user may want to print the files, for example, f(1) and f(4) accompanied by the messages ms21 and ms24, respectively, that indicate that these files failed to be printed. Once the user has touched the messages ms21 and ms24, the error list selecting section 18 selects the files f(1) and f(4) that should be reprinted, and the display processing section 14 causes the LCD 51 to display the messages ms21 and ms24, characters, and background by reversing black and white as shown in FIG. 33 (For simplicity, FIG. 33 illustrates the selected files f(1), f(3), f(7), and f(9) by shading). The error list memory 19 stores the print log LG2 into the HDD 43 for future display.

Subsequently, the user touches the key q31 to initiate printing of the files f(1) and f(4) (S17-4).

The password determining section 105 selects a first one of the files f(1) and f(4), and makes a decision to determine whether the selected file is protected by a password (S17-6). If the file is protected by a password (Y at S17-6), the display processing section 14 causes the LCD 51 to display the list of characters 17 and a message that prompts the user to input a password (S17-7).

As soon as the password inputting section 16 reads the password (S17-8), the password determining section 105 again makes a decision to determine whether the files f(1) and f(4) are protected by passwords (S17-9).

Referring to FIG. 30, the password verifying section 23 checks the files f(1) and f(4) to determine whether the passwords of the files f(1) and f(4) and the passwords inputted by the user coincide (S17-10).

The decrypting section 24 performs a decryption process to decrypt all of the encrypted files including files that have been determined not to be protected by passwords and all of the encrypted files determined to have the same passwords as the passwords inputted by the user (S17-11).

The data converting section 26 makes a decision to determine whether the decrypted file can be printed using the direct printing function (S17-12). For example, if the extension of a file indicates "PDF," then the file can be printed. If the extension of a file indicates "exe," then the file cannot be printed. If the file is ready to be printed, the data converting section 26 converts the document data of the file into image data, and the printing controller 27 causes the print engine 37 (FIG. 19) to print the image data (S17-13).

Every time the password verifying section 23 determines that the password inputted by the user and the password in the file do not coincide, or every time the file is printed, the display processing section 14 causes the LCD 51 to display a print log for that file (S17-4, S17-15). The print log includes the name of a file that was successfully printed and a corresponding message, the name of a file that failed to be printed and a corresponding message, and the name of a file that is being currently printed and a corresponding message. The CPU 40 stores the print log into the HDD 43.

The encrypted file detecting section 22 selects and decrypts a second one of the files f(1) and f(4). The decrypting section 24 performs a decryption process to decrypt the second one of the files f(1) and f(4), the data converting section 26 converts the document data of the file into image data, and the printing controller 27 controls printing of the image data (S17-15).

In the present embodiment, the user is prompted to input passwords for all of the files selected by the user. The user then inputs the passwords for the files protected by passwords. Subsequently, the password verifying 23 makes a decision to determine whether the password inputted by the user and the password in the file coincide, and the file is then printed. This simplifies the user's intervention in performing printing. Since the print log LG1 is displayed after completion of printing, printing can be done for a file that failed to be printed due to miss-inputted password.

The flowchart shown in FIGS. 29 and 30 will be briefly described as follows:

S17-1: The error list displaying section 17 receives an instruction to display or not to display the print log LG2.

S17-2: The error list displaying section 17 makes a decision to determine whether an instruction to display the print log LG2 has been received. If YES, the program proceeds to S17-3. If NO, the program jumps to S17-16.

S17-3: The display processing section causes the LCD 51 to display the print log LG1.

S17-4: The error list selecting section 18 selects the files f(1) and f(4) that should be reprinted.

S17-5: The password determining section 105 performs a password determining process.

S17-6: If the file is protected by a password (YES), the program proceeds to S17-7. If the file is not protected by a password (NO), the program jumps to S17-8.

S17-7: The password inputting section 16 performs a password inputting process to read the inputted password.

S17-8: The next-file determining section 107 performs the next file determining process to determine whether there is a selected file (e.g., f(3) in this embodiment) that has not been subjected to the password determining process yet. If YES, the program jumps back to S17-5. If NO, the program proceeds to S17-9.

S17-9: The password determining section 105 makes a decision to determine whether the selected files f(i) are protected by passwords. If YES, the program proceeds to S17-10. If NO, the program jumps to S17-11.

S17-10: The password verifying section 23 performs a password determining process on the files f(1) to f(4) in sequence to determine whether the passwords inputted by the user and the passwords of the files f(1) to f(4) coincide. If YES, the program proceeds to S17-11. If NO, the program proceeds to S17-14.

S17-11: The decrypting section 24 performs a decryption process to decrypt the files f(1) and f(4), the data converting section 26 converts the document data of each file into image data.

S17-12: The data converting section 26 performs a data converting process to determine whether the decrypted file can be printed using the direct printing function. If YES, the program proceeds to S17-13. If NO, the program proceeds to S17-14.

S17-13: The printing controller 27 causes the print engine 37 (FIG. 19) to print the image data.

S17-14: The error list displaying section 17 causes the LCD 51 to display the print log LG2. The error list memory 19 stores the print log LG2 into the HDD 43.

S17-15: The next-file determining section 107 performs the next file determining process to determine whether there is a selected file (e.g., f(3) in this embodiment) that has not been subjected to the decryption process and printing controlling process yet. If YES, the program jumps back to S17-9. If NO, the subroutine ends.

S17-16: The user erases the print log LG2 and then the subroutine ends.

Fourth Embodiment

A fourth embodiment allows retry of printing of files that failed to be printed. Elements similar to those of the first embodiment have been given the same reference numerals and their description is omitted. The effects obtained from the first embodiment can also be obtained from the second embodiment having the same configuration as the first embodiment.

Figure 34:
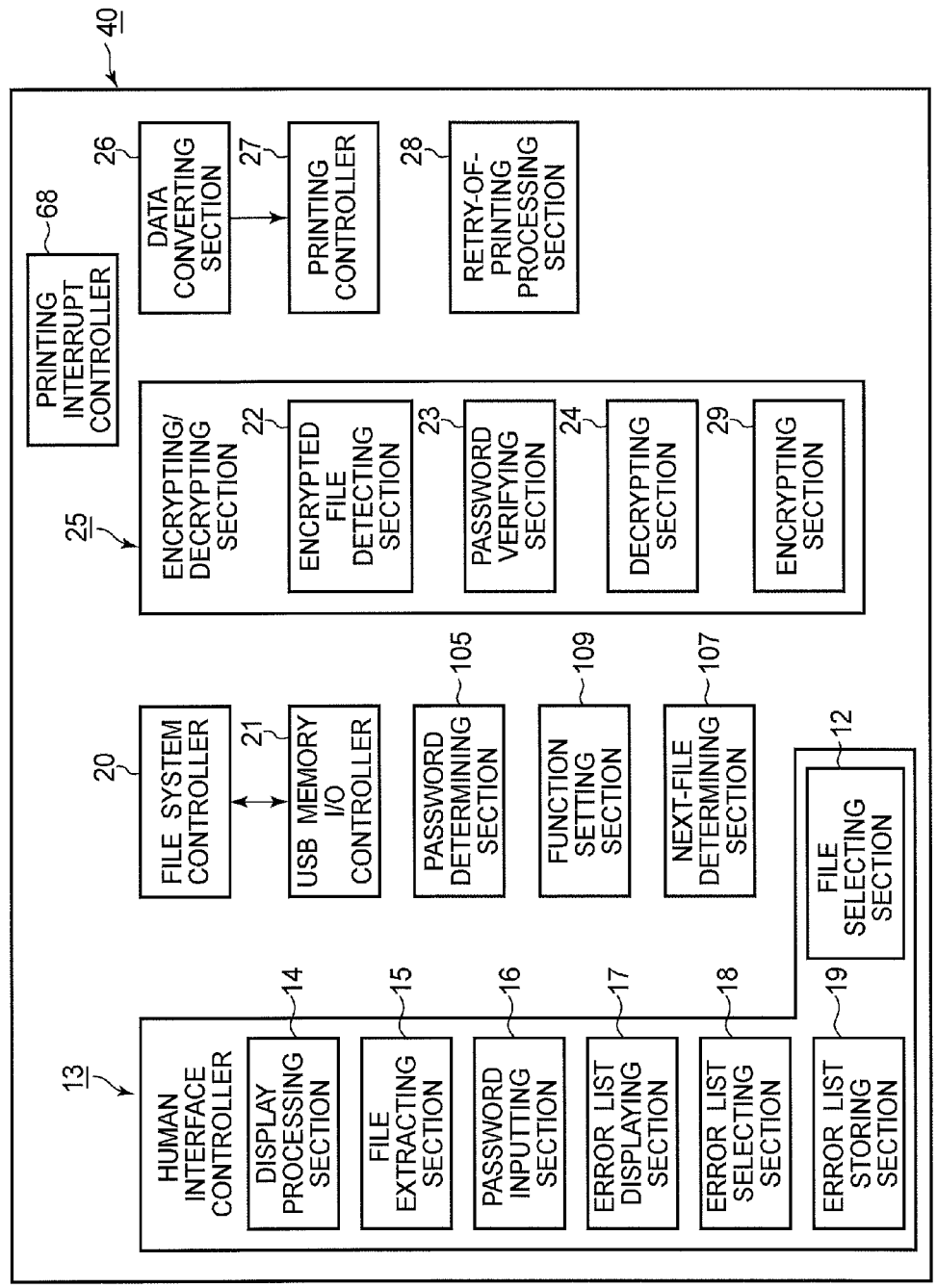
FIG. 34 is a functional block diagram of a multi function peripheral according to a fourth embodiment.

FIG. 34 is a functional block diagram of a multi function peripheral 11 which performs printing using a direct printing function.

A CPU 40 of the fourth embodiment employs a printing interrupt controller 68.

The operation of the multi function peripheral 11 will be described.

The password determining section 105 makes a decision to determine whether the selected files f(1) to f(4) (FIG. 26) are protected by passwords. The display processing section 14 causes the LCD 51 to display a message ms4 which prompts the user to input his password. The user touches some of the characters displayed on the LCD 51 to input passwords for all files protected by passwords. A password inputting section 16 performs a password inputting process to read the inputted passwords inputted by the user. The password determining section 105 again makes a decision to determine whether the selected files f(1) to f(4) are protected by passwords. The password verifying section 23 performs a password verifying process on the files f(1) to f(4) in sequence to determine whether the passwords inputted by the user and the passwords of the files f(1) to f(4) coincide.

The decrypting section 24 performs a decryption process to decrypt the encrypted data of all files that were determined to be unprotected by passwords, and all files whose passwords were proven to be the same as the passwords inputted by the user coincide.

The data converting section 26 performs a data converting process to determine whether the decrypted file is can be printed using the direct printing function. If the decrypted file is ready to print, the data converting section 26 converts document data of the decrypted file into a ready-to-print format (PDL format). In other words, the document data is converted into image data which in turn is printed under the control of the printing controller 27.

Figure 35:
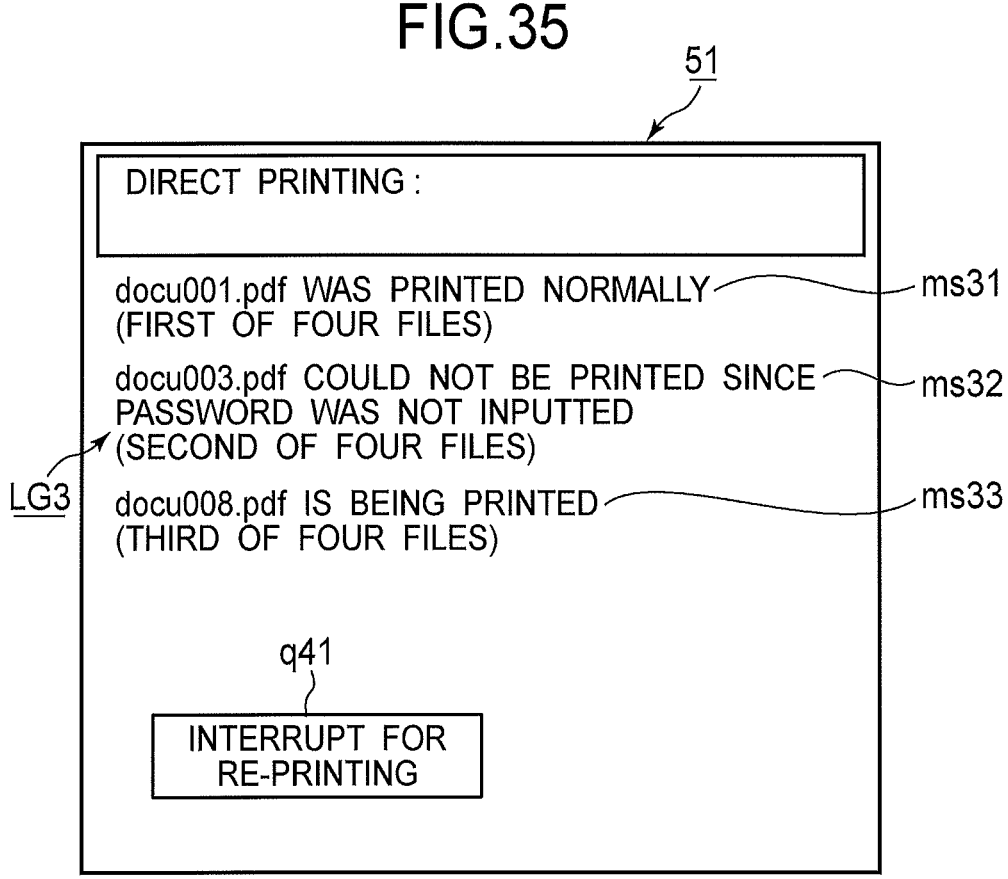
FIG. 35 illustrates an exemplary display of a liquid crystal display (LCD)

FIG. 35 illustrates an exemplary display of a liquid crystal display (LCD) 51.

Every time the password verifying section 23 determines that the passwords inputted by the user and the passwords of respective files do not coincide or every time printing of a file is performed, the display processing section 14 causes the LCD 51 to display a print log LG3 as shown in FIG. 35 for the respective files. The print log LG3 includes the names of files that were successfully printed and a message ms31, the name of files that were not successfully printed and a message ms32, and the name of a file that is currently being printed and a message ms33. The CPU 40 stores the print log LG3 into the HDD 43.

The display processing section causes the LCD 51 to display a key q41 used for the user to command a retry-of-printing process while printing is currently being carried out, and the printing interrupt controller 68 performs a printing interrupt process to determine whether the user has touched the key q41 to command retry-of-printing by means of interruption.

When the user touches the key q41, the printing interrupt controller 68 notifies a retry-of-printing processing section 28 of the fact that the key q41 has been touched.

Upon reception of a retry-of-printing command, the password determining section 105 performs the password determining process, and the password inputting section 16 performs the password inputting process to read a password inputted by the user. The retry-of-printing processing section 28 causes the LCD 51 to display the LG3 indicating to the user the files that should be printed. If the user touches the key q41, the printing controller 27 controls printing of the files displayed in the LG3 by interrupt.

As described above, if the user touches the key q41 to command the retry of printing via an interrupt while a file is being printed, the user is allowed to command an additional file to be printed as a selected file while printing is currently being performed.

Thus, the printing of files, which failed to be printed due to, for example, erroneous passwords inputted by the user, can be commanded again without having to wait for the printing of other files to complete.

Figure 36:
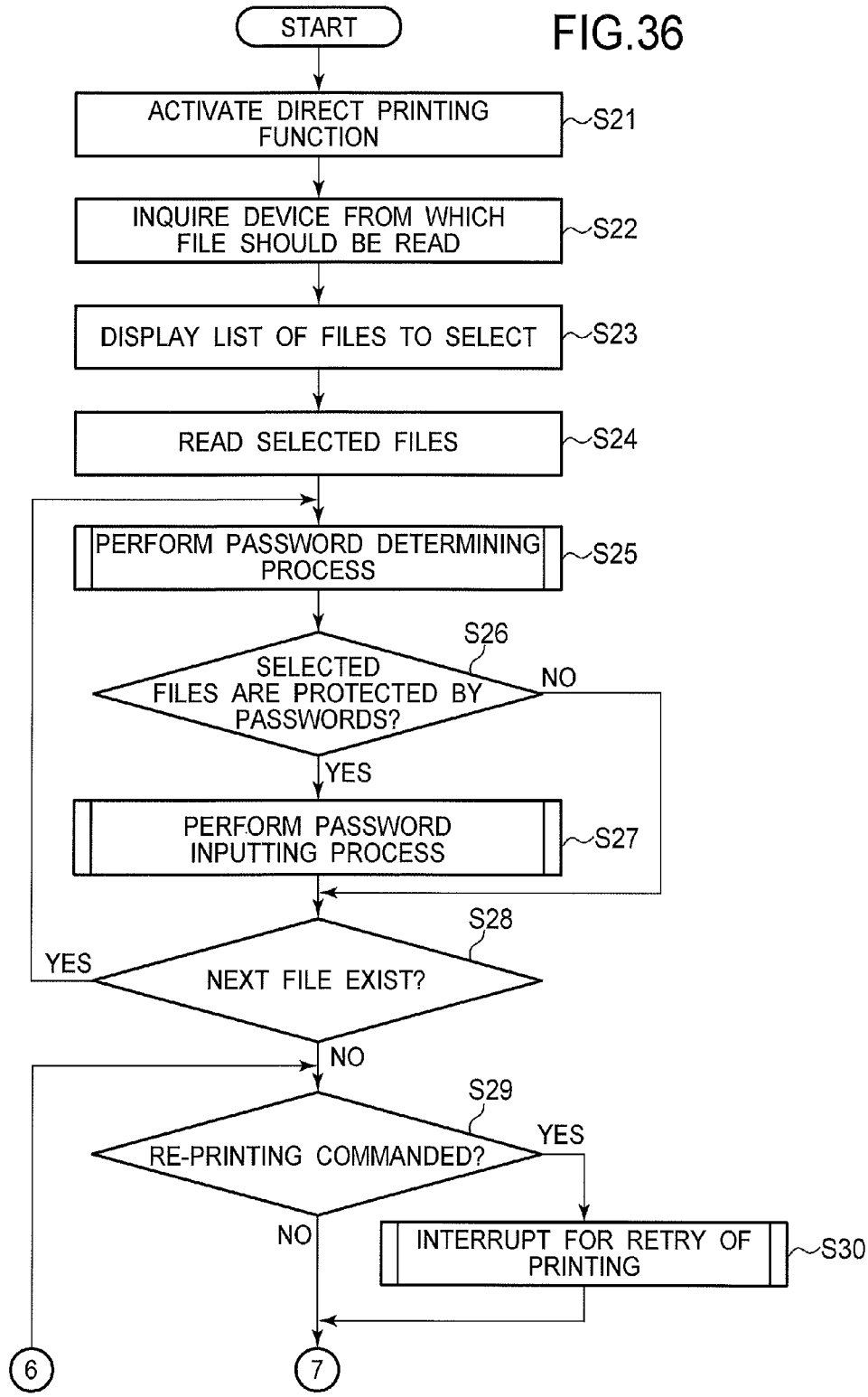
FIG. 36 is a first portion of a flowchart illustrating the operation of the multi function peripheral.

FIG. 36 is a first portion of a flowchart illustrating the operation of the multi function peripheral.

Figure 37:
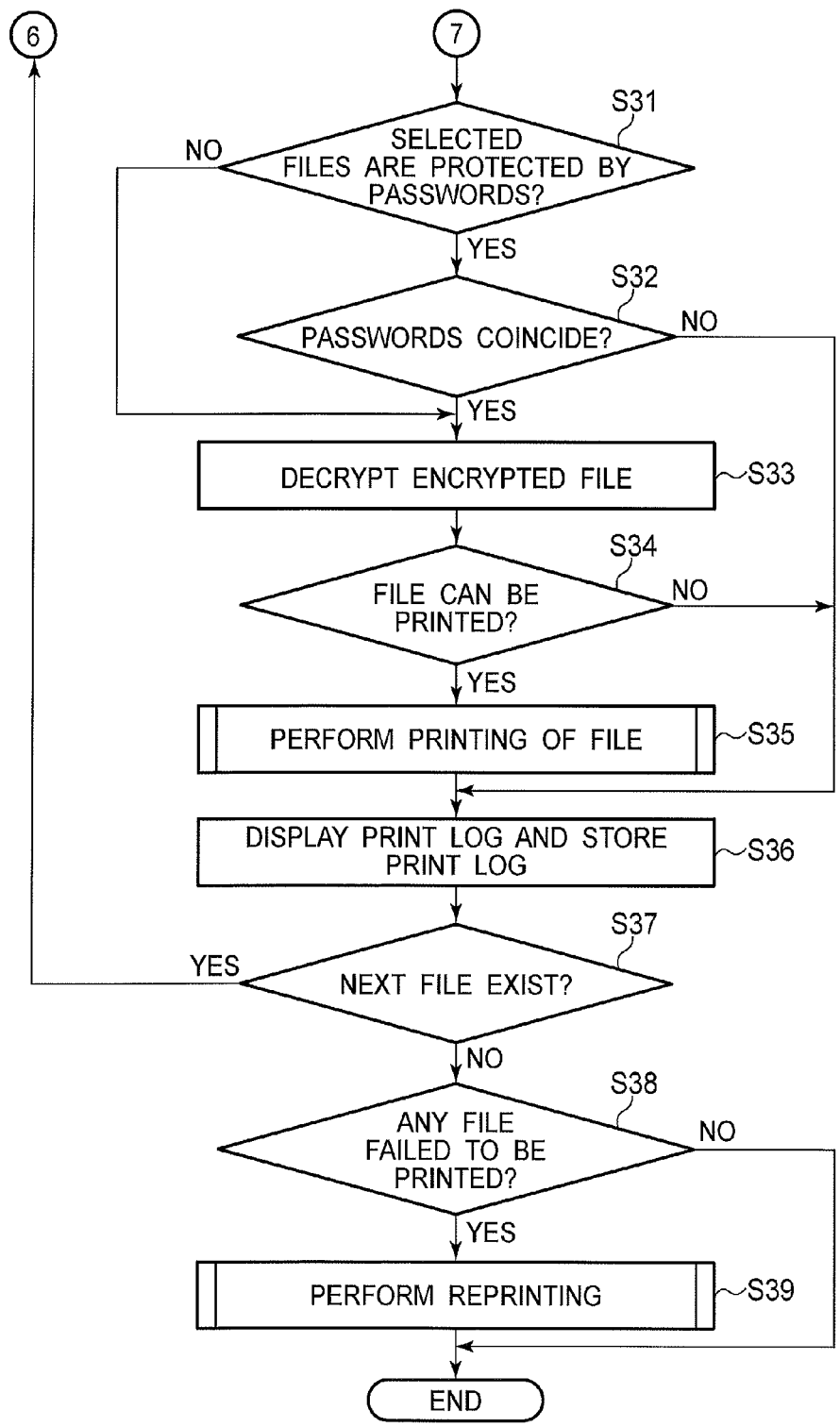
FIG. 37 is a second portion of the flowchart illustrating the operation of the multi function peripheral.

FIG. 37 is a second portion of the flowchart illustrating the operation of the multi function peripheral.

The retry of printing process shown in FIGS. 36 and 37 will be described.

S21: The function setting section 109 sets the multi function peripheral 11 to the direct printing function mode.

S22: The menu m1 inquires the storage device that holds a file.

S23: The LCD 51 displays a list of files to select.

S24: The file extracting section 103 reads selected files f(i) (i=1, 2, 3, . . .).

S25: The password determining section 105 performs the password determining process.

S26: The password determining section 105 makes a decision to determine whether the selected files f(i) are protected by passwords. If protected, the program proceeds to S27. If not protected, the program proceeds to S28.

S27: The user inputs a password.

S28: The next-file determining section 107 performs a next file determining process to determine whether there is a selected file (e.g., f(3) in this embodiment) that has not been subjected to the password determining process yet. If YES, the program jumps back to S25. If NO, the program proceeds to S29.

S29: The printing interrupt controller 68 makes a decision to determine whether the user commanded the retry of printing. If YES, the program proceeds to S30. If NO, the program proceeds to S31.

S30: The retry-of-printing processing section 28 performs the retry of printing process.

S31: The password determining section 105 makes a decision to determine whether the selected files f(i) are protected by passwords. If protected, the program proceeds to S32. If not protected, the program proceeds to S33.

S32: The password verifying section 23 performs the password verifying process on the files. If YES, the program proceeds to S33. If NO, the program proceeds to S36.

S33: The decrypting section 24 decrypts an encrypted file.

S34: The data converting section 26 makes a decision to determine whether the decrypted file can be printed using the direct printing function. If YES, the program proceeds to S35. If NO, the program proceeds to S36.

S35: The printing controller 27 controls printing of the file that should be printed.

S36: The display processing section 14 causes the LCD 51 to display the print log LG3. The CPU 40 stores the print log LG3 into the HDD 43.

S37: The next-file determining section 107 performs a next file determining process to determine whether there is a selected file (e.g., f(3) in this embodiment) that has not been subjected to the decryption process and printing controlling process yet. If YES, the program jumps back to S29. If NO, the program proceeds to S38.

S38: The CPU 40 makes a decision to determine whether there is a file that failed to be printed. If a file failed to be printed, the program proceeds to S39. If no file failed to be printed, the program ends.

S39: The CPU 40 performs the retry-of-printing process. The program then ends.

Figure 38:
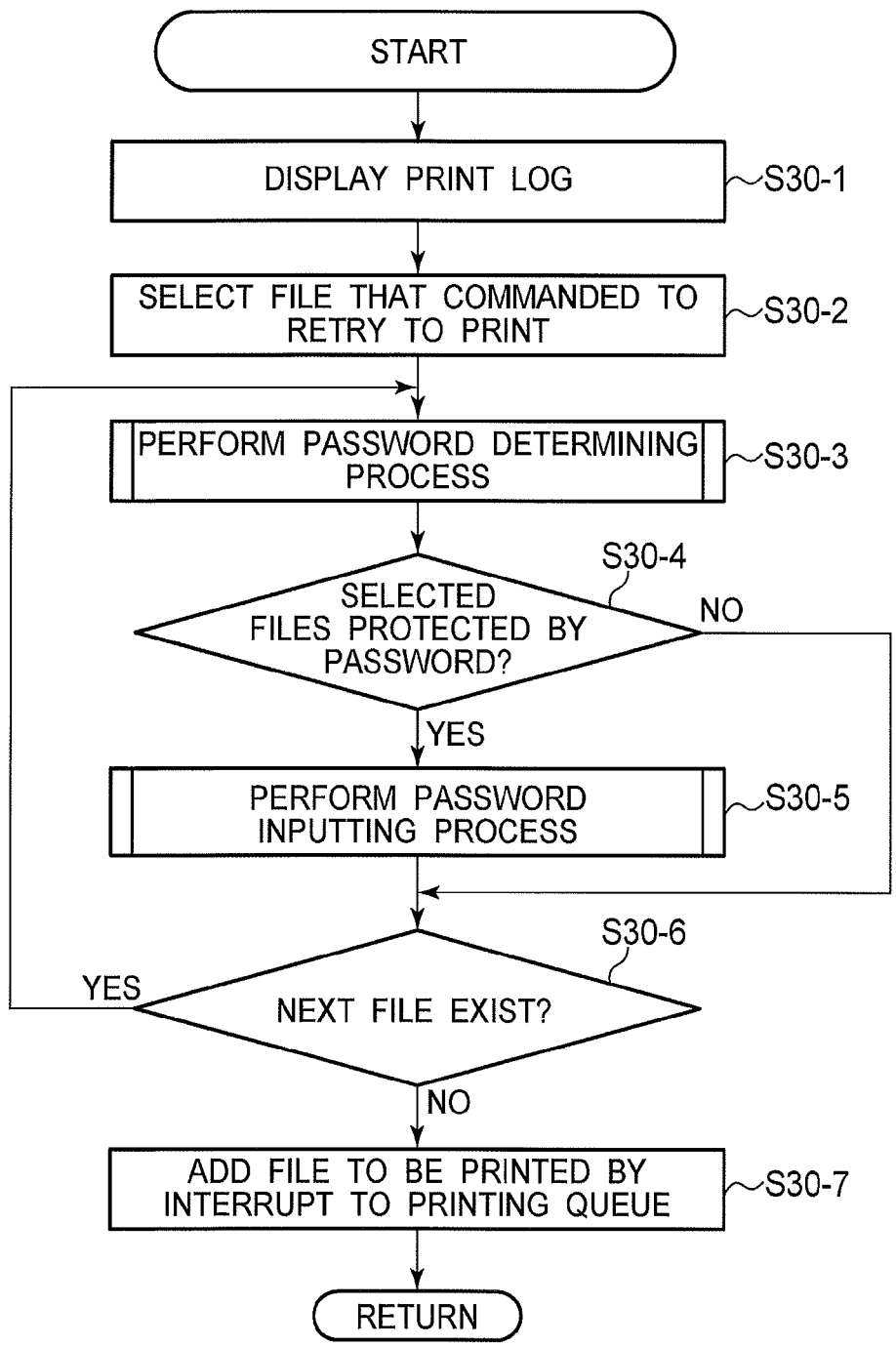
FIG. 38 illustrates a subroutine for a printing interrupt.

FIG. 38 illustrates a subroutine for a printing interrupt.

The flowchart shown in FIG. 38 will be described.

S30-1: The display processing section 14 causes the LCD 51 to display the print log LG3.

S30-2: The retry-of-printing processing section 28 selects a file that should be printed.

S30-3: The password determining section 105 performs the password determining process.

S30-4: The password determining section 105 makes a decision to determine whether the selected files f(i) are protected by passwords. If protected, the program proceeds to S30-5. If not protected, the program jumps to S30-6.

S30-5: The user inputs a password.

S30-6: The next-file determining section 107 performs a next file determining process to determine whether there is a selected file (e.g., f(3) in this embodiment) that has not been subjected to the password determining process yet. If YES, the program jumps back to S30-3. If NO, the program proceeds to S30-7.

S30-7: The retry-of-printing processing section 28 causes the LCD 51 to display the file as a part of LG3. In other words, the file to be printed by interrupt is added to a queue for printing. Then, subroutine for retry printing by interrupt ends.

The third and fourth embodiments have been described in terms of the printing of files stored in a USB memory. The present invention may also be applied to the printing of files held in the HDD 43, the memory in the network server, or the like.

The third and fourth embodiments have been described with respect to multi function peripherals. The invention may also be applied to printers, copying machines, and facsimile machines.

The invention is not limited to the aforementioned preferred third and fourth embodiments, and may be modified in a variety of ways without departing from the scope of the invention.

Fifth Embodiment

In the first and second embodiments, the user has to input a corresponding password each time a file is found to have been protected by a password. This is cumbersome.

A fifth embodiment simplifies the user's task to input passwords. Elements similar to those of the first and second embodiments have been given the same reference numerals, and their description of omitted. The effects obtained from the first to second embodiments can also be obtained from the fifth embodiment, providing that the fifth embodiment has the same configuration as the first and fourth embodiment.

The second operation of a multi function peripheral 11 as an image forming apparatus is the same as that of the first and second embodiments.

FIG. 39A is a functional block diagram of the multi function peripheral 11 according to the fifth embodiment. FIG. 39B illustrates a RAM 41 according to the fifth embodiment.

Just as in the first and second embodiments, the passwords for the respective files f(i) (i=1, 2, 3, . . .) inputted by the user and the passwords read from a buffer area 95 during a password verifying process, are stored as intermediate data in the RAM 41.

A password verifying section 23 of a CPU 40 performs a password verifying process for a first selected file f(1). That is, the password verifying section 23 reads the password from the buffer area 95 via the file system controller 20, and then determines whether the password inputted by the user and the password read from the buffer area 95 coincide. If the passwords coincide, the password is stored as a verified password into a verified password storing section 41a in the RAM 41. Then, the password verifying process is performed on a selected file f(3). The password for the file f(3) read from the buffer area 95 is compared with the verified password for the file f(1). If the passwords coincide, it is determined that the password verifying process is successfully completed.

In the fifth embodiment, the user selects a direct printing function via a human interface 33 (FIG. 3). A function setting section 108 invokes the direct printing function (S51). A display processing section 14 generates an initial screen (FIG. 3), which then appears on the LCD 51. The initial screen shows a message ms1 that prompts the user to select a storage device from which a file is to be read (S52).

Figure 41:
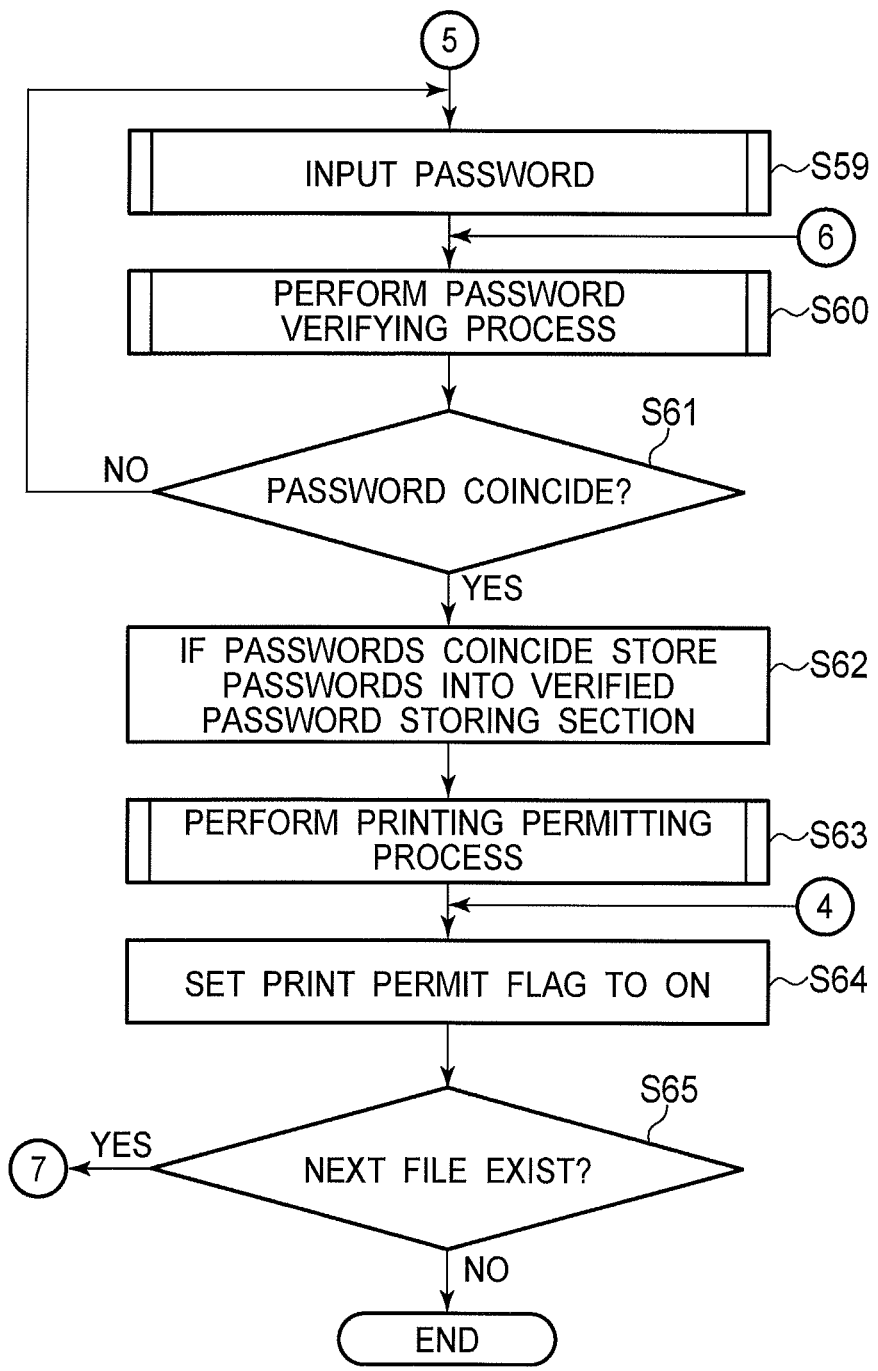
FIG. 41 is a second portion of the flowchart illustrating a second operation of the multi function peripheral.

FIG. 40 is a first portion of a flowchart illustrating a first operation of the multi function peripheral 11. FIG. 41 is a second portion of the flowchart illustrating a second operation. The user touches, for example, q2 in the screen to select the USB memory 101. The display processing section 14 then causes the LCD 51 to display a guide screen shown in FIG. 7. The guide screen shows a message ms2 that prompts the user to insert the USB memory 101 into the USB interface 34.

Figure 42:
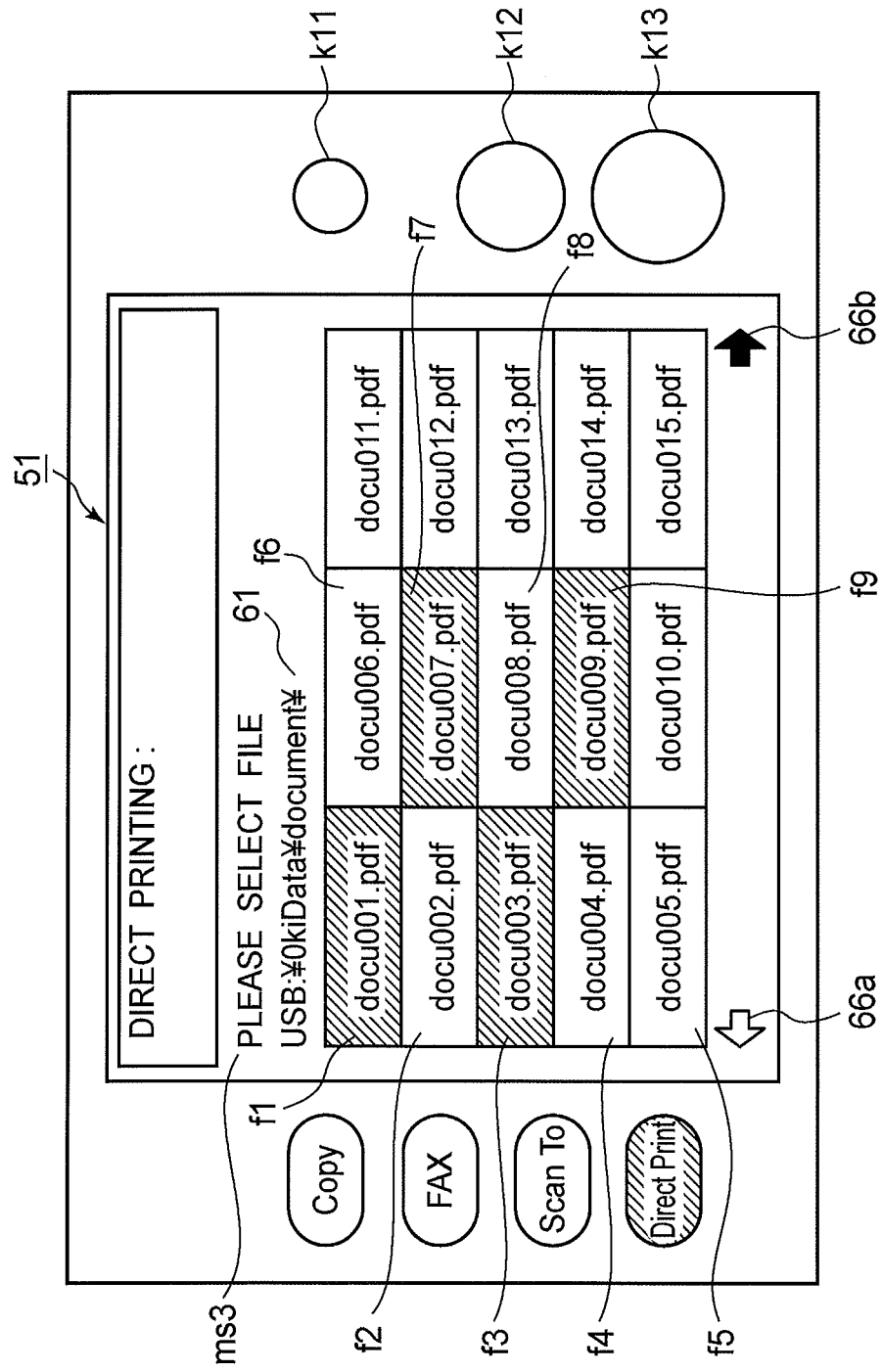
FIG. 42 illustrates an exemplary display of a liquid crystal display (LCD)

FIG. 42 illustrates an exemplary display of a liquid crystal display (LCD).

Once the user has inserted the USB memory 101 into the USB interface 34, the USB memory I/O controller 21 detects that the USB memory 101 has been inserted into the USB interface 34. The display processing section 14 generates a file selection screen shown in FIG. 42, and causes the LCD 51 to display a message ms3 and files f(i) (i=1, 2, . . . , n) stored in the USB memory 101, thereby prompting the user to select a file(s) to be printed (S53).

Subsequently, the user selects his desired files, for example, f(1), f(3), f(7), and f(9) from the files displayed in the file selection screen, by touching the files f(1), f(3), f(7), and f(9). The display processing section 14 displays the characters and background of the selected files f(1), f(3), f(7), and f(9) by reversing black and white (For simplicity, FIG. 42 illustrates the selected files f(1), f(3), f(7), and f(9) by shading). The file selecting section 15 selects the files f(1), f(3), f(7), and f(9) and the file extracting section 103 reads the files f(1), f(3), f(7), and f(9) from the USB memory 101 (S54).

Next, if the user depresses the button k12, monochrome printing is initiated using the direct printing function. If the user depresses the button k13, color printing is initiated using the direct printing function.

Subsequently, the password determining section 105 performs a password determining process to determine whether a first selected one of the files f(1), f(3), f(7), and f(9) is protected by a password (S55).

If the file f(1) is protected by a password (Y at S56), then a verified password extracting section 121 of the CPU 40 performs a verified password extracting process to determine whether the verified password is held in a verified password storing section 41a in the RAM 41 (S57).

If the verified password storing section 41a does not hold the verified password, (N at S57), then the display processing section 14 generates a password inputting screen shown in FIG. 10, and causes the LCD 51 to display the password inputting screen. The password inputting screen shows the name of the file f(1), and the message ms4 that prompts the user to input the password for the file f(1). Once the user has inputted a password, the password inputting section 16 reads the password inputted by the user, and then notifies the password verifying section 23 of the information including the password, the name of the file f(1), and the location of a folder 61 in which the file f(1) is stored (S59).

The password verifying section 122 performs a password verifying process to determine whether the password inputted by the user and the password read from the buffer area 95 coincide (S61). If the passwords coincide (Y at S61), the password verifying section 122 stores the password as a verified password into the verified password storing section 41a (S62).

Subsequently, a printing permitting section 111 of the CPU 40 performs a printing permitting process, thereby permitting printing of the file f(1) (S63).

If the password determining section 105 determines that the file f(1) is not protected by a password (N at S56), or after the printing permitting section 111 permits printing of the file f(1), a printing permit setting section 113 performs a printing permit setting process, thereby setting a print permit flag to ON indicating that printing of the file f(1) has been permitted (S63).

If the passwords do not coincide (N at S61), the display processing section (FIG. 11) 14 generates a password re-inputting screen, and causes the LCD 51 to display a message ms5 in the password re-inputting screen. The message ms5 informs the user that the passwords do not coincide, and prompts the user to input the correct password.

A next-file determining section 107 makes a decision to determine whether there is a file that has not been subjected to the password determining process, password verifying process, and printing permitting process yet. If there is a file f(3) that has not been subjected to the decryption process and printing controlling process yet (Y at S65), processes including the password determining process, password inputting process, password verifying process, and printing permitting process are performed. If there is not a file that has not been subjected to the password determining process, password verifying process, and printing permitting process yet, the CPU 40 terminates the direct printing function.

If the password determining process performed on the file f(3) and onward reveals that some files are protected by passwords (Y at S56), the verified password extracting section 121 makes a decision to determine whether the verified password storing section 41a holds the verified password (Y at S57), the verified password extracting section 121 reads the verified password from the verified password storing section 41a (S58).

Subsequently, a password verifying section 122 performs a password verifying process using the verified password read from the verified password storing section 41a (S60). If the passwords coincide (Y at S61), the printing permitting section 111 performs the printing permitting process (S63). If the passwords do not coincide (N at S61), the user is prompted to input a password (S59).

If the verified password storing section 41a holds a plurality of verified passwords, the verified password extracting section 121 reads the plurality of verified passwords from the verified password storing section 41a (S58), and the password verifying section 122 performs the password verifying process on the plurality of verified passwords (S60).

The fifth embodiment has been described with respect to a case in which the files f(1) and f(3) are selected via the file selection screen shown in FIG. 8. If the files f(1), f(2), and f(3) are selected and are protected by the same passwords, the print engine 37 begins to print the files f(1), (2), and (3) upon completion of the password verifying process of the file f(1).

As described above, in the fifth embodiment, if the password read from the verified password storing section 41a and the password read from the buffer area 95 coincide, the display processing section 14 does not cause the LCD 51 to display the password inputting screen, thereby not prompting the user to input the password for the file f(3). The user is freed from inputting the password for the file f(3), which simplifies the password inputting operation.

The flowchart shown in FIGS. 40 and 42 will be described.

S51: The function setting section 109 sets the multi function peripheral 11 to the direct printing function mode.

S52: The menu m1 (FIG. 21) inquires the storage device that holds a file.

S53: The LCD 51 displays a list of files to select.

S54: The file extracting section 103 reads selected files.

S55: The password determining section 105 performs the password determining process.

S56: The password determining section 105 makes a decision to determine whether the selected files are protected by passwords. If protected, the program proceeds to S57. If not protected, the program proceeds to S58.

S57: The verified password extracting section 121 makes a decision to determine whether the verified password storing section 41a holds a verified password(s). If YES, the program proceeds to S58. If NO, the program proceeds to S59.

S58: The verified password extracting section 121 reads the verified password.

S59: The user inputs a password(s).

S60: The password verifying section 122 performs the password verifying process on a plurality of passwords and the password inputted by the user.

S61: The password verifying section makes a decision to determined whether the passwords coincide. If YES, the program proceeds to S62. If NO, the program jumps back to S59.

S62: If the passwords coincide, the password verifying section 122 stores the passwords into the verified password storing section 41a.

S63: The printing performing section 111 performs printing permitting process of the file.

S64: The printing permit setting section 113 sets the print permit flag to ON.

S65: The next-file determining section 107 makes a decision to determine whether there is a selected file that has not been subjected to the decryption process and printing controlling process yet. If YES, the program returns to S55. If NO, the program ends.

Sixth Embodiment

A sixth embodiment is configured to allow the user to set job attributes including duplex printing and N-up printing via a screen shown on an LCD 51. Elements similar to those of the first to fifth embodiments have been given the same reference numerals. The effects obtained from the first to fifth embodiments can also be obtained from the sixth embodiment, providing that the sixth embodiment has the same configuration as the first, fourth, and fifth embodiments.

Figure 43:
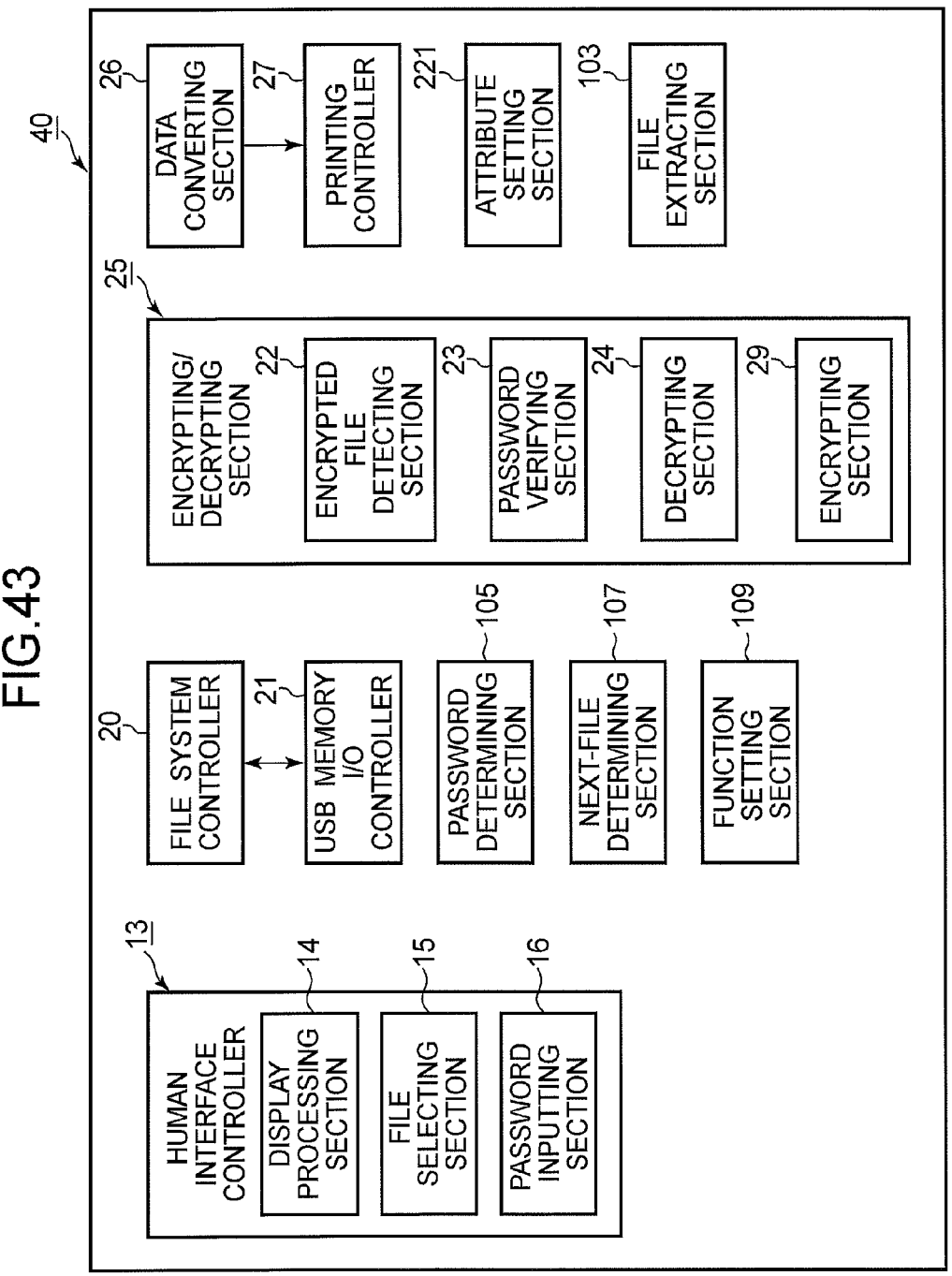
FIG. 43 is a functional block diagram of a multi function peripheral according to the sixth embodiment.
Figure 44:
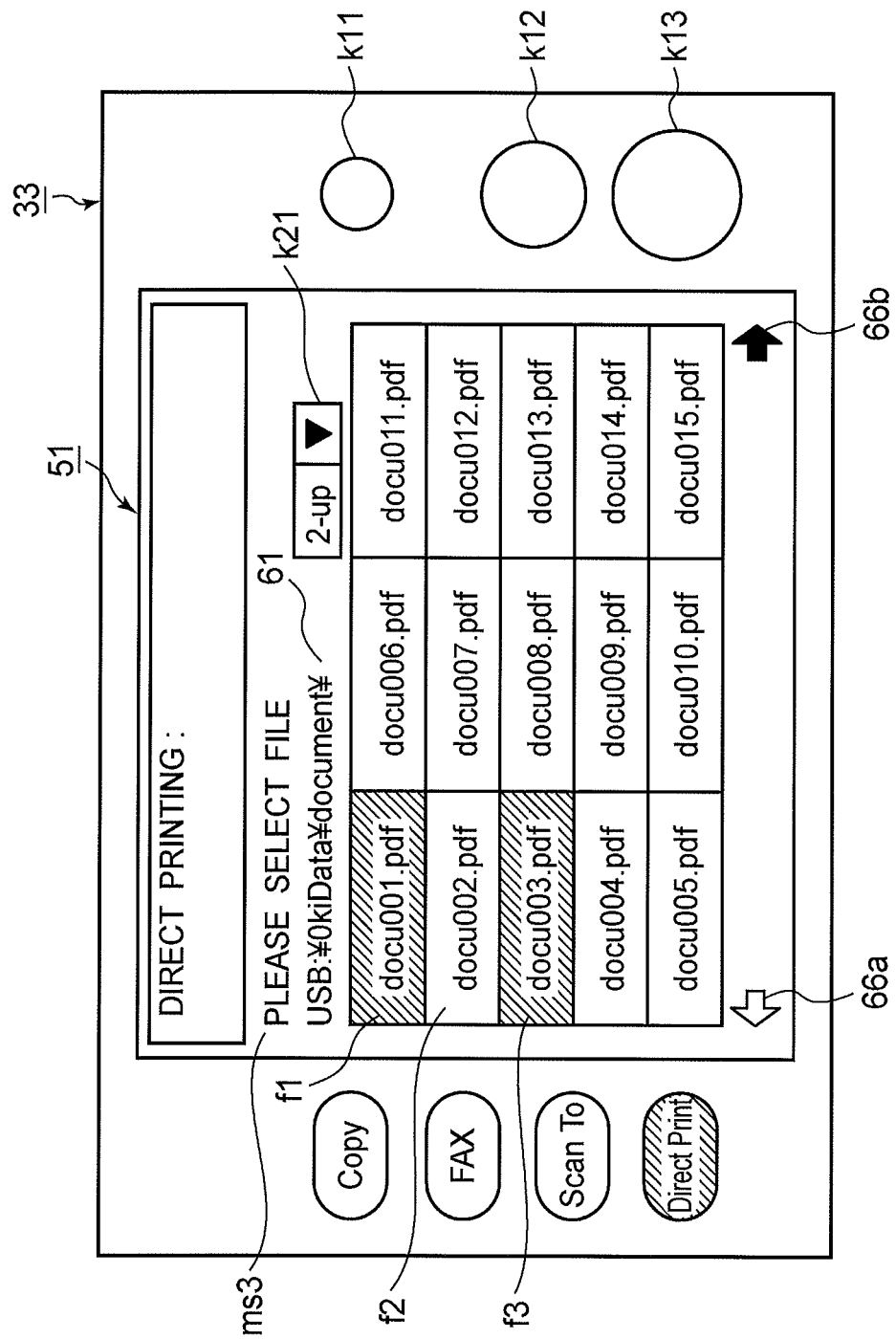
FIG. 44 illustrates a human interface with a liquid crystal display (LCD)
Figure 45:
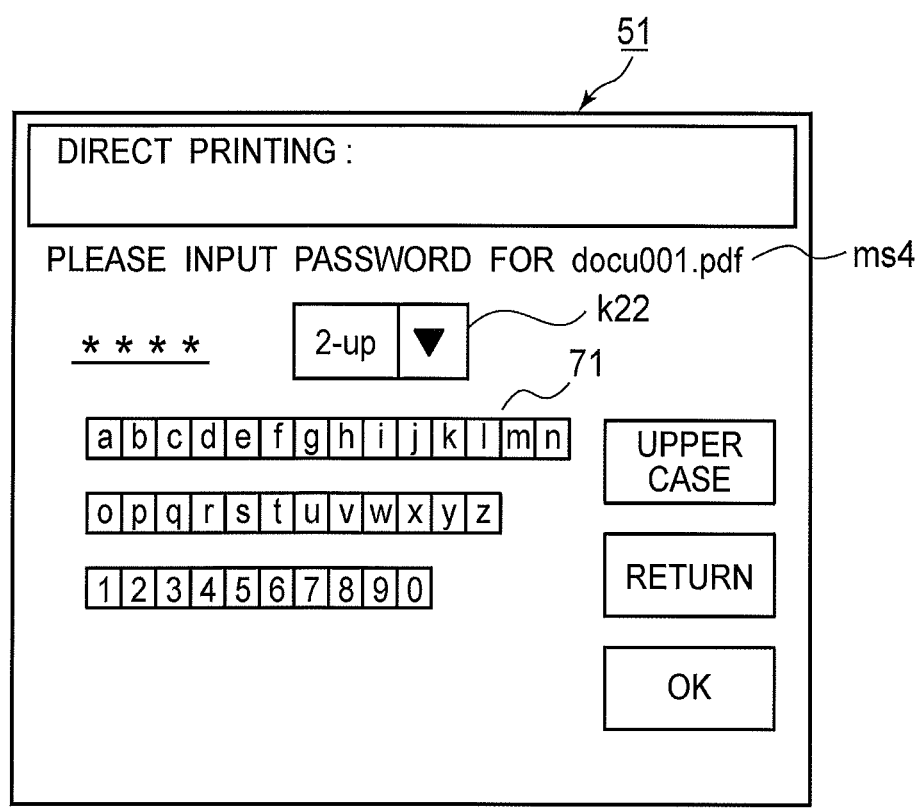
FIG. 45 illustrates another exemplary screen of the LCD.

FIG. 43 is a functional block diagram of a multi function peripheral 11 according to the sixth embodiment. FIG. 44 illustrates a human interface 33 with a liquid crystal display (LCD) 51. FIG. 45 illustrates another exemplary screen of the LCD 51.

Once the user has inserted a USB memory 101 into a USB interface 34, a USB memory I/O controller 21 detects that the USB memory 101 has been attached to the multi function peripheral 11. A display processing section 14 generates a file selection screen and a pull down button k21 as an attribute setting section in the file selection screen. The user touches the button k21 to input the attributes of a print job, e.g., a printing layout.

If the user touches the button k21, the display processing section 14 displays a layout menu in the file selection screen. The layout menu includes a normal printing in which data for one page is printed on one page of print paper and an N-up printing in which data for a plurality of pages is printed on one page of print paper. The layout menu includes "NORMAL," "2-up," "3-up" and so on.

Subsequently, if the user selects the 2-up printing, an attribute setting processing section 221 performs an attribute setting process to invoke the 2-up printing.

Once a desired printing layout has been invoked, the display processing section 14 generates a password inputting screen as shown in FIG. 45, and causes the LCD 51 to display the password inputting screen. The password inputting section shows the name of a file f(1) and a message ms4 together with a pull down button k22 as an attribute setting section. The pull down button k22 has a 2-up printing function by default.

If the 2-up printing function is to be performed, the user first inputs his password via the password inputting screen. If the user wants to switch the printing mode from the 2-up printing to another, he first touches the button k22, then selects the normal printing function or another N-up printing mode, and finally inputs his password.

As described above, if the user selects a desired layout printing via the file selection screen, the selected layout is displayed by default in the password inputting screen, which simplifies the user's operation.

In the sixth embodiment, the file selection screen first appears and then the password inputting screen appears. Alternatively, the apparatus may be configured such that the password inputting screen for a predetermined file may appear first, the password inputting screen for another file may appear second, and the layout set in the attribute setting process for the first file may be set by default for the another file. For example, if the layout for docu001 . pdf (FIG. 25) is set to, for example, "2-UP", then docu003. pdf is also set to "2-UP."

The sixth embodiment has been described in terms of layout printing. The printing attributes can comprise one or more of paper size, orientation of the paper (portrait or landscape), simplex/duplex printing, and color/monochrome printing.

Seventh Embodiment

A seventh embodiment is capable of setting the order in which printing is performed, the order being based on printing conditions for printing selected files f (i) (i=1, 2, 3, . . . n). Elements similar to those of the first, fourth, fifth, and sixth embodiments have been given the same reference numerals. The effects obtained from the first, fourth, fifth, and sixth embodiments can also be obtained from the fifth embodiment, providing that the seventh embodiment has the same configuration as the first, fourth, fifth, and sixth embodiments.

Figure 46:
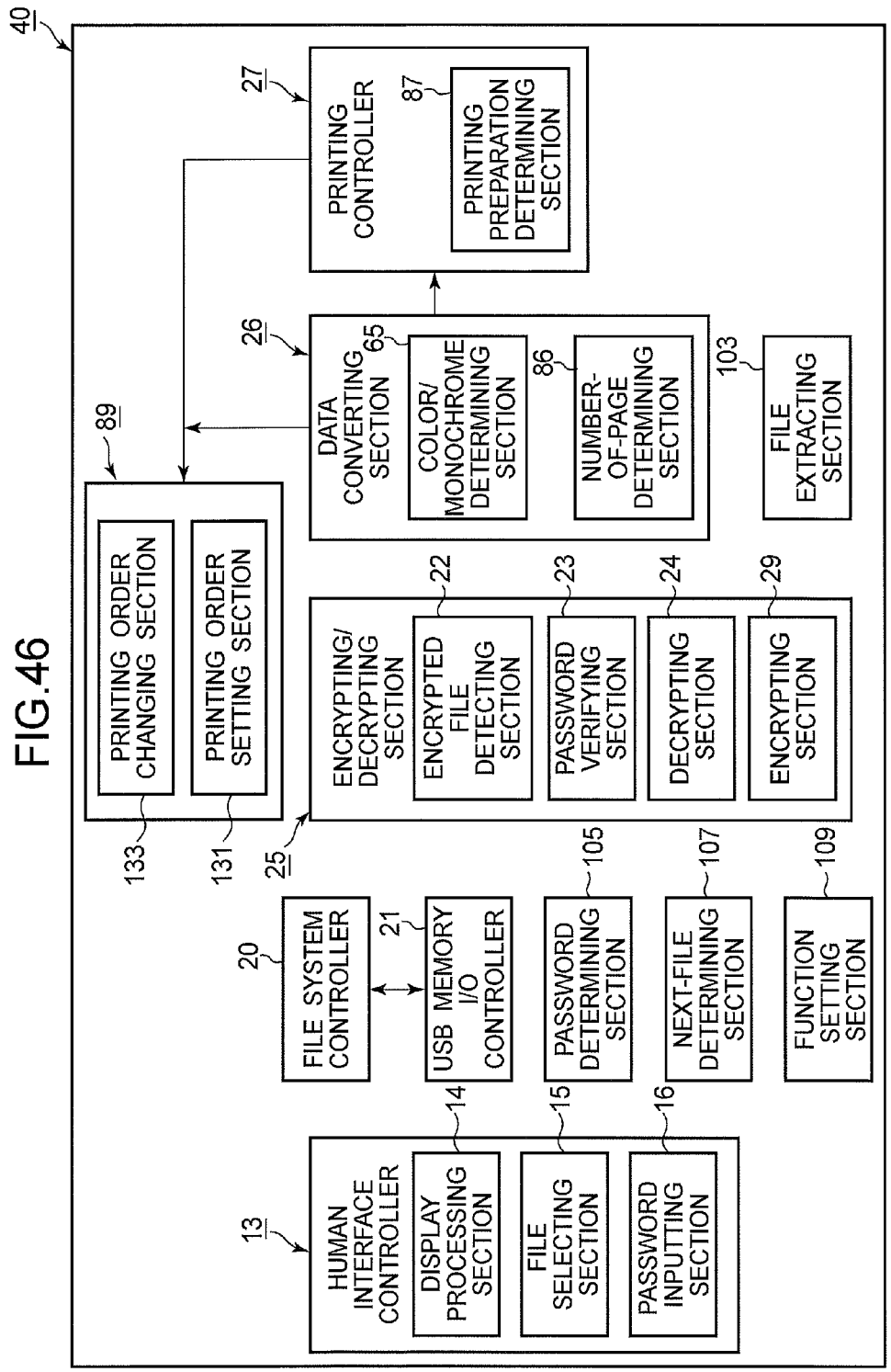
FIG. 46 is a functional block diagram of a multi function peripheral according to the fifth embodiment.

FIG. 46 is a functional block diagram of the multi function peripheral 11 according to the fifth embodiment.

A data converting section 26 serves as a data converting means, and includes a color/monochrome determining section 65 and a number-of-page determining section 86. The color/monochrome determining section 65 serves as a color determining means. The number-of-page determining section 86 serves as a print amount determining means. A printing controller 27 serves a printing controlling means and includes a printing preparation determining section 87 that performs a printing preparation determining process.

A CPU 40 serves as a central controller, and includes a printing order controlling section 89 that serves as a printing order controlling means.

The color/monochrome determining section 65 first performs a color determining process to determine whether selected files f(i) (i=1, 2, 3, . . . n) are for color printing or for monochrome printing. In other words, the printing mode (color printing/monochrome) is a first criterion to determine the order in which files are printed.

The color/monochrome determining section 65 is configured to check whether the selected file f(i) (i=1, 2, 3, . . . n) contains color data or monochrome data only, or whether a user has depressed a button k12 (FIG. 3) or a button k13, thereby determining whether the selected file f(i) (i=1, 2, 3, . . . n) should be printed in monochrome or in color.

If the user depresses the button k13, the color/monochrome determining section 65 determines that the file f(1) should be printed in color if the file f(1) contains color data, and that the file f(1) should be printed in monochrome if the f(1) contains monochrome data only.

If the user depresses the button k12, the color/monochrome determining section 65 determines that the file f(1) should be printed in monochrome regardless of whether the file (1) contains color data or monochrome data only. Thus, if the button k12 is depressed, the file f(1) is printed in monochrome during the printing controlling process.

The information in a predetermined area in the file data of the selected file f (i) (i=1, 2, 3, . . . n) may be checked to determine whether the file f (i) (i=1, 2, 3, . . . n) contains color data or monochrome data only.

The number-of-page determining section 86 performs a print amount determining process to determine the number of pages of the file f(1), f(3), f(5), and f(7) to print. The number-of-page determining section 86 parses the format in a predetermined area of the data of the file f(i) (i=1, 2, 3, . . . n) to determine the number of pages to print. In other words, the number of pages is a second criterion to determine the order in which files are printed.

The printing preparation determining section 87 performs the printing preparation determining process. In other words, a check is made to determine whether a printer 36 (FIG. 1) has completed a warm-up process of a print engine 37, i.e., the printer 36 is ready to print, or whether the printer 36 has not completed the warm-up process of the print engine 37 yet, i.e., the printer 36 is not ready to print yet. In other words, the warm-up level is a third criterion to determine the order in which files are printed.

Once the printer 36 has been turned on, the warm-up process should be performed before printing can be carried out, so that an LED head and a fixing unit are warmed up to be ready for printing. The printer 36 may be configured such that the printer 36 enters a power saving mode if printing is not performed more than a predetermined period of time. Therefore, shortly after the printer 36 has shifted from the power saving mode to the normal mode, the warm-up process needs to be performed.

In general, the period of time required for performing the warm-up process differs for color printing and monochrome printing. This is because the conditions (e.g., temperature of the fixing unit) differ for color printing and monochrome printing. In the sixth embodiment, the temperature of the fixing unit is lower for color printing than for monochrome printing, so that the time required for performing the warm-up process is shorter for color printing than for monochrome printing.

The printing order controlling section 89 performs a printing order controlling process, so that the color/monochrome determining section 65 determines whether selected files f(1), f(3), f(5), and f(7) are for color printing or for monochrome printing, the number-of-page determining section 86 determines the number of pages of the respective file f(1), f(3), f(5), and f(7) to be printed, and the printing preparation determining section 87 determines whether the printer 36 has completed the warm-up process. Then, the printing order controlling section 89 determines the order in which the respective files f(1), f(3), f(5), and f(7) are printed.

The operation of the multi function peripheral 11 will be described.

Figure 50:
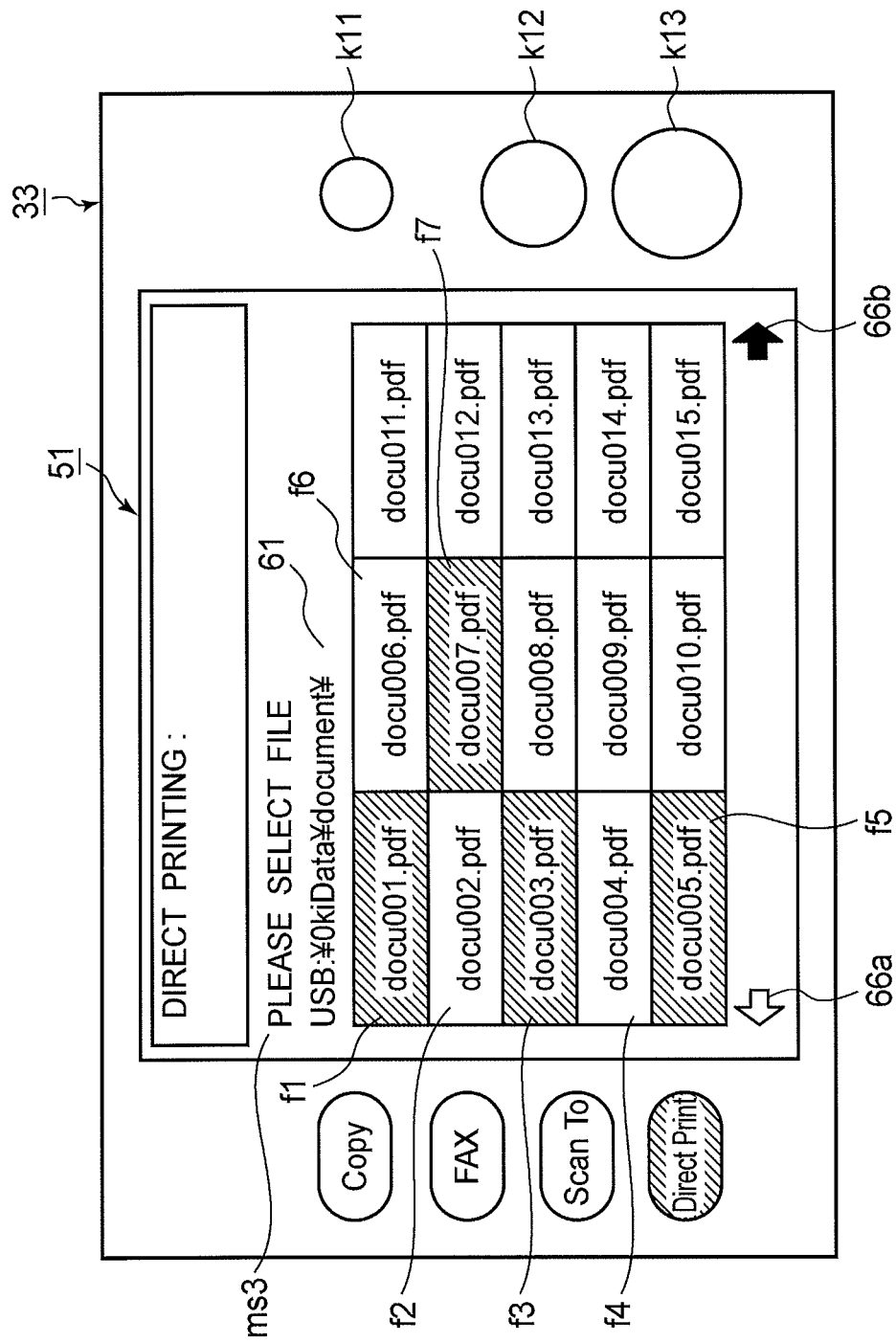
FIG. 50 is an exemplary human interface with a liquid crystal display.

FIG. 50 is an exemplary human interface with a liquid crystal display 51.

FIG. 51 illustrates attributes of respective files.

FIG. 52 illustrates a first exemplary order in which the files should be printed.

FIG. 53 illustrates a second exemplary order in which the files should be printed.

FIG. 54 illustrates a third exemplary order in which the respective files are printed.

Figure 55:
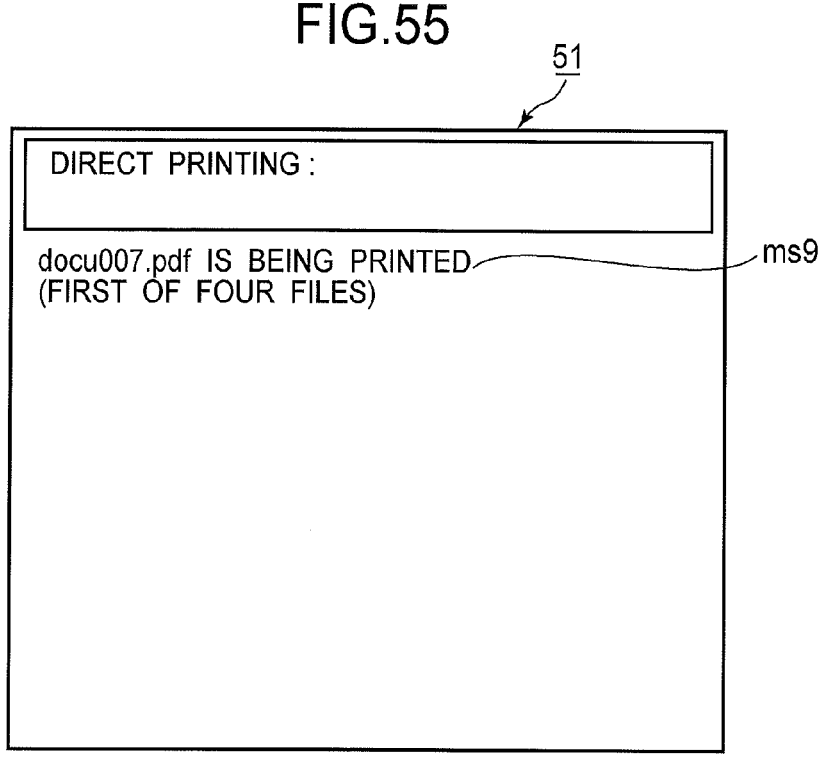
FIG. 55 is an exemplary screen of a liquid crystal display (LCD)

FIG. 55 is an exemplary screen of a liquid crystal display (LCD) 51.

Figure 56:
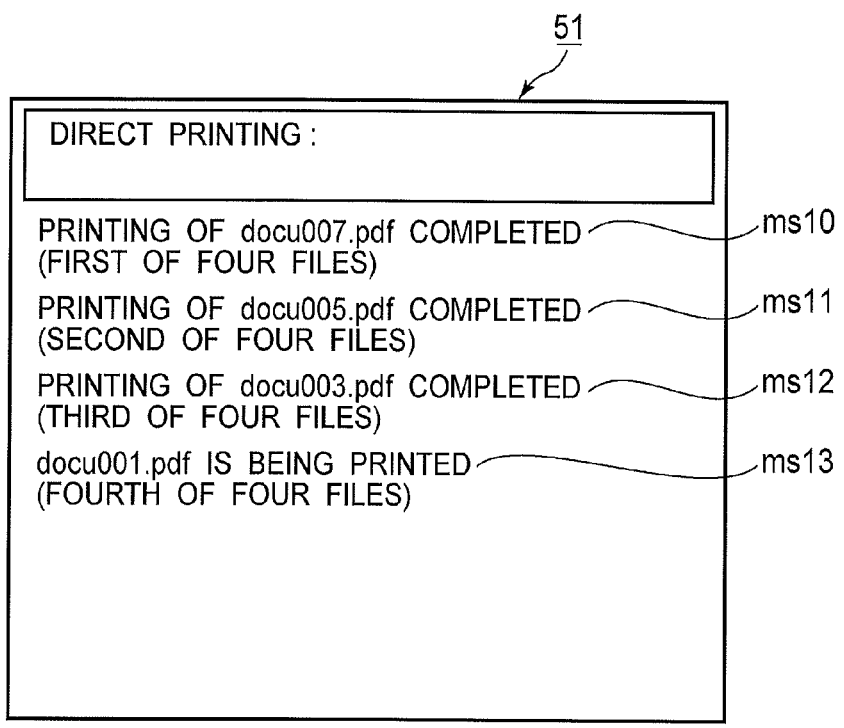
FIG. 56 is another exemplary screen of the LCD.

FIG. 56 is another exemplary screen of the LCD 51.

Figure 47:
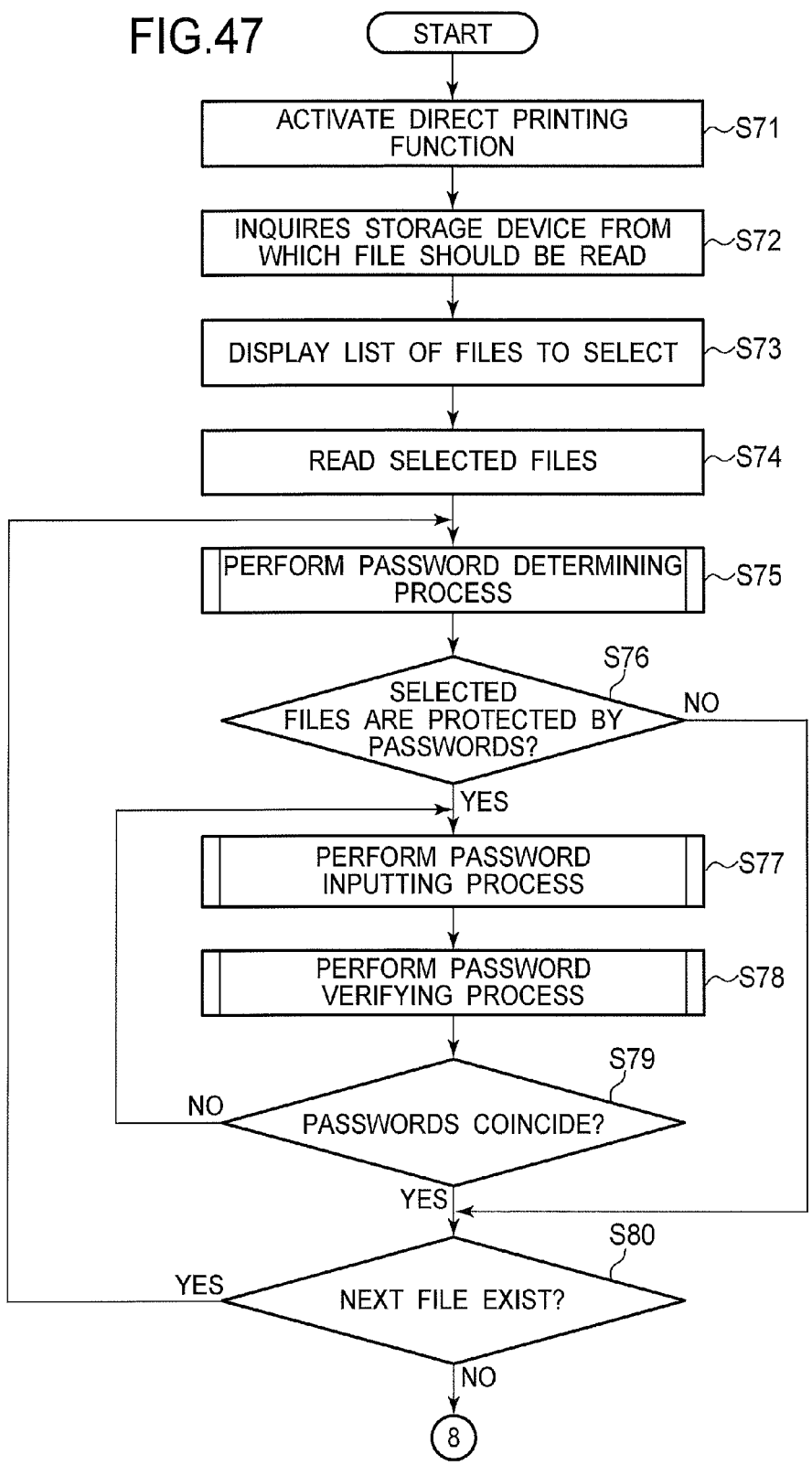
FIG. 47 is a first portion of a flowchart illustrating the operation of the multi function peripheral.

FIG. 47 is a first portion of a flowchart illustrating the operation of the multi function peripheral 11.

Once the user has selected a direct printing function via the human interface 33 (FIG. 3), a function setting section 109 activates a function of a direct printing function (S71). Then, a display processing section 14 causes the LCD 51 to display an initial screen (FIG. 3). The initial screen displays an operation menu m1 prompting the user to select a storage device from which a desired file(s) is to be read (S72).

Once the user has selected a USB memory 101, the display processing section 14 causes the LCD 51 to display a guide screen (FIG. 7). A message ms2 appears on the guide screen, prompting the user to insert the USB memory 101 into a USB interface 34.

Once the user has inserted the USB memory 101 into the USB interface 34, a USB memory I/O controller 21 detects that the USB memory 101 has been inserted into the USB interface 34. As shown in FIG. 50, the display processing section 14 causes the LCD 51 to display a file selection screen, which in turn displays a list of files f(i) (i=1, 2, 3, . . . n) stored in the USB memory 101, and a message ms3 and prompts the user to select a file(s) (S73).

When the user touches, for example, files (e.g., f(1), f(3), f(5), f(7)) to select these files, the characters and the background are shown by reversing black and white. A file selecting section 15 selects the files f(1), f(3), f(5), and f(7), and a file extracting section 103 reads the files f(1), f(3), f(5), and f(7) from the USB memory 101 (S74).

In the sixth embodiment, the respective files f(1), f(3), f(5), and f(7) have attributes as shown in FIG. 51. The attributes include the number of pages to print and the printing modes (i.e., color printing or monochrome printing) for the files f(1), f(3), f(5), and f(7).

Next, if the user depresses the button k12, monochrome printing is initiated using the direct printing function. If the user depresses the button k13, color printing is initiated using the direct printing function.

Subsequently, a password determining section 105 performs a password determining process to select files f(1), f(3), f(5), and f(7) in sequence. The password determining section 105 makes a decision to determine whether the first selected file (e.g., file f(1)) is protected by a password (S75).

If the file f(1) is protected by a password (Y at S76), the display processing section 14 causes the LCD 51 to display a password inputting screen (FIG. 10). The password inputting screen displays the name of the file f(1) and a message ms4 prompting the user to input the password for the file f(1). Once the user has inputted the password, a password inputting section 16 reads the password inputted by the user, and notifies a password verifying section 23 of the name of the file f(1), the location of a folder 61 that holds the file f(1), and other information (S77).

The password verifying section 23 makes a decision to determine whether the password read from a buffer area 95 in a RAM 41 as shown in FIG. 9 and the password inputted by the user coincide (S78). If the passwords coincide (Y at S79), a next-file determining section 107 makes a decision to determine whether there is a selected file (e.g., f(3) in this embodiment) that has not been subjected to the decryption process and printing controlling process yet (S80). If the selected file (e.g., f(3)) has not been subjected to the decryption process and printing controlling process yet (Y at S80), the password inputting section 16 performs a password inputting process, the password determining section 105 performs the password determining process, and the password verifying section 23 performs the password verifying process.

If the passwords do not coincide (N at S79), the display processing section 14 causes the LCD 51 to display a password re-inputting screen (FIG. 11). The password re-inputting screen displays a message mss, which indicates to the user that the passwords do not coincide and prompts the user to input another password.

In this manner, once the password inputting process, password determining process, and password verifying process have been performed (N at S80), the printing order controlling section 89 determines the order in which the files f(1), f(3), f(5), and f(7) are printed (S81).

Figure 49:
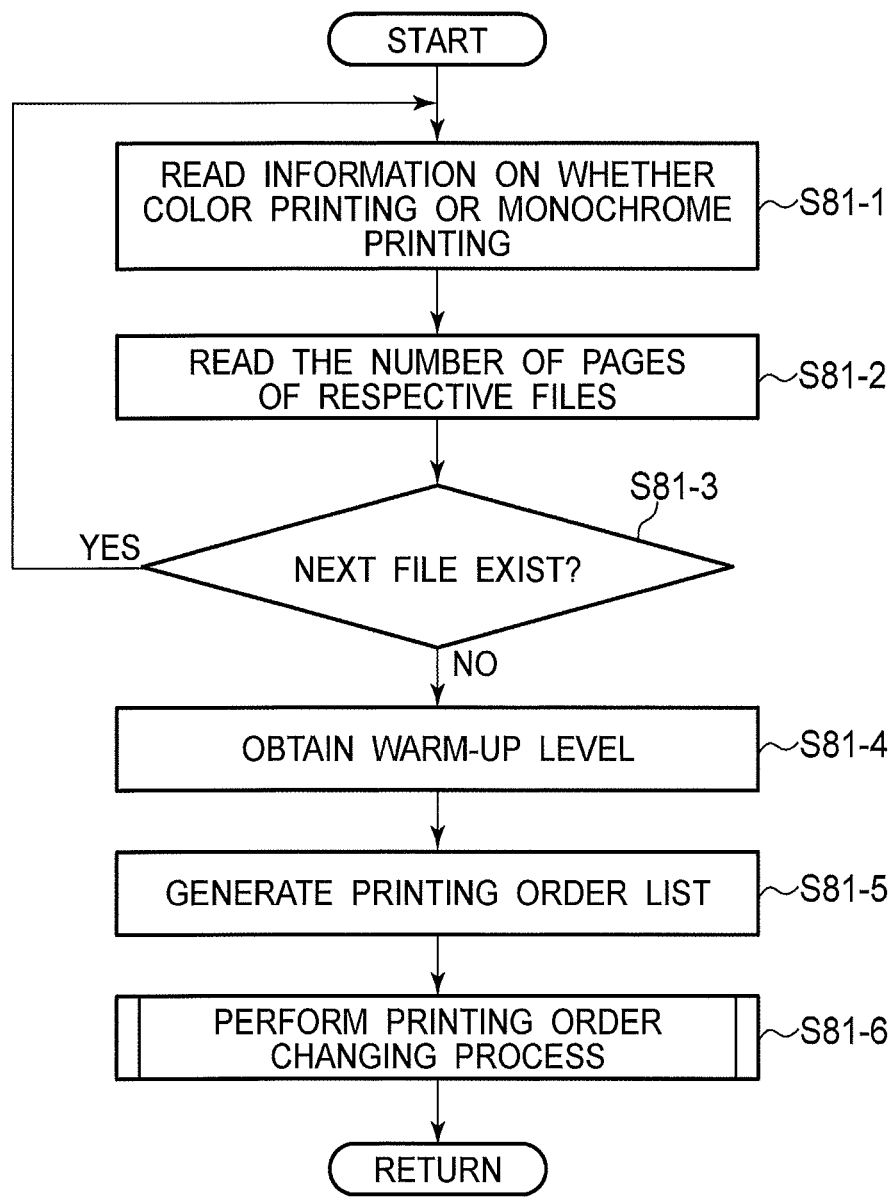
FIG. 49 illustrates a subroutine for determining the printing order.

FIG. 49 illustrates a subroutine for determining the printing order.

At S81 (FIG. 48), the printing order controlling section 89 obtains the password, the names of files f(1), f(3), f(5), and f(7), the location of the folder 61 that holds the files f(1), f(3), f(5), and f(7), and other information, which are received via the password inputting section 16. The printing order controlling section 89 then obtains from the RAM 41 the intermediate data produced during the password verifying process, using the information received via the password inputting section 16.

The printing order controlling section 89 reads, from the intermediate data, information about color printing/monochrome printing determined by the color/monochrome determining section 65 (S81-1), and the number of pages of the respective file f(1), f(3), f(5), and f(7) determined by the number-of-page determining section 86 (S81-2).

The next-file determining section 107 performs a next file determining process, thereby determining whether there is a file (e.g., f(3) in this embodiment) that has not been subjected to the decryption process and printing controlling process yet. If the file f(3) has not been subjected to the decryption process and printing controlling process yet (Y at S81-3), the next-file determining section 107 reads the information about color printing/monochrome printing and the number of pages. Likewise, the information about color printing/monochrome printing and the number of pages as shown in FIG. 51 are obtained for the respective files. If it is determined that all of the selected files have been subjected to the decryption process and printing controlling process (N at S81-3), the printing order controlling section 89 obtains the warm-up level of the print engine 37 of the printer 36, determined by the printing preparation determining section 87 (S81-4).

A printing order setting section 131 of the printing order controlling section 89 performs a printing order controlling process to generate a printing order list for the files f(i) (i=1, 2, 3, ... n) (S81-5).

FIG. 51 illustrates the list that shows files f(1), f(3), f(5), and f(7) in the order in which they are obtained by the file selecting section 15.

The files f(1), f(3), f(5), and f(7) are printed in the order of docu001. pdf, docu003 . pdf, docu005 . pdf, and docu007. pdf, from top to bottom.

A printing order changing section 133 of the printing order controlling section 89 performs a printing order changing process (S81-6) to check whether the warm-up process of the print engine 37 of the printer 36 has been completed. In the sixth embodiment, the fixing temperature is lower for color printing than for monochrome printing, so that the printing operation can be initiated earlier for monochrome printing than for color printing. Thus, if the warm-up process for the print engine 37 has not completed yet, the printing priority level may be changed so that monochrome printing is given a higher priority as shown in FIG. 52. Alternatively, when the warm-up process for the print engine 37 has been completed, if printing speed is set higher for color printing than for monochrome printing, the printing priority level may be changed so that color printing is given a higher priority as shown in FIG. 53, in which case, printing of a file having a smaller number of pages can be completed in a shorter time, and therefore files having a smaller number of pages may be given a higher printing priority.

When the user depresses the button k12, if the file is for monochrome printing, the printing order changing section 133 gives a higher priority to a file having a smaller number of pages as shown in FIG. 54.

Figure 48:
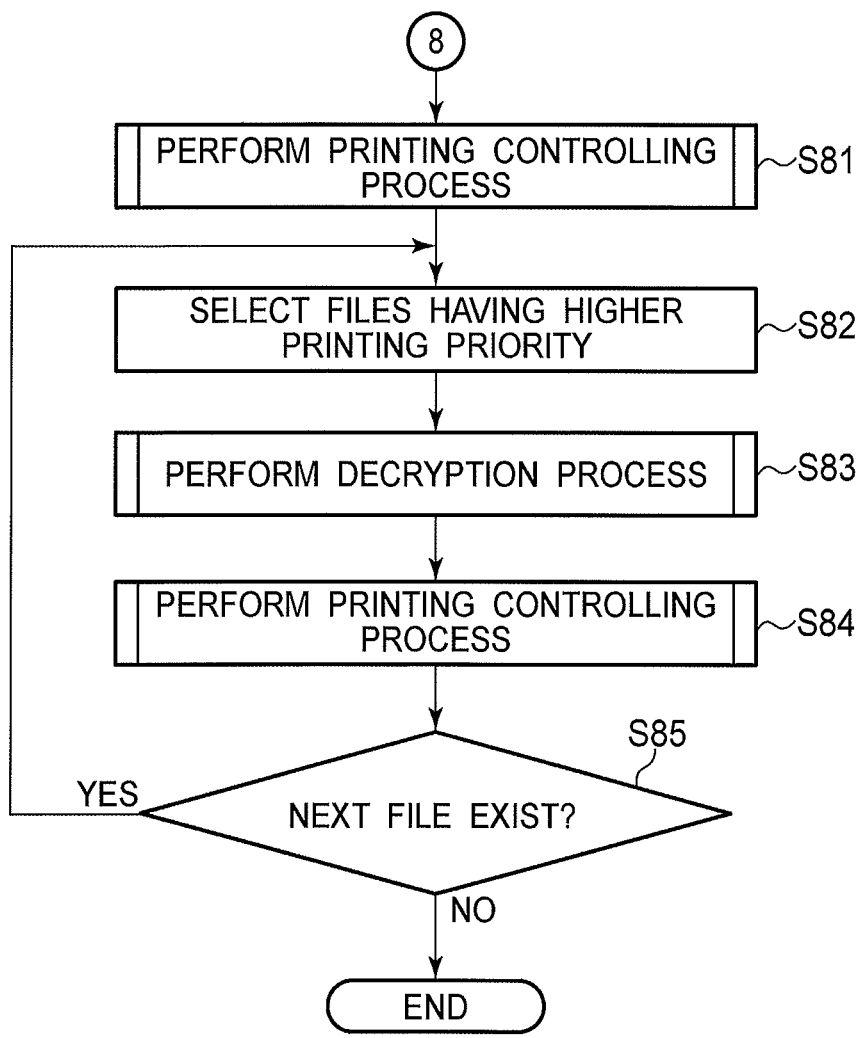
FIG. 48 is a second portion of the flowchart.

FIG. 48 is a second portion of the flowchart.

Once the printing order has been set, the printing order controlling section 89 selects the files (e.g., f(7), f(5), f(3), and f(1)) in the order of higher printing priority, and sends the files f(7), f(5), f(3), and f(1) to an encrypting/decrypting section 25. The encrypting/decrypting section 25 sends the name of the files f(7), f(5), f(3), and f(1), the location of the folder 61 that holds the files f(7), f(5), f(3), and f(1), and other information to the data converting section 26 (S82).

The data converting section 26 reads the file data of the respective files f(7), f(5), f(3), and f(1) from the buffer area 95 and sends the file data to a decrypting section 24, which in turn detects the region of encrypted document data of a first selected file (e.g., f(7) in the fifth embodiment), and reads the document data to produce a plain text (S83).

The plain text is then sent as print data to the printing controller 27, which in turn drives the print engine 37 to print the print data on the print paper. At this moment, the display processing section 14 causes the LCD 51 to display a printing progress status screen (FIG. 55). The printing progress status screen displays a message ms9 indicating to the user that the file f(7) having a highest priority is being printed (S84).

The next-file determining section 107 performs a next file determining process, thereby determining whether there is a file that has not been subjected to the decryption process and printing controlling process yet (S85). If a file has not been subjected to the decryption process and printing controlling process yet (Y at S85), the file is subjected to the decryption process and printing controlling process, in which case the display processing section 14 causes the LCD 51 to display a printing progress status screen (FIG. 56). The printing progress status screen displays messages ms10 to ms13 indicating to the user that the files f(7), f(5) and f(3) having higher priorities have been printed (S84) and that the file f(1) is now being printed.

In this manner, once the decryption process and printing controlling process have been performed on all of the files f(7), f(5), f(3), and f(1), the CPU 40 terminates the direct printing function (N at S85).

As described above, files that require a shorter time to print are given higher printing priorities, so that files can be printed faster as a whole. This allows the user to obtain print outs as fast as possible, resulting in increased operability.

The flowchart shown in FIGS. 47 and 48 will be described.

S71: The function setting section 109 places the multi function peripheral 11 in a direct printing function mode.

S72: The initial screen displays an operation menu m1.

S73: The operation menu m1 prompts the user to select a storage device from which the user's desired file is to be read.

S74: The file extracting section 103 reads the selected files f(1), f(3), f(5), and f(7) from the USB memory 101.

S75: The password determining section 105 performs the password determining process.

S76: The password determining section 105 makes a decision to determine whether the first file is protected by a password. If YES, the program proceeds to S77. If NO, the program proceeds to S80.

S77: The password inputting section 16 reads the password inputted by the user.

S78: The password verifying section 23 makes a decision to determine whether the password read from the buffer area 95 and the password inputted by the user coincide.

S79: If the passwords coincide, the program proceeds to S80. If the passwords do not coincide, then the program jumps back to S77.

S80: The next file determining section 107 makes a decision to determine whether there is a file that has not been subjected to the decryption process and printing controlling process.

S81: The printing order controlling section performs the printing controlling process.

S82: The printing order controlling section 89 selects the files f(7), f(5), f(3), and f(1) in the order of higher printing priority.

S83: The decrypting section 24 performs the decryption process.

S84: The printing controller 27 performs the printing controlling process.

S85: The next file determining section 107 performs the next file determining process. If YES, the program returns to S82. If NO, the program ends.

The flowchart shown in FIG. 49 will be described.

S81-1: The printing order controlling section 89 reads information on whether the file is for color printing or for monochrome printing.

S81-2: The printing order controlling section 89 reads the number of pages of the respective files f(1), f(3), f(5), and f(7).

S81-3: The next file determining section 107 makes a decision to determine whether there is a file that has not been subjected to the decryption process and the printing controlling process. If YES, then the program jumps back to S81-1. If NO, the program proceeds to S81-4.

S81-4: The printing controlling section 89 obtains the warm-up level of the print engine 37.

S81-5: The printing controlling section 89 generates a printing order list.

S81-6: The printing controlling section 89 performs the printing order changing process.

The first to sixth embodiments have been described in terms of printing files saved in the USB memory 101. The present invention may also be applied to printing of the files stored in memories including the HDD 43 and the network server.

Although the first to sixth embodiments have been described with respect to the multi function peripheral 11, the present invention may also be applied to printers, copying machines and facsimile machines.

The first to sixth embodiments may be combined as required. For example, the sixth embodiment is implemented by adding the verified password extracting section 121 to the second embodiment. Likewise, the verified password extracting section 121 may also be added to the first and sixth embodiments.

What is claimed is:

1. An image forming apparatus, comprising:
    a selecting section configured to select at least two files from a plurality of files stored in a storage medium;
    a password determining section configured to determine whether the selected files are protected by passwords;
    a file extracting section configured to extract the at least two selected files from the storage medium;
    a password verifying section configured to verify the passwords contained in the selected files if the password determining section determines that the at least two selected files are protected by passwords;
    a printing unit that prints the at least two selected files; and
    a printing controller configured to control the printing unit, the printing controller waiting for the password verifying section to successfully complete successive verification of all of the passwords contained in the at least two selected files before permitting the printing unit to initiate printing of any of the at least two selected files.

2. The image forming apparatus according to claim 1, further comprising a human interface that includes a display screen through which a user inputs the passwords for the at least two files; and
    wherein the image forming apparatus further comprises:
        an attribute setting section configured to set attributes for the set of files selected by the selecting section; and
        a display processing section configured to display the attribute setting section on the display screen.

3. The image forming apparatus according to claim 1 further comprising:
    a printing order setting section configured to set the order in which the set of the selected files are printed;
    wherein the printing controller causes the printing unit to print the set of selected files in the order set by the printing order setting section.

4. The image forming apparatus according to claim 3, wherein the printing order setting section sets the order such that files for color printing are given priority levels different from files for monochrome printing.

5. The image forming apparatus according to claim 3, wherein the printing order setting section sets the order such that files for simplex printing are given a priority level different from files for duplex printing.

6. The image forming apparatus according to claim 3, wherein the printing order setting section sets the order such that files having different number of pages to be printed are given different priority levels.

7. The image forming apparatus according to claim 1, wherein the storage medium is a non-volatile storage medium.

8. The image forming apparatus according to claim 1, wherein the external storage medium is detachably attached to a body of the image forming apparatus.

9. The image forming apparatus according to claim 1, wherein the storage medium is an external storage medium, and wherein the selecting section selects the at least two files from a plurality of files stored in the external storage medium.

10. The image forming apparatus according to claim 1 further comprising:
    a display processing section configured to display print logs for all of the selected files; and
    a retry-to-print processing section configured to print files commanded by the user via the displayed print logs.

11. The image forming apparatus according to claim 1 further comprising:
    a printing interrupt controller configured to determine whether there is a file that has been commanded by a user via an interrupt while any one of the other selected files is currently being printed;
    wherein a retry-to-print processing section adds the file that has been commanded by the user to a queue for printing.

12. The image forming apparatus according to claim 1, wherein the external storage medium is a memory device external to the image forming apparatus.

13. The image forming apparatus according to claim 1, wherein the printing controller controls the printing unit to perform a direct printing function on a file stored in the storage medium.

14. The image forming apparatus according to claim 1, wherein the password verifying section includes a verified password storing section configured to store passwords that have been verified by the password verifying section previously; and
    wherein the password verifying section determines whether the verified passwords in the verified password storing section and passwords in the at least two selected files coincide.

15. The image forming apparatus according to claim 14, further comprising a human interface through which a user inputs passwords for the at least two selected files;
    wherein if none of the passwords in the password storing section coincides with the passwords contained in one of the at least two selected files, the printing controller prompts the user to input a password for the one of the at least two selected files; and
    wherein the password verifying section checks whether the password inputted by the user through the human interface and the password contained in the one of the at least two selected files coincide.

16. The image forming apparatus according to claim 15, wherein the password verifying section determines whether a password of a file subjected to a retry-to-print process and a password inputted by the user coincide.

17. The image forming apparatus according to claim 15, wherein if the password contained in the one of the at least two selected files coincides with a password in the password storing section, the printing controller prompts the user to input a password for the one of the at least two selected files.

18. The image forming apparatus according to claim 1 further comprising a human interface through which a user inputs passwords for the at least two selected files;
wherein if the password determining section determines that one of the at least two selected files is not protected by a password, the printing controller does not prompt the user to input the password for the selected file, and the printing controller controls the printing unit to print the one of the at least two selected files.

19. The image forming apparatus according to claim 1, wherein the storage medium is one of an internal storage medium and an external storage medium.

20. A method for forming an image, comprising:
extracting at least two files selected from a plurality of files stored in a storage medium;
determining whether the at least two selected files are protected by passwords;
determining whether passwords contained in the at least two selected files and passwords inputted from outside coincide;
performing successive verification of the passwords contained in the at least two selected files;
waiting for completion of the successive verification of all of the passwords contained in the at least two selected files; and
initiating printing of the at least two selected files only after successful completion of successive verification of all of the passwords contained in the at least two selected files.

21. An image forming apparatus, comprising:
a selecting section configured to select at least two files from a plurality of files stored in a storage medium;
a password determining section configured to determine whether the selected files are protected by passwords;
a file extracting section configured to extract the at least two selected files from the storage medium;
a password verifying section configured to verify the passwords contained in the at least two selected files if the password determining section determines that the at least two selected files are protected by passwords;
a printing unit that prints the at least two selected files; and
a printing controller configured to control the printing unit, the printing controller waiting for the password verifying section to complete successive verification of all of the passwords contained in the at least two selected files before permitting the printing unit to initiate printing of any of the at least two selected files.

22. The image forming apparatus according to claim 21, wherein the password verifying section includes a verified password storing section configured to store passwords that have been verified by the password verifying section previously; and
wherein the password verifying section determines whether the verified passwords in the verified password storing section and passwords in the at least two selected files coincide.

23. A method for forming an image, comprising:
extracting at least two files selected from a plurality of files stored in a storage medium;
determining whether the at least two selected files are protected by passwords;
determining whether passwords contained in the at least two selected files and passwords inputted from outside coincide;
performing successive verification of the passwords contained in the at least two selected files; and
waiting for completion of the successive verification of all of the passwords contained in the at least two selected files; and
initiating printing of the at least two selected files only after completion of successive verification of all of the passwords contained in the at least two selected files.

* * * * *